US008707756B2

(12) United States Patent
Shiozawa et al.

(10) Patent No.: US 8,707,756 B2
(45) Date of Patent: Apr. 29, 2014

(54) DEVICE AND METHOD FOR ESTIMATING FRICTIONAL CONDITION OF GROUND SURFACE WITH WHICH VEHICLE IS IN CONTACT

(75) Inventors: Yuuki Shiozawa, Isehara (JP); Hiroshi Mouri, Isehara (JP); Masaaki Nawano, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 488 days.

(21) Appl. No.: 13/126,669

(22) PCT Filed: Sep. 15, 2009

(86) PCT No.: PCT/JP2009/066076
§ 371 (c)(1),
(2), (4) Date: Apr. 28, 2011

(87) PCT Pub. No.: WO2010/050313
PCT Pub. Date: May 6, 2010

(65) Prior Publication Data
US 2011/0209521 A1    Sep. 1, 2011

(30) Foreign Application Priority Data

Oct. 29, 2008  (JP) .................................. 2008-278033

(51) Int. Cl.
*G01N 19/02*   (2006.01)
(52) U.S. Cl.
USPC .............................................................. 73/9
(58) Field of Classification Search
USPC .............................................................. 73/9
See application file for complete search history.

(56) References Cited

U.S. PATENT DOCUMENTS

| | | | |
|---|---|---|---|
| 5,747,682 | A | 5/1998 | Hirano |
| 6,923,038 | B2 | 8/2005 | Klovning |
| 6,941,213 | B2 | 9/2005 | Yasui et al. |
| 2002/0111752 | A1 | 8/2002 | Nakamura |
| 2004/0019417 | A1 | 1/2004 | Yasui et al. |
| 2006/0074541 | A1 | 4/2006 | Ono et al. |
| 2007/0021887 | A1* | 1/2007 | Hofmann et al. ............ 701/40 |
| 2010/0114449 | A1 | 5/2010 | Shiozawa et al. |

FOREIGN PATENT DOCUMENTS

| | | |
|---|---|---|
| JP | 9-144280 A | 6/1997 |
| JP | 2002-154418 (A) | 5/2002 |
| JP | 2003-312465 (A) | 11/2003 |
| JP | 2004-130965 (A) | 4/2004 |
| JP | 2004-352046 A | 12/2004 |
| JP | 2006-34012 (A) | 2/2006 |

(Continued)

*Primary Examiner* — Hezron E Williams
*Assistant Examiner* — Paul West
(74) *Attorney, Agent, or Firm* — Foley & Lardner LLP

(57) ABSTRACT

Apparatus (or method) for estimating a gripping characteristic of a vehicle wheel of a vehicle on a ground contact surface includes first input section (or step), a second input section (or step) and an output section (or step). The first input section sets a first input which is a ratio of a first wheel force acting on the vehicle wheel in the ground contact surface in a first direction, and a first wheel slip degree. The second input section sets a second input which is a ratio of a second wheel force acting on the vehicle wheel in the ground contact surface in a second direction, and a second wheel slip degree of the vehicle wheel. The output section determines, from the first and second inputs, an output which is a grip characteristic parameter indicative of the gripping characteristic of the vehicle wheel.

56 Claims, 45 Drawing Sheets

(56) References Cited

FOREIGN PATENT DOCUMENTS

| JP | 2006-273108 (A) | 10/2006 | | |
| JP | 2007-112367 (A) | 5/2007 | | |
| KR | 10-0215344 | B1 | 8/1999 |
| KR | 10-0760486 | B1 | 9/2007 |
| RU | 2 274 847 | C2 | 4/2006 |
| WO | WO 2008/133150 (A) | | 11/2008 |

* cited by examiner

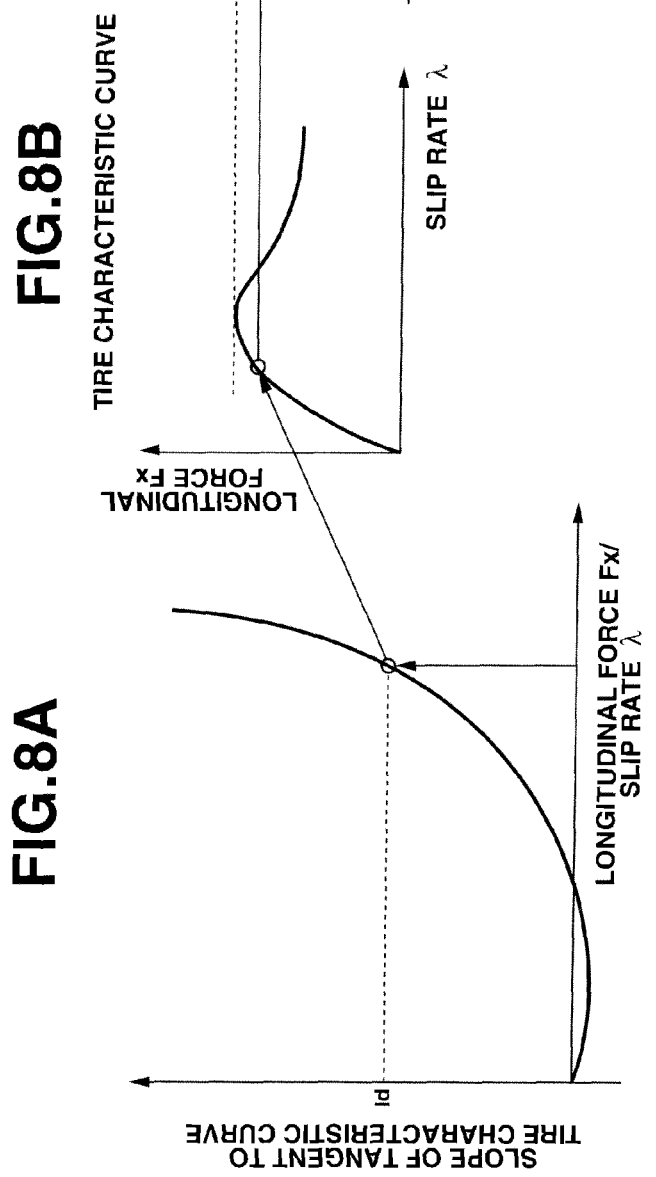

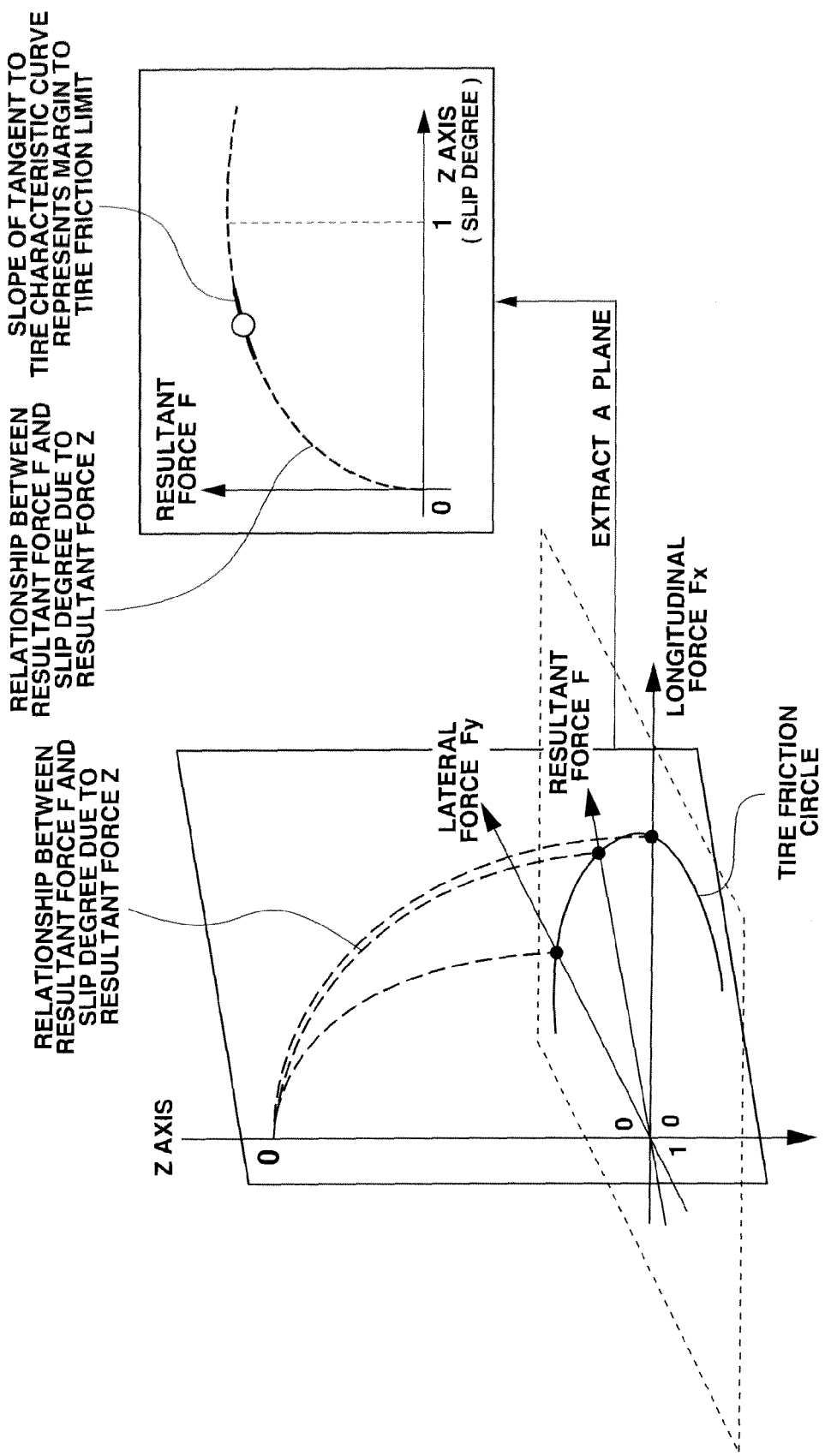

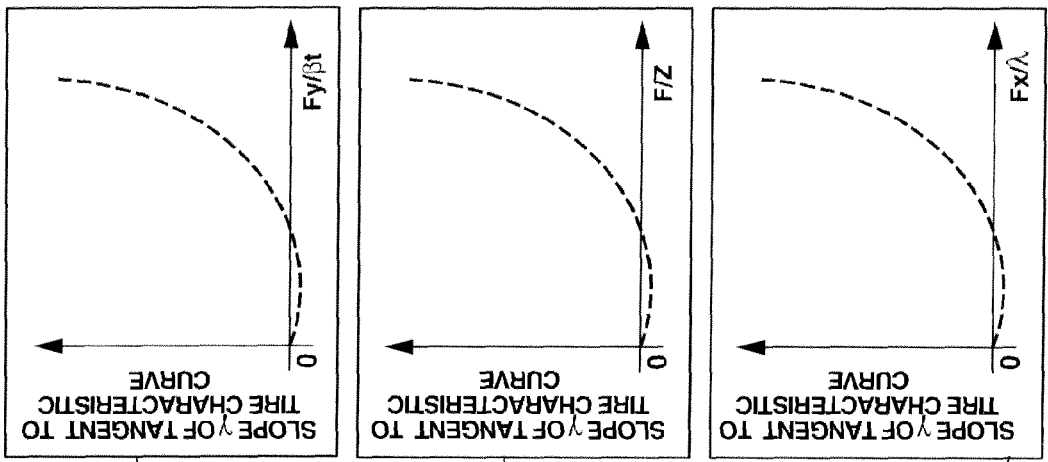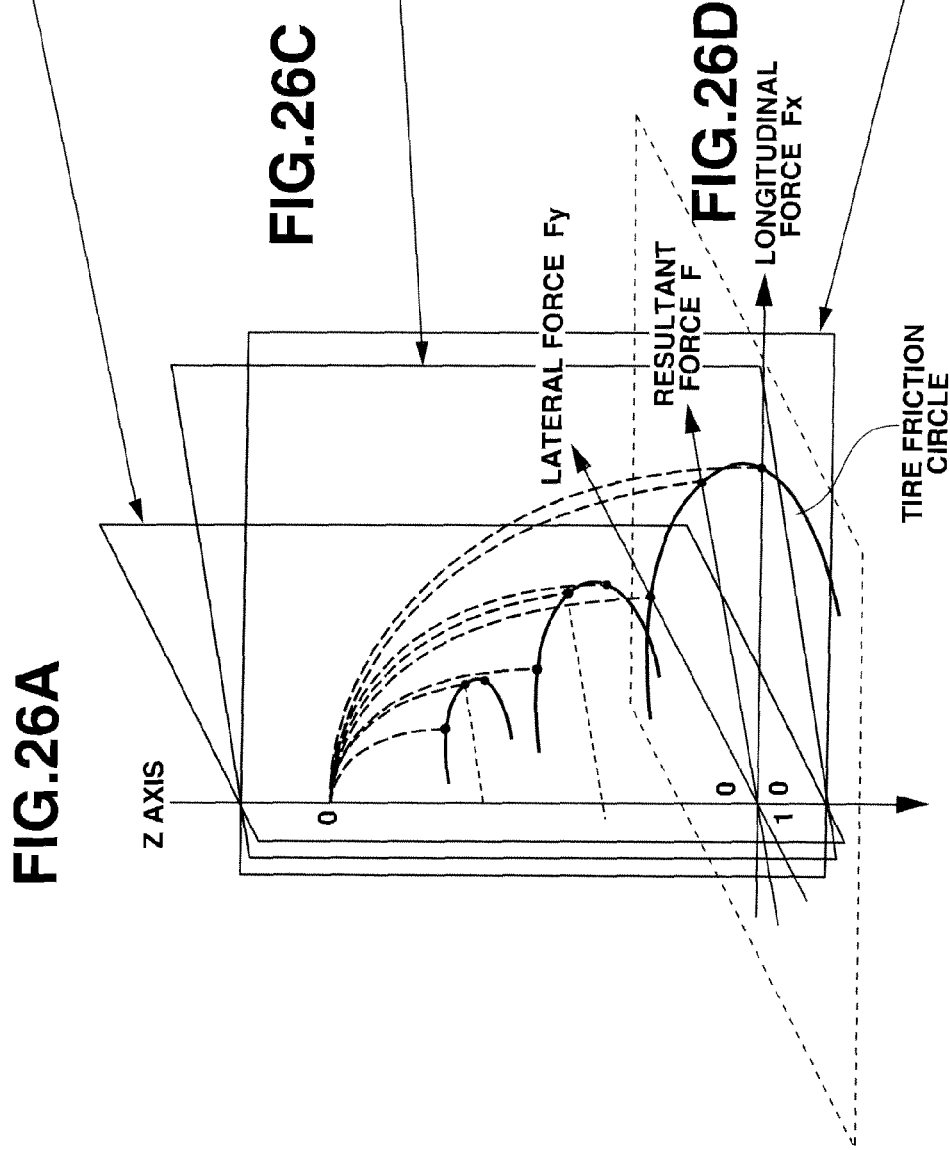

Gx : LONGITUDINAL-G
Gy : LATERAL-G
Ay : ACCELERATION IN TURNING-RADIUS DIRECTION

Gx : LONGITUDINAL-G
Gy : LATERAL-G
Ay : ACCELERATION IN TURNING-RADIUS DIRECTION
$\dot{V}x$ : CHANGE IN LONGITUDINAL VELOCITY
$\dot{V}y$ : CHANGE IN LATERAL VELOCITY

_US 8,707,756 B2_

DEVICE AND METHOD FOR ESTIMATING FRICTIONAL CONDITION OF GROUND SURFACE WITH WHICH VEHICLE IS IN CONTACT

TECHNICAL FIELD

The present invention relates to device or apparatus and method for estimating a friction state in a contact surface between a vehicle wheel and a ground, or a road surface gripping state of a vehicle wheel, or a margin with respect to a friction limit.

BACKGROUND ART

As earlier technology of this kind, there is a system arranged to plot a point corresponding to an actual wheel slip rate and a road surface friction coefficient in a two-dimensional map having a horizontal axis representing the wheel slip rate and a vertical axis representing the road surface friction coefficient, and to estimate the tire friction state from the slope of a straight line passing through the plotted point and the origin (cf. patent document 1). In accordance with the estimated tire friction state, this system controls the longitudinal force or driving/braking force of the wheel.
Patent Document 1: JP2006-34012 A

SUMMARY OF THE INVENTION

However, the system according to the earlier technique of patent document 1 is unable to grasp the tire frictional limit, and hence unable to detect the margin to the tire frictional limit. A task of the present invention is to estimate grip state and margin to frictional limit more properly.

In order to solve the above-mentioned problem, according to the present invention, a first input section sets a first input which is a ratio of a first wheel force acting on the vehicle wheel in the ground contact surface in a first direction, and a first wheel slip degree of the vehicle wheel. A second input section sets a second input which is a ratio of a second wheel force acting on the vehicle wheel in the ground contact surface in a second direction different from the first direction, and a second wheel slip degree of the vehicle wheel. In accordance with the inputs set by the first and second input sections, an output section determines an output which is a grip characteristic parameter indicative of the gripping characteristic of the vehicle wheel.

BRIEF DESCRIPTION OF THE DRAWINGS

FIG. 8 is a view used for illustrating the underlying technology, and more specifically a view for showing relation among the characteristic curve (2D μ gradient characteristic map), tire characteristic curve (Fx-λ characteristic curve) and friction circle.

FIG. 22 is a view used for illustrating the underlying technology. FIG. 22A is a characteristic view showing an intersection line between the three dimensional curved surface representing the relationship between the slip degree and the wheel force, and a plane containing a vector of a resultant or combined force F of the longitudinal force Fx and lateral force Fy, and a Z axis. FIG. 22B is a characteristic view showing a tire characteristic curve (F-Z characteristic curve) representing a relationship between the resultant force F and the slip degree Z due to the resultant force F.

FIG. 23 is a view used for illustrating the underlying technology.

FIG. 24 is a view used for illustrating the underlying technology.

FIG. 26 is a view used for illustrating the underlying technology and more specifically a characteristic view showing the relationship between the slope γ of tangent to one of a plurality of tire characteristic curves (F-Z characteristic curves) existing in dependence on the direction of the resultant force F, and the ratio of the resultant force F and the slip degree Z.

BEST MODES FOR CARRYING OUT THE INVENTION

The following is explanation on embodiments of the present invention with reference to the drawings.

Technology Underlying the Embodiment(s)

First, the explanation is directed to technology on which the embodiment is based.

Figure 1:
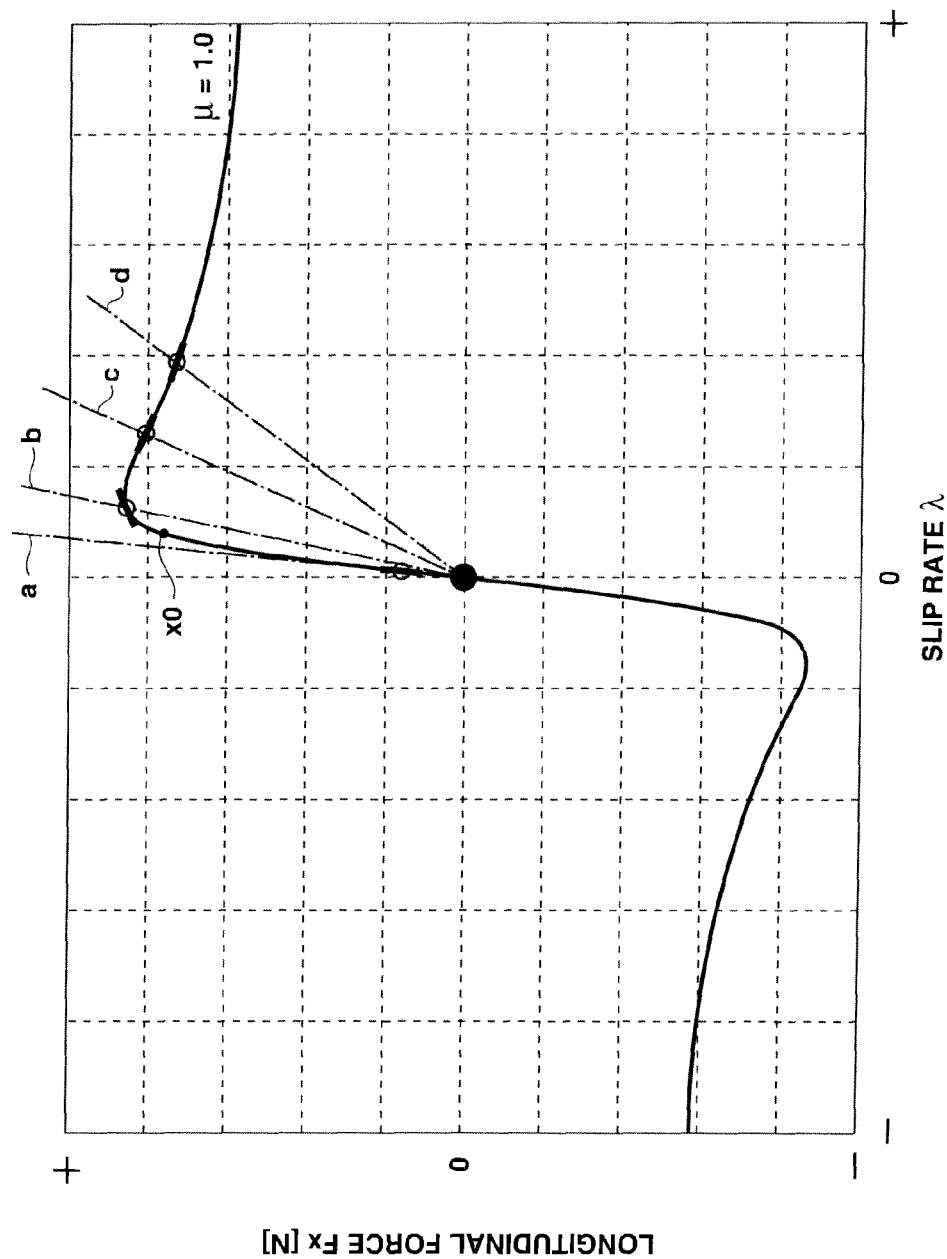
FIG. 1 is a view used for illustrating the underlying technology, and more specifically a characteristic view showing a tire characteristic curve (Fx-λ characteristic curve) between a slip rate λ of a vehicle wheel and a longitudinal force Fx of the vehicle wheel.

(1) Relation Between the Slip Rate of a Wheel and the Longitudinal Force of the Wheel FIG. 1 shows a tire characteristic curve, which represents a general relationship between a drive wheel slip rate or ratio $\lambda$ and a drive wheel longitudinal force (or driving/braking force) Fx. For example, the tire characteristic curve is obtained by using a tire model such as Magic Formula. The longitudinal force Fx is a force acting from the tire to the ground surface. The longitudinal force Fx corresponds to a wheel force acting to a wheel in a ground contact surface, and the wheel slip rate $\lambda$ corresponds to the wheel slip degree or slipping degree.

As shown in FIG. 1, in the tire characteristic curve, the relationship between slip rate $\lambda$ and longitudinal force Fx changes from linear to nonlinear as the absolute value of slip rate $\lambda$ increases. That is, the relationship between slip rate $\lambda$ and longitudinal force Fx is linear when slip rate $\lambda$ is in a predetermined range from zero. The relationship between slip rate $\lambda$ and longitudinal force Fx becomes nonlinear when slip rate $\lambda$ (absolute value) increases to some extent. Thus, the tire characteristic curve includes a linear segment and a nonlinear segment.

In the nonlinear region in the example of FIG. 1, an increase rate of the longitudinal force Fx with respect to slip ratio $\lambda$ becomes smaller in the vicinity of the position where slip rate $\lambda$ is equal to 0.1. In the vicinity of slip ratio $\lambda$ being 0.15, the longitudinal force Fx reaches a greatest value. Thereafter, longitudinal force Fx decreases as slip ratio $\lambda$ increases. Such relation is clear when attention is directed to the slope or gradient of a tangent line to the tire characteristic curve.

The slope of the tangent line to the tire characteristic curve can be expressed by a ratio of a change in slip rate $\lambda$ and a change in longitudinal force Fx, that is a partial differential coefficient of longitudinal force Fx with respect to slip rate $\lambda$. The slope of tangent to the tire characteristic curve can be seen as the slope of a tangent line to the tire characteristic at an intersection point (marked by ○ in FIG. 1) between the tire characteristic curve and an arbitrary straight line a, b, c, d . . . intersecting the tire characteristic curve. It is possible to estimate the frictional state of a tire if a position on such a tire characteristic curve can be determined, that is if slip rate $\lambda$ and longitudinal force Fx are known. When, for example, the location is at a point x0 which is in the nonlinear region on the tire characteristic curve but which is close to the linear region, as shown in FIG. 1, then it is possible to estimate that the tire friction state is stable. From the judgment that the tire friction state is stable, it is possible to estimate that the tire is still at a level capable of achieving its performance properly, or the vehicle is in a stable state.

Figure 2:
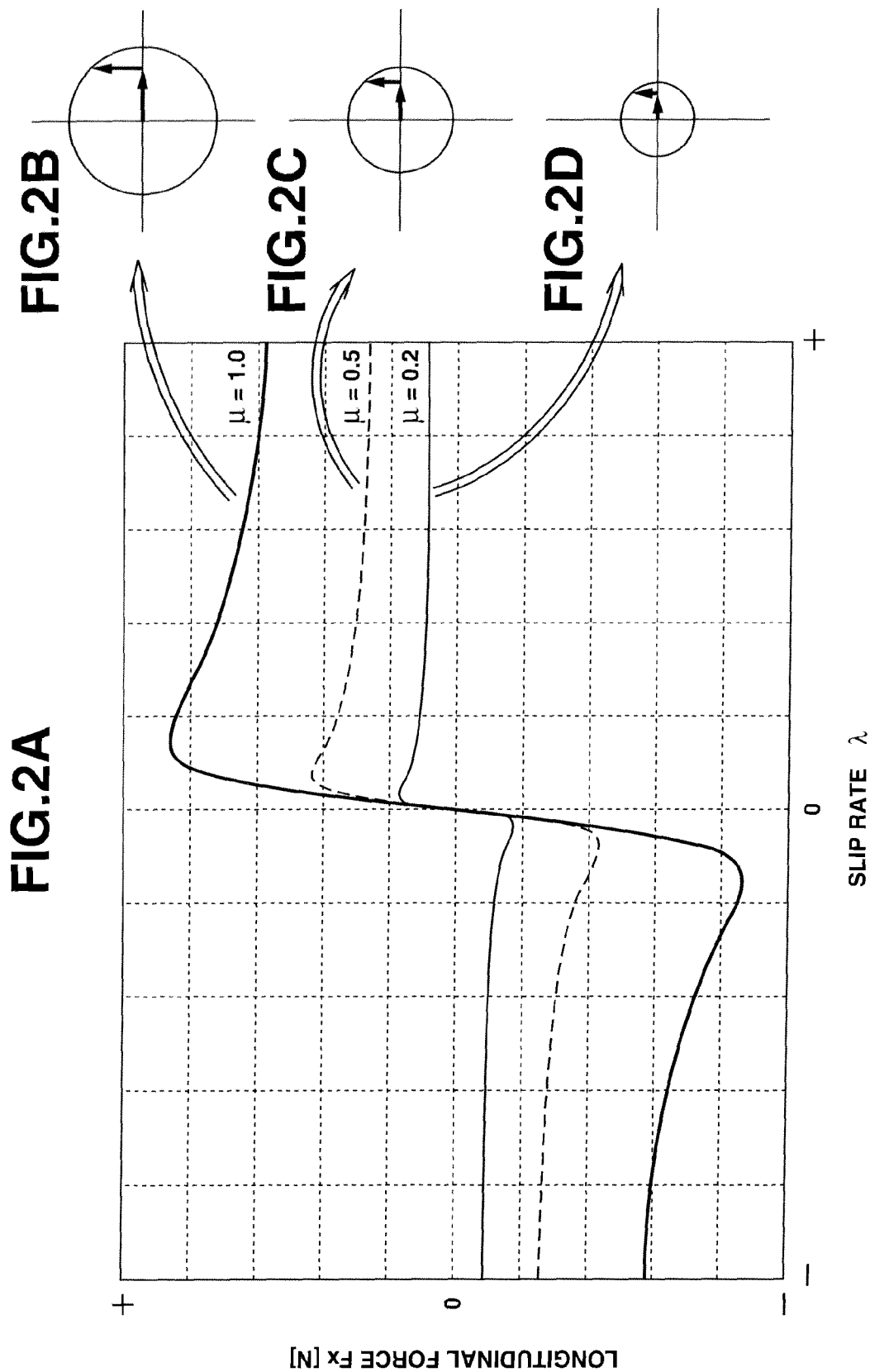
FIG. 2 is a view used for illustrating the underlying technology, and more specifically a characteristic view showing tire characteristic curves (Fx-λ characteristic curves) and friction circles for various values of the road surface μ.

FIG. 2 shows tire characteristic curves and friction circles for various road surface μ values. FIG. 2A shows tire characteristic curves for various road surface μ values, and FIGS. 2B~2D show the friction circles for the various road surface μ values. The road surface μ is equal to 0.2, 05 or 1.0 in this example. As shown in FIG. 2A, the tire characteristic curves for the different road surface friction coefficient μ values have tendencies similar to one another qualitatively. As shown in FIGS. 2B~2D, the friction circle becomes smaller as the road surface μ becomes lower. That is, the lower the road surface friction coefficient μ, the smaller the longitudinal force that can be allowed by the tire. Thus, the tire characteristic is in the form of a characteristic including, as a parameter, the road surface friction coefficient (road surface μ). As shown in FIG. 2, in dependence on the value of the road surface friction coefficient, it is possible to obtain a tire characteristic curve for a low friction, a tire characteristic curve for a medium friction and a tire characteristic curve for a high friction, etc.

Figure 3:
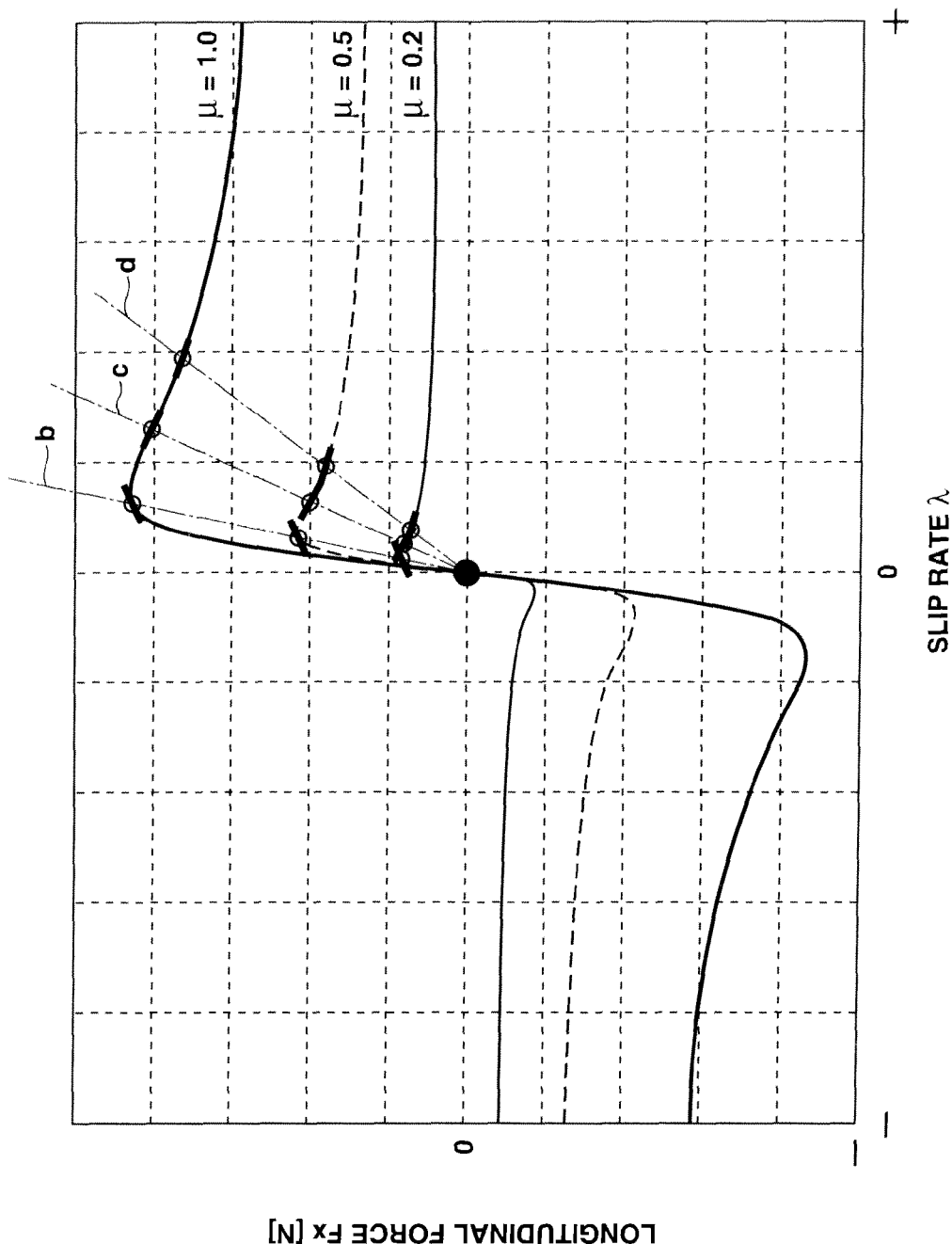
FIG. 3 is a view used for illustrating the underlying technology, and more specifically a characteristic view showing the tangent slope or the slope of a tangent of each of the tire characteristic curves (Fx-λ characteristic curves) of different road surface μ values at an intersection point with a straight line passing through the origin of the tire characteristic curve.

FIG. 3 shows relationships between the tire characteristic curves of different road surface μ values and arbitrary straight lines b, c and d passing through the origin. As shown in FIG. 3, in the same manner as in FIG. 1, the slope of tangent to each of the tire characteristic curves of the different road surface μ values is determined at an intersection point of the tire characteristic curve and each straight line b, c or d. In other words, the respective slopes of tangents to the tire characteristic curves of the different road surface μ values are determined at respective intersection points with the straight line b. The respective slopes of tangents to the tire characteristic curves of the different road surface μ values are determined at respective intersection points with the straight line c. The respective slopes of tangents to the tire characteristic curves of the different road surface μ values are determined at respective intersection points with the straight line d. By determining the slopes of tangents to the tire characteristic curves in this way, it is possible to obtain the result that the slopes of tangents to the tire characteristic curves at intersections of the same straight line are equal to one another.

Figure 4:
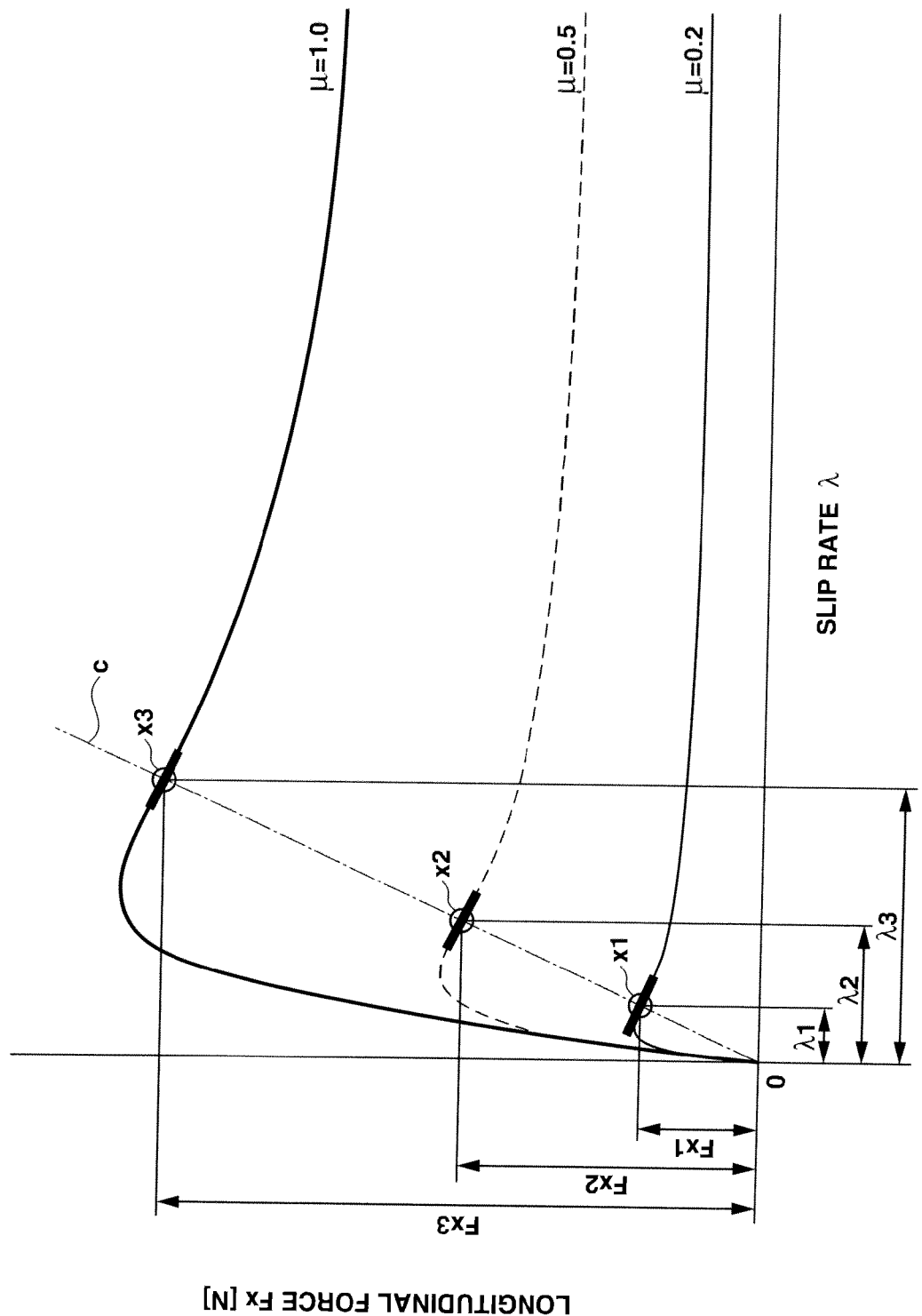
FIG. 4 is a view used for illustrating the underlying technology, and more specifically another characteristic view showing the tangent slope of each of the tire characteristic curves of different road surface μ values at an intersection point with a straight line passing through the original of the tire characteristic curve.

In FIG. 4, attention is paid to the straight line c shown in FIG. 3, as an example. As shown in FIG. 4, the slopes of tangents to the tire characteristic curves of the different road surface μ values at intersection points with the straight line c are equal to one another. In other words, the ratio (Fx1/$\lambda$1) of the longitudinal force Fx1 and slip rate $\lambda$1 determining the intersection point x1 with the tire characteristic curve of the road surface μ=0.2, the ratio (Fx2/$\lambda$2) of the longitudinal force Fx2 and slip ratio $\lambda$2 determining the intersection point x2 with the tire characteristic curve of the road surface μ=0.5 and the ratio (Fx3/$\lambda$3) of the longitudinal force Fx3 and slip rate $\lambda$3 determining the intersection point x3 with the tire characteristic curve of the road surface μ=1.0 are all equal to the same value. The slopes of the tire characteristic curves of the different road surface μ values are equal to one another at these intersection points x1, x2 and x3.

Figure 5:
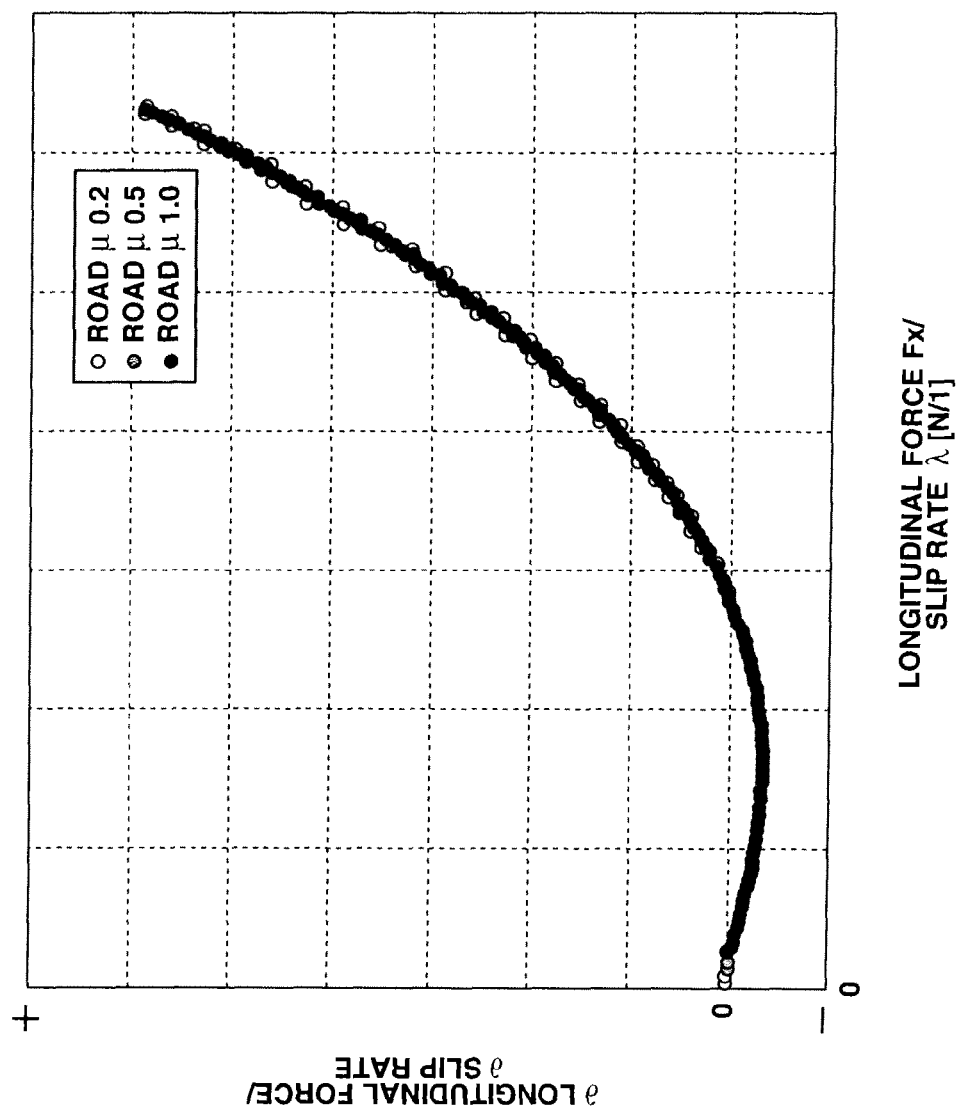
FIG. 5 is a view used for illustrating the underlying technology, and more specifically a view showing a characteristic composed of a set of plot points between a ratio (Fx/λ) of a longitudinal force Fx and a slip rate λ representing an intersection point of an arbitrary straight line and a tire characteristic curve (Fx-λ characteristic curve), and the tangent slope (μ gradient) of the tire characteristic curve at the intersection point.

FIG. 5 shows a relationship of the ratio (Fx/$\lambda$) of longitudinal force Fx to slip rate $\lambda$ expressing an intersection point between an arbitrary straight line and a tire characteristic curve, and the tangent slope (∂longitudinal force/∂slip rate) of the tire characteristic curve at the intersection point. In FIG. 5, values obtained with various road surface μ values (μ=0.2, 0.5, and 1.0, in this example) are plotted. As shown in FIG. 5 without regard to the road surface μ, there is an invariable relationship between the ratio (Fx/λ) of longitudinal force Fx to slip rate λ, and the tangent slope of the tire characteristic curve.

Figure 6:
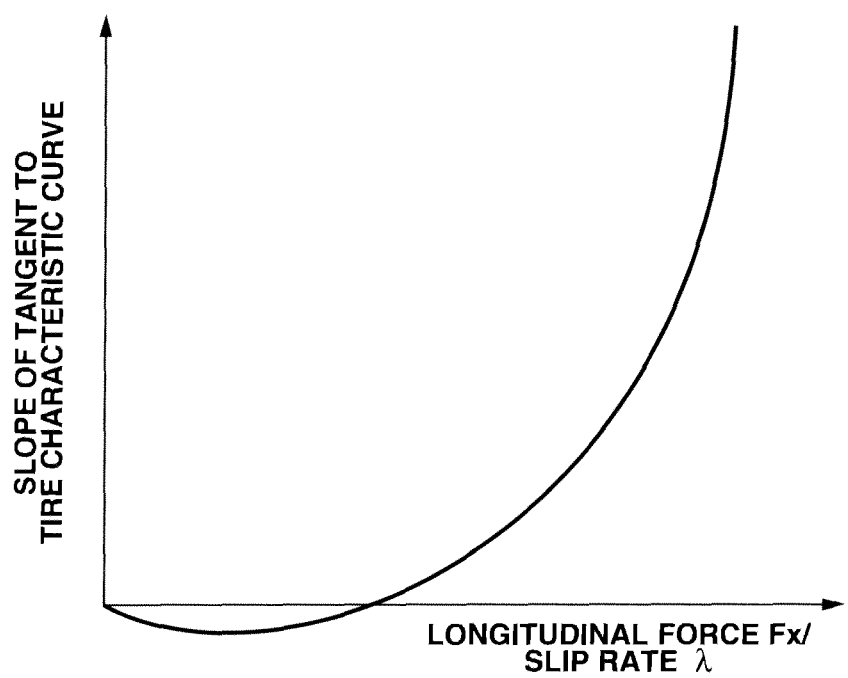
FIG. 6 is a view used for illustrating the underlying technology, and more specifically a characteristic view showing a characteristic curve (grip characteristic curve, 2D μ gradient characteristic map) obtained from the plot points of FIG. 5.

FIG. 6 shows a characteristic curve obtained from plot points of FIG. 5. As shown in FIG. 6, this characteristic curve shows that the ratio (Fx/λ) of longitudinal force Fx to slip rate λ, and the tangent slope of the tire characteristic curve are related with each other by a constant relation without regard to the road surface μ. Therefore, the characteristic curve of FIG. 6 is valid and proper even on road surfaces of different friction coefficient μ values such as a dry asphalt road surface and icy road surface. That is, the tire characteristic curve shown in FIG. 6 includes a high friction tire characteristic curve for a high friction road surface having a higher friction coefficient and a low friction tire characteristic curve for a low friction road surface having a lower friction coefficient lower than the higher friction coefficient. This tire characteristic curve is characterized in that the slope is not influenced by the road surface μ. That is, this characteristic curve is characterized in that the slope can be determined without the need for obtaining or estimating the information on the road surface condition. The tire characteristic curve of FIG. 6 represents a tire characteristic curve like FIG. 1. However, the tire characteristic curve of FIG. 6 can be referred to as a grip characteristic curve, for example, as distinguished from FIG. 1.

In the characteristic curve of FIG. 6, the tangent slope of the tire characteristic curve is negative in the region (smaller ratio region) in which the ratio (Fx/λ) of longitudinal force Fx and slip rate λ is small. In this region, as the ratio (Fx/λ) becomes greater, the tangent slope of the tire characteristic curve (corresponding to the grip characteristic parameter) first decreases, and then starts increasing. The negative tangent slope of the tire characteristic curve means that the partial differential coefficient of the longitudinal force with respect to the slip rate is negative.

In a region (greater ratio region) in which the ratio (Fx/λ) of longitudinal force Fx and slip rate λ is greater, the tangent slope of the tire characteristic curve is positive. In this region, the tangent slope of the tire characteristic curve increases as the ratio (Fx/λ) becomes greater. In the region in which the ratio (Fx/λ) of longitudinal force Fx and slip rate λ is great, the characteristic curve of FIG. 6 is in the form of a monotone increasing function.

The positive tangent slope of the tire characteristic curve means that the partial differential coefficient of the longitudinal force with respect to the slip rate is positive. Moreover, the greatest value of the tangent slope of the tire characteristic curve means that the tangent slope is the slope of the linear region of the tire characteristic curve. In the linear region, the tangent slope of the tire characteristic curve is constant without regard to the ratio of longitudinal force Fx and slip rate λ.

The tangent slope of the thus-obtained tire characteristic curve is a grip characteristic parameter, a variable representing the tire grip state or a parameter representing a saturation state of the tire force which can produced by the tire in the lateral direction. In particular, this parameter represents following tendencies. In the case of the positive region, the longitudinal force Fx can be further increased by increasing slip rate λ. In the case of the zero or negative region, even if the slip rate λ is increased, the longitudinal force Fx is not increased, but the longitudinal force Fx may be decreased.

The grip characteristic curve (FIG. 6) can be obtained by performing the partial differentiation to the tire characteristic curve (FIG. 1) and tracing continuously.

As mentioned above, the inventors of the present application has found that, as to the tire characteristic curves of various road surface μ values, the slopes of tangents become equal to one another at intersection points each of which is an intersection point between a given straight line passing through the origin of each characteristic curve and the tire characteristic curve. Then, the inventors of the present application have come to the conclusion that the relationship between the ratio Fx/λ of longitudinal force Fx to slip rate λ and the tangent slope of the tire characteristic curves can be expressed by a characteristic curve (grip characteristic curve) (FIG. 6) without regard to the road surface μ. With this characteristic curve, it is possible to obtain information on the tire frictional condition, if the longitudinal force Fx and slip rate λ are known, without the need for the information of the road surface μ. The process of obtaining the information on the tire frictional condition is explained with reference to FIG. 7.

Figure 7A:
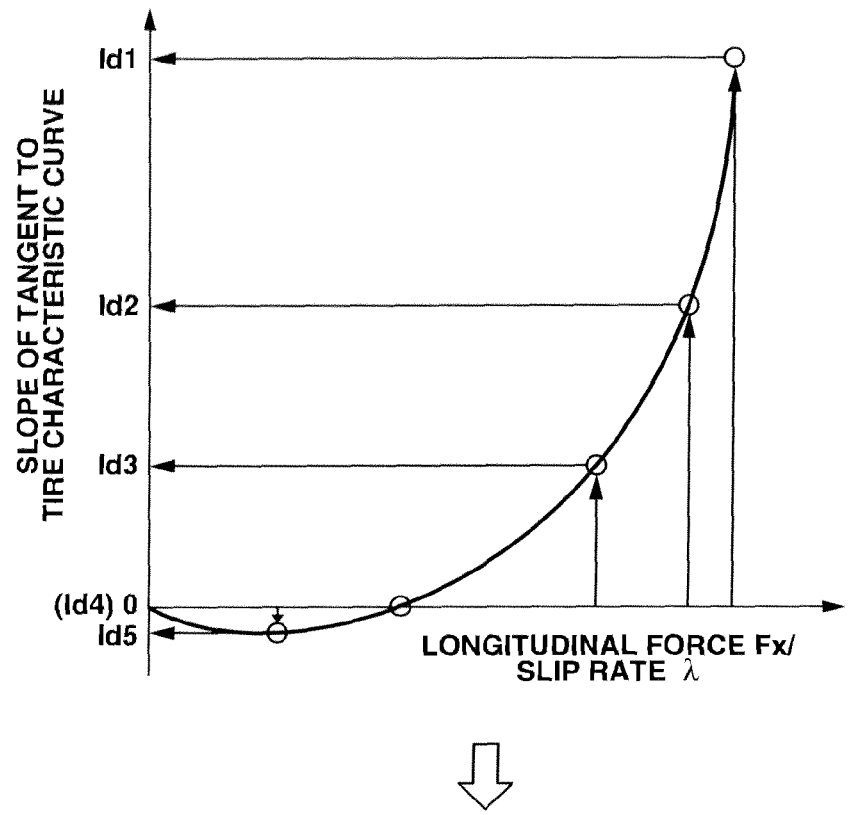
FIG. 7 is a view used for illustrating the underlying technology, and more specifically a view used for explaining a process of determining the tangent slope (μ gradient) of the tire characteristic curve (Fx-λ characteristic curve) from the longitudinal force Fx and slip rate λ.
Figure 7B:
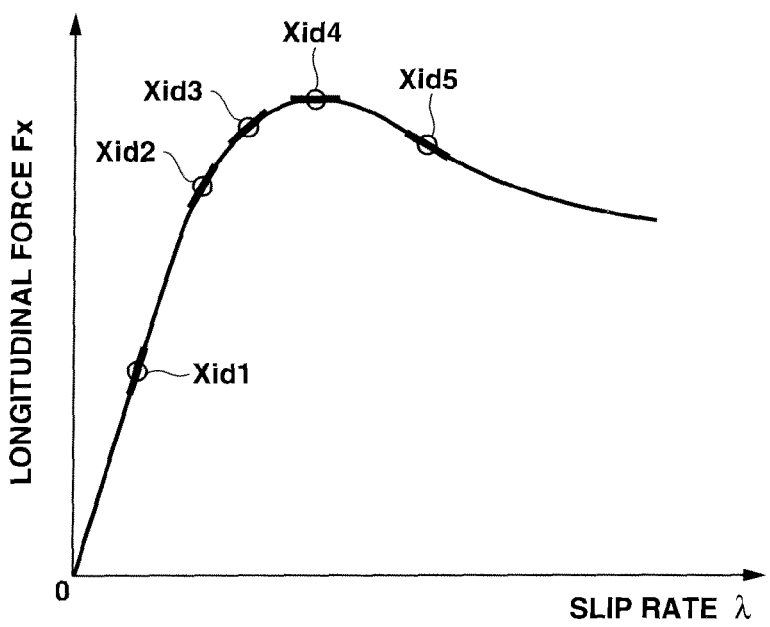

First, longitudinal force Fx and slip rate λ are sensed. Then, by using a characteristic curve shown in FIG. 7A (similar to the characteristic curve of FIG. 6), it is possible to determine the tangent slope of the tire characteristic curve corresponding to the sensed longitudinal force Fx and slip rate λ (corresponding to Fx/λ). For example, as shown in FIG. 7A, tire characteristic curve tangent slopes Id1, Id2, Id3, Id4 and Id5 are obtained. From these tire characteristic curve tangent slopes, it is possible to determine the positions on a tire characteristic curve of a road surface μ, as shown in FIG. 7B. For example, it is possible to specify positions Xid1, Xid2, Xid3, Xid4 and Xid5 corresponding to the tire characteristic curve tangent slopes Id1, Id2, Id3, Id4 and Id5. The position on the tire characteristic curve represents the frictional state and the ability of a tire at a road surface μ at which the tire characteristic curve is valid. Accordingly, it is possible to know the tire frictional state and the ability (such as the ability of gripping) of the tire by determining a position on the tire characteristic curve as shown in FIG. 7B at the road surface μ of the tire characteristic curve. When, for example, the tangent slope of the tire characteristic curve is negative or close to zero (Id4 or Id5, for example), it is possible to judge, from the position (Xid4 or Xid5, for example) determined from the tangent slope, that the grip force of the tire is in a limit region or critical region. As a result, even when the grip force of the wheel is in the limit region, it is possible to estimate the margin to the friction limit of the tire grip force properly.

By this process, if longitudinal force Fx and slip rate λ are known, it is possible to determine the frictional state and ability of the tire at the road surface μ at which the longitudinal force Fx and slip rate λ are obtained, by using the characteristic curve (grip characteristic curve).

FIG. 8 shows a relation with a friction circle. FIG. 8A shows a relationship between the ratio (Fx/λ) between longitudinal force Fx and slip rate λ, and the tire characteristic curve tangent slope (like FIG. 6). FIG. 8B shows a tire characteristic curve, and FIG. 8(c) shows a friction circle. In these relationships, first, the tire characteristic curve tangent slope Id corresponding to the longitudinal force Fx and slip rate λ (corresponding to Fx/λ) is obtained (FIG. 8A). Accordingly, the position on the tire characteristic curve can be determined (FIG. 8B). Furthermore, a relative value of the longitudinal force in the friction circle can be determined. That is, it is possible to determine a margin M to the longitudinal force which can be allowed by the tire. The tangent slope of the tire characteristic curve represents the rate of change of the longitudinal force Fx with respect to a change in slip rate λ. Therefore, the value, along the vertical axis, of the characteristic curve shown in FIG. 8A (the tire characteristic curve tangent slope can be regarded as a quantity indicative of a varying speed of a vehicle behavior.

Figure 9:
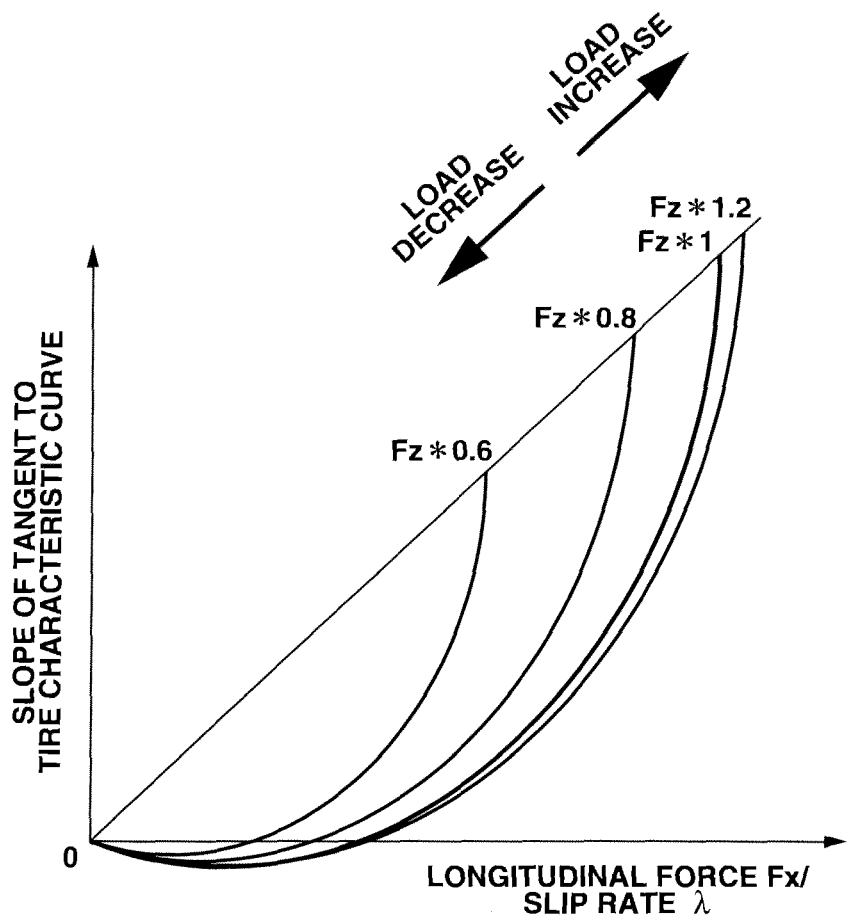
FIG. 9 is a view used for illustrating the underlying technology, and more specifically a characteristic view showing a relationship between the ratio (Fx/λ) of longitudinal force Fx and slip rate λ and the slope of tangent (μ gradient) to the tire characteristic curve obtained when a wheel load is varied.

Furthermore, a relation between the ratio (Fx/λ) of longitudinal force Fx and slip rate λ and the tire characteristic curve tangent slope has been ascertained when a wheel load is varied, by a process similar to the before-mentioned process. FIG. 9 shows this relation. In this example, the wheel load is varied by multiplying an initial value Fz of the wheel load (the value of the wheel load obtained when there is no variation), by 0.6, 0.8 and 1.2. In the case of multiplication by 1.0, the wheel load is equal to the initial value Fz. When the wheel load of the tire becomes smaller, the tire characteristic curve tangent slope obtained by each wheel load value becomes smaller, as shown in FIG. 9. In this case, the greatest value of the tire characteristic curve tangent slope obtained by each wheel load value (the value of the linear region) is moved on a straight line passing through the original of the characteristic view. Moreover, the characteristic curve representing the relationship between the ratio (Fx/λ) of longitudinal force Fx and slip rate λ and the tire characteristic curve tangent slope (the slope of a tangent to the tire characteristic curve) is varied in the size while the shape is maintained, so that the forms are like similar figures having different sizes. The inventors of the present application have found such relation with the wheel load, too.

(2) Relation Between Wheel Slip Angle and Wheel Lateral Force

Figure 10:
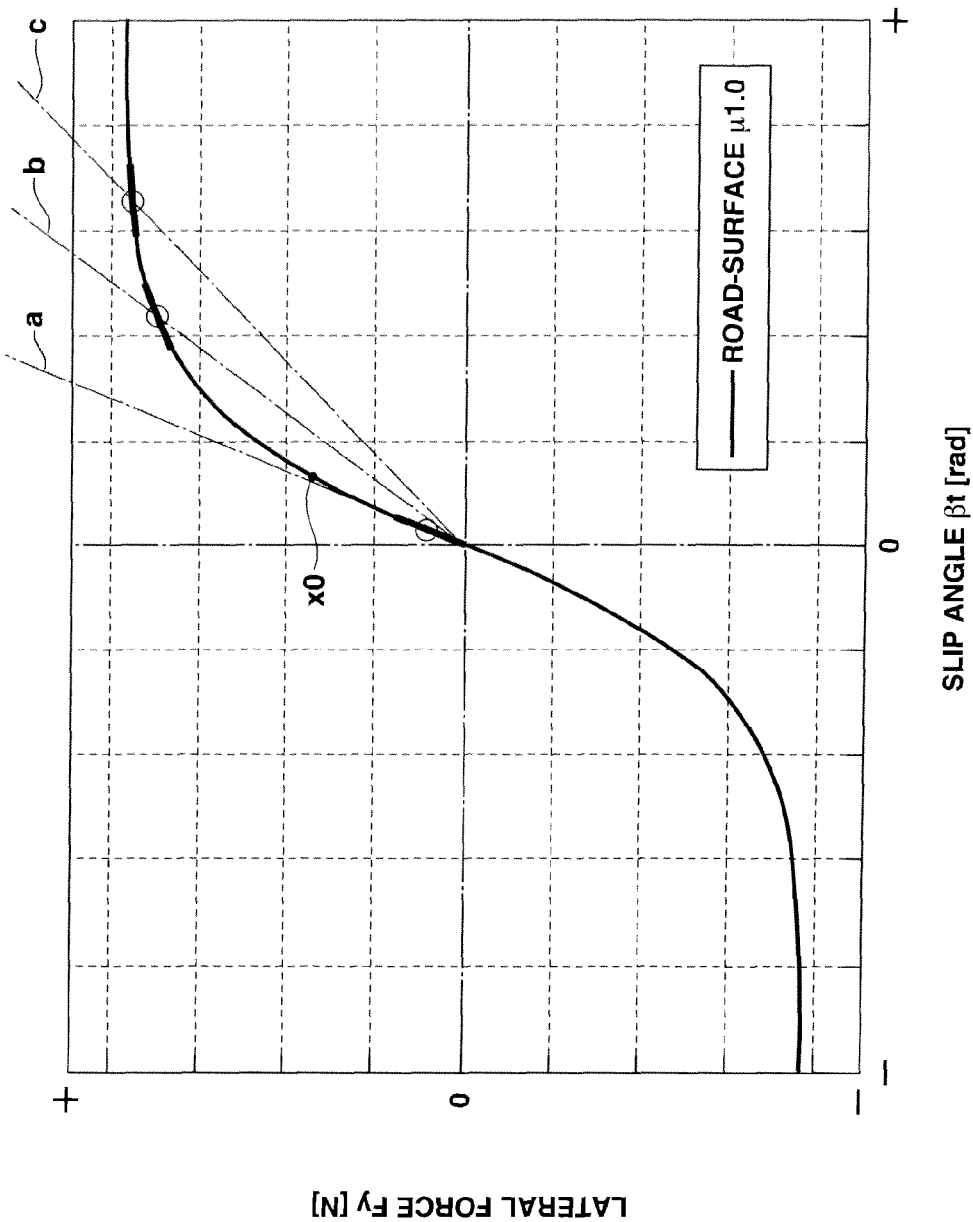
FIG. 10 is a view used for illustrating the underlying technology, and more specifically a characteristic view showing a tire characteristic curve (Fy-βt characteristic curve) between a slip angle βt of a vehicle wheel and a lateral force Fy of the vehicle wheel.

FIG. 10 shows a tire characteristic curve, which represents a general relationship between a wheel slip angle βt and a lateral force Fy of a wheel. For example, by tuning a tire model in accordance with experimental data, it is possible to obtain an equivalent characteristic diagram (tire characteristic curve) for two wheels corresponding to front and rear wheels. The tire model is constructed on the basis of Magic-Fomula, for example. Lateral force Fy is a quantity typified by a cornering force and a side force. Lateral force Fy is a force acting from the tire to the ground surface. The lateral force Fy corresponds to a wheel force acting on a wheel in a ground contact surface, and the wheel slip angle βt corresponds to a wheel slip degree or wheel slipping degree.

As shown in FIG. 10, in the tire characteristic curve, the relationship between slip angle βt and lateral force Fy changes from linear to nonlinear as the absolute value of slip angle βt increases. That is, the relationship between slip angle βt and lateral force Fy is linear when slip angle βt is in a predetermined range from zero. The relationship between slip angle βt and lateral force Fy becomes nonlinear when slip angle βt (absolute value) increases to some extent. Thus, the tire characteristic curve includes a linear segment and a nonlinear segment.

The transition from a linear form to a nonlinear form is clear when attention is paid to the slope (gradient) of a tangent line tangent to the tire characteristic curve. The slope of the tangent line to the tire characteristic curve can be expressed by a ratio of a change in slip angle βt and a change in lateral force Fy, that is a partial differential coefficient of lateral force Fy with respect to slip angle βt. The slope of tangent to the tire characteristic curve can be seen as the slope of a tangent line to the tire characteristic at an intersection point (marked by o in FIG. 10) between the tire characteristic curve and an arbitrary straight line a, b, c . . . intersecting the tire characteristic curve. It is possible to estimate the frictional state of a tire if a position on such a tire characteristic curve is determined, that is if slip angle βt and lateral force Fy are known. When, for example, the location is at a point x0 which is in the nonlinear region on the tire characteristic curve but which is close to the linear region, as shown in FIG. 10, then it is possible to estimate that the tire friction state is stable. From the judgment that the tire friction state is stable, it is possible to estimate that the tire is still at a level capable of achieving its performance properly, or the vehicle is in a stable state.

Figure 11:
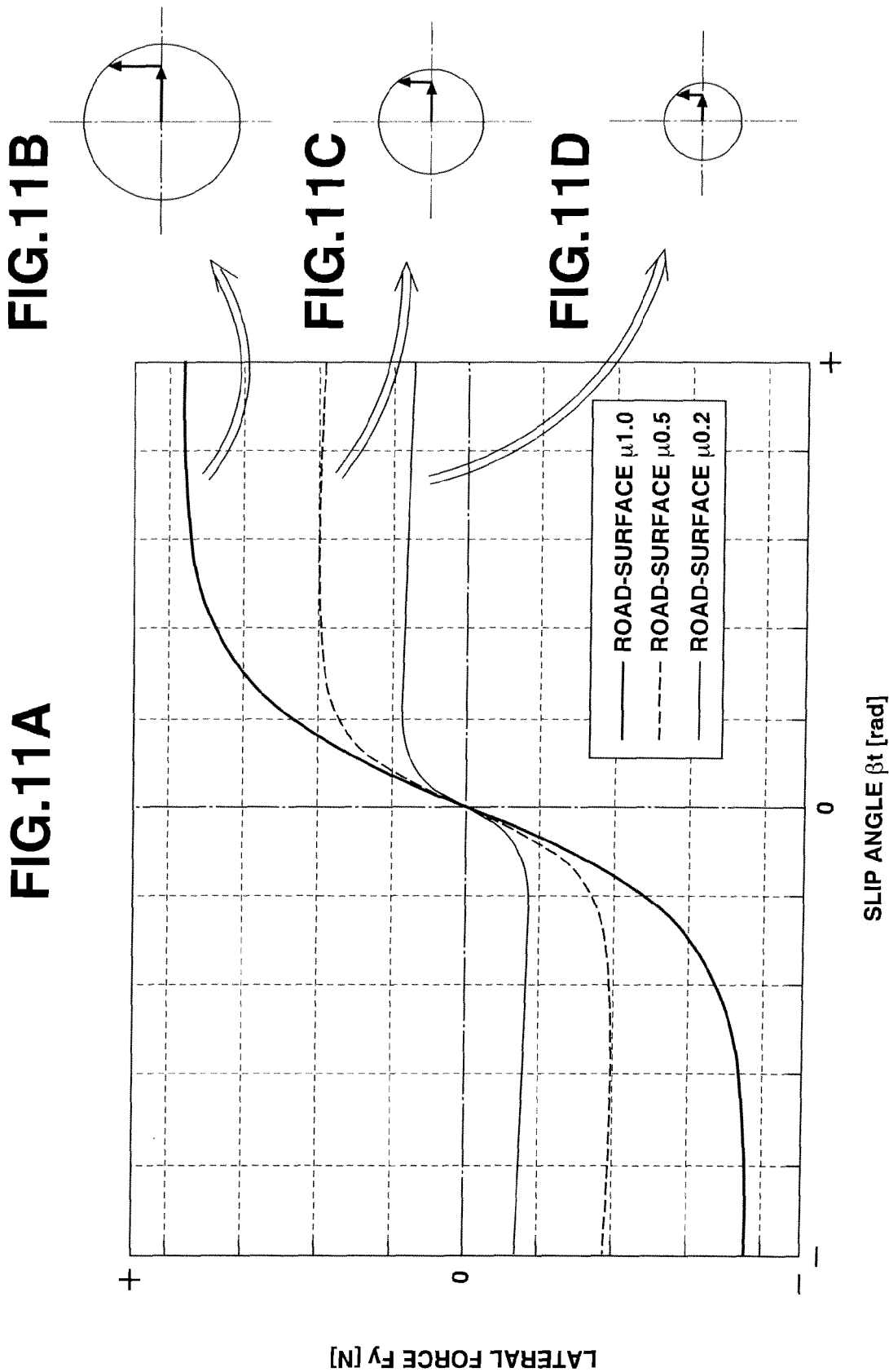
FIG. 11 is a view used for illustrating the underlying technology, and more specifically a characteristic view showing tire characteristic curves (Fy-βt characteristic curves) and friction circles for various values of the road surface μ.

FIG. 11 shows tire characteristic curves and friction circles for various road surface μ values. FIG. 11A shows tire characteristic curves for various road surface μ values, and FIGS. 11B, 11C and 11D show the friction circles for the various road surface μ values. The road surface μ is equal to 0.2, 05 or 1.0 in this example. As shown in FIG. 11A, the tire characteristic curves for the different road surface friction coefficient μ values have tendencies similar to one another qualitatively. As shown in FIGS. 11B~11D, the friction circle becomes smaller as the road surface μ becomes lower. Namely, the lower the road surface friction coefficient μ, the smaller the lateral force that can be allowed by the tire. Thus, the tire characteristic is a characteristic including, as a parameter, the road surface friction coefficient (road surface μ). In dependence on values of the road surface friction coefficient, there are provided a lower friction tire characteristic curve for a lower friction, a medium friction tire characteristic curve for a medium friction and a higher friction tire characteristic for a higher friction, as shown in FIG. 11.

Figure 12:
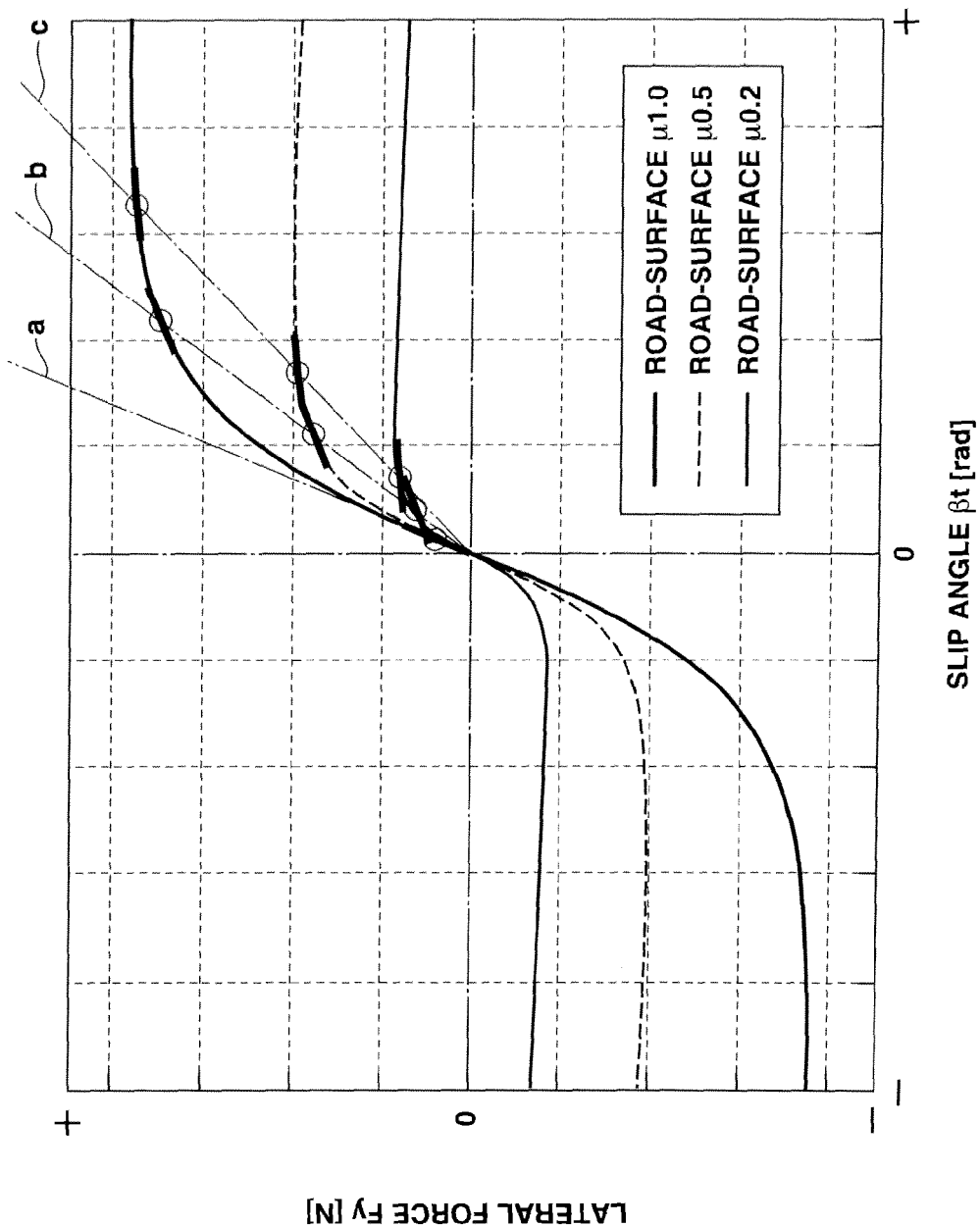
FIG. 12 is a view used for illustrating the underlying technology, and more specifically a characteristic view showing tangent slopes of tire characteristic curves (Fy-βt characteristic curves) of different road surface μ values at intersection points with a straight line passing through the origin of the tire characteristic curve.

FIG. 12 shows relationships between the tire characteristic curves of different road surface μ values and arbitrary straight lines a, b and c passing through the origin. As shown in FIG. 12, in the same manner as in FIG. 10, the slope of tangent to each of the tire characteristic curves of the different road surface μ values is determined at an intersection point of the tire characteristic curve and each straight line a, b or c. In other words, the respective slopes of tangents to the tire characteristic curves of the different road surface μ values are determined at respective intersection points with the straight line a. The respective slopes of tangents to the tire characteristic curves of the different road surface μ values are determined at respective intersection points with the straight line b. The respective slopes of tangents to the tire characteristic curves of the different road surface μ values are determined at respective intersection points with the straight line c. By determining the slopes of tangents to the tire characteristic curves in this way, it is possible to obtain the result that the slopes of tangents to the tire characteristic curves at intersections of the same straight line are equal to one another.

Figure 13:
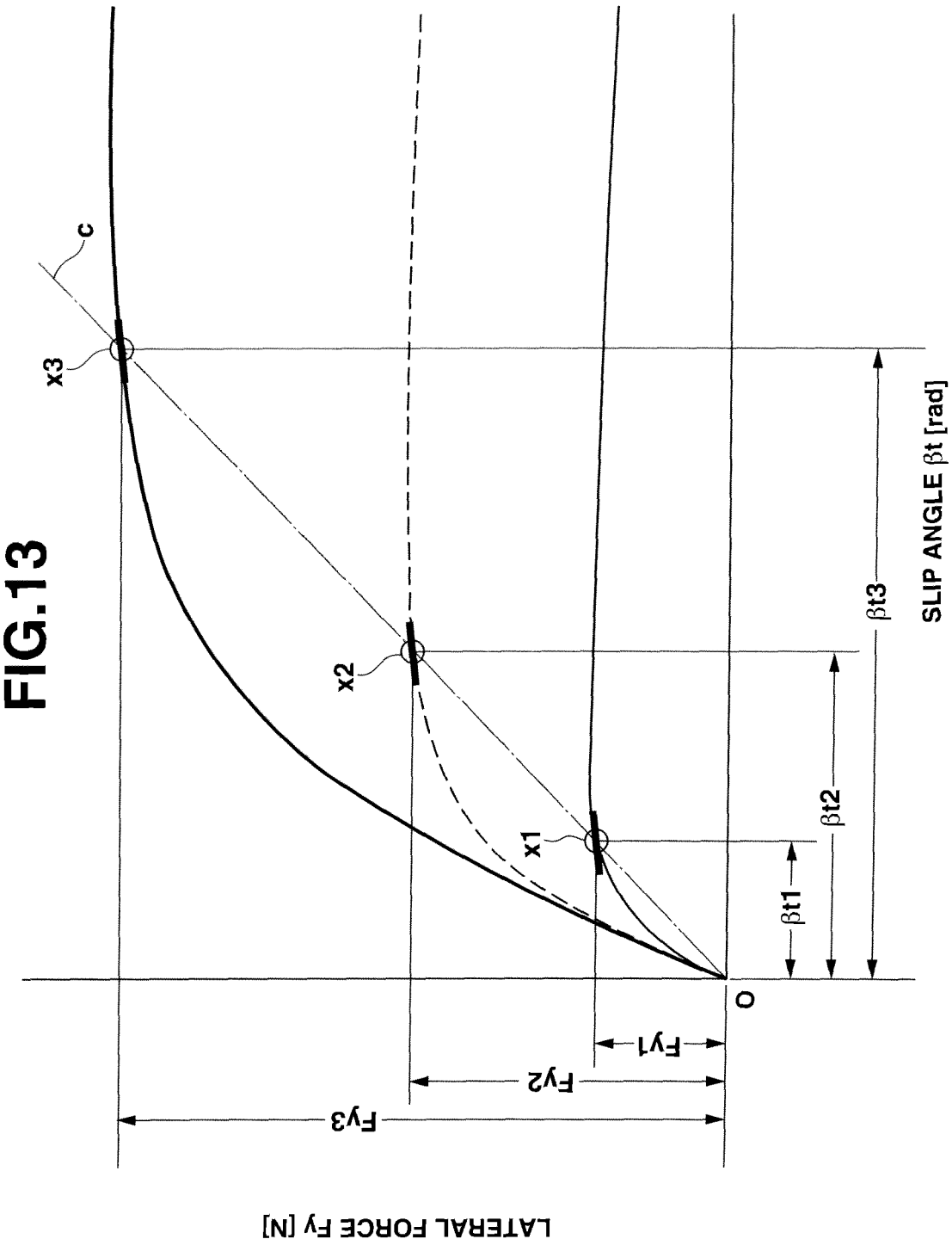
FIG. 13 is a view used for illustrating the underlying technology, and more specifically another characteristic view showing the tangent slope of each of tire characteristic curves (Fy-βt characteristic curves) of different road surface μ values at an intersection point with a straight line passing through the origin of the tire characteristic curve.

In FIG. 13, attention is paid to the straight line c shown in FIG. 12, as an example. As shown in FIG. 13, the slopes of tangents to the tire characteristic curves of the different road surface μ values at intersection points with the straight line c are equal to one another. In other words, the ratio (Fy1/βt1) of the lateral force Fy1 and slip angle βt1 determining the intersection point x1 with the tire characteristic curve of the road surface μ=0.2, the ratio (Fy2/(βt2) of the lateral force Fy2 and slip angle βt2 determining the intersection point x2 with the tire characteristic curve of the road surface μ=0.5 and the ratio (Fy3/βt3) of the lateral force Fy3 and slip angle βt3 determining the intersection point x3 with the tire characteristic curve of the road surface μ=1.0 are all equal to the same value. The tire characteristic curves of the different road surface μ values have the same slope of tangent at these intersection points x1, x2 and x3.

Figure 14:
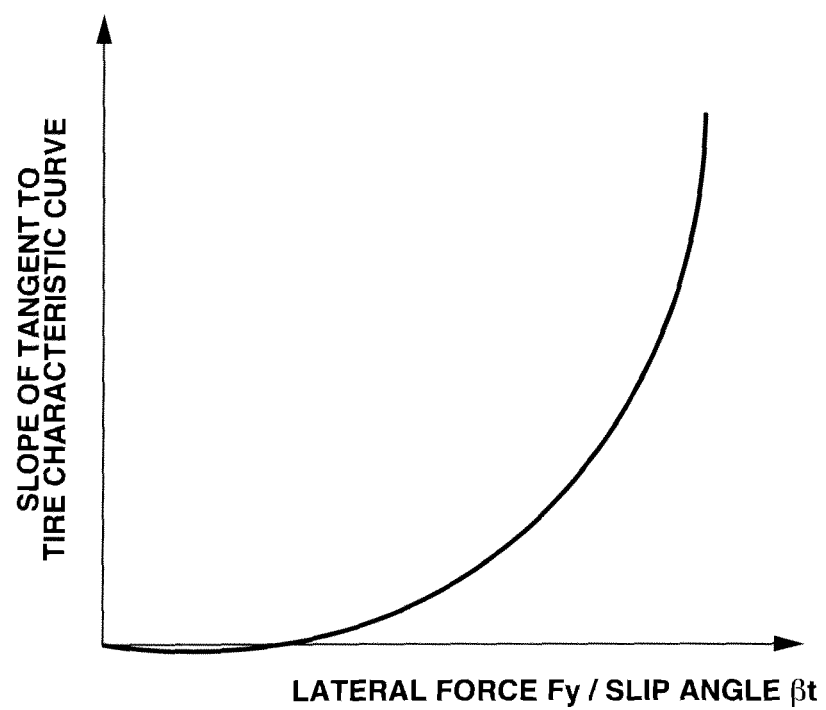
FIG. 14 is a view used for illustrating the underlying technology, and more specifically a characteristic view showing a relationship (grip characteristic curve, 2D μ gradient characteristic map) between a ratio (Fy/βt) of a lateral force Fy and a slip angle βt representing an intersection point of an arbitrary straight line and a tire characteristic curve (Fy-βt characteristic curve), and the tangent slope (μ gradient) of the tire characteristic curve at the intersection point.

FIG. 14 shows a relationship of the ratio (Fy/βt) of lateral force Fy to slip angle βt expressing an intersection point between an arbitrary straight line and a tire characteristic curve, and the tangent slope (∂Fy/∂βt) of the tire characteristic curve at the intersection point. As shown in FIG. 14, without regard to the value of the road surface μ (μ=0.2, 0.5 or 1.0, for example), there is an invariable relationship between the ratio (Fy/βt) of lateral force Fy to slip angle βt, and the tangent slope of the tire characteristic curve. Therefore, the characteristic curve of FIG. 14 is valid and proper even on road surfaces of different friction coefficient μ values such as a dry asphalt road surface and icy road surface. That is, the tire characteristic curve shown in FIG. 14 includes a high friction tire characteristic curve for a high friction road surface having a higher friction coefficient and a low friction tire characteristic curve for a low friction road surface having a lower friction coefficient lower than the higher friction coefficient. This tire characteristic curve is characterized in that the slope is not influenced by the road surface μ. That is, this characteristic curve is characterized in that the slope can be determined without the need for obtaining or estimating the information on the road surface condition. The tire characteristic curve of FIG. 14 represents a tire characteristic curve like FIG. 10. However, the characteristic curve of FIG. 14 can be referred to as a grip characteristic curve, for example, as distinguished from the tire characteristic curve of FIG. 10.

In the characteristic curve of FIG. 14, the tangent slope of the tire characteristic curve (corresponding to the grip characteristic parameter) is negative in the region (smaller ratio region) in which the ratio (Fy/βt) of lateral force Fy and slip angle βt is small. In this region, as the ratio (Fy/βt) becomes greater, the tangent slope of the tire characteristic curve first decreases, and then starts increasing. The negative tangent slope of the tire characteristic curve means that the partial differential coefficient of the lateral force with respect to the slip angle is negative.

In a region (greater ratio region) in which the ratio (Fy/βt) of lateral force Fy and slip angle βt is greater, the tangent slope of the tire characteristic curve becomes positive. In this region, the tangent slope of the tire characteristic curve increases as the ratio (Fy/βt) becomes greater. In the region in which the ratio (Fy/βt) of lateral force Fy and slip angle βt is greater, the characteristic curve of FIG. 14 is in the form of a monotone increasing function.

The positive tangent slope of the tire characteristic curve means that the partial differential coefficient of the lateral force with respect to the slip angle is positive. Moreover, the greatest value of the tangent slope of the tire characteristic curve means that the tangent slope is the slope of the linear region of the tire characteristic curve. In the linear region, the tangent slope of the tire characteristic curve is constant without regard to the ratio of lateral force Fy and slip angle βt.

The tangent slope of the thus-obtained tire characteristic curve is a grip characteristic parameter, a variable representing the tire grip state or a parameter representing a saturation state of the tire force which can produced by the tire in the lateral direction. In particular, this parameter represents following tendencies. In the case of the positive region, the lateral force Fy (cornering force) can be further increased by increasing slip angle βt. In the case of the zero or negative region, even if the slip angle βt is increased, the lateral force Fy (cornering force) is not increased, but the lateral force Fy may be decreased.

The grip characteristic curve (FIG. 14) can be obtained by performing the partial differentiation to the tire characteristic curve (FIG. 10) and tracing continuously. As mentioned above, the inventors of the present application has found that, as to the tire characteristic curves of various road surface μ values, the slopes of tangents become equal to one another at intersection points between a given straight line passing through the origin and the respective tire characteristic curves. Then, the inventors of the present application have come to the conclusion that the relationship between the ratio Fy/βt of lateral force Fy to slip angle βt and the tangent slope of the tire characteristic curves can be expressed by a characteristic curve (grip characteristic curve) (FIG. 14) without regard to the road surface μ. With this characteristic curve, it is possible to obtain information on the tire frictional condition from the lateral force Fy and slip angle βt, without the need for the information of the road surface μ. The process of obtaining the information on the tire frictional condition is explained with reference to FIG. 15.

Figure 15A:
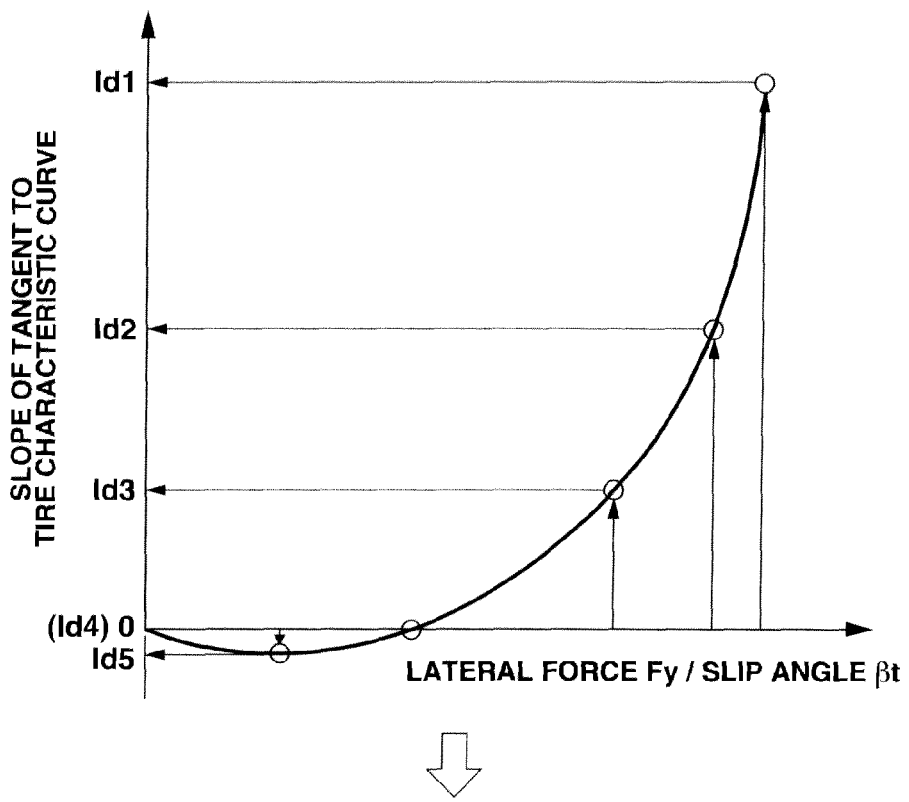
FIG. 15 is a view used for illustrating the underlying technology, and more specifically a view used for explaining a process of determining the tangent slope of the tire characteristic curve (Fy-βt characteristic curve) from lateral force Fy and slip angle βt.
Figure 15B:
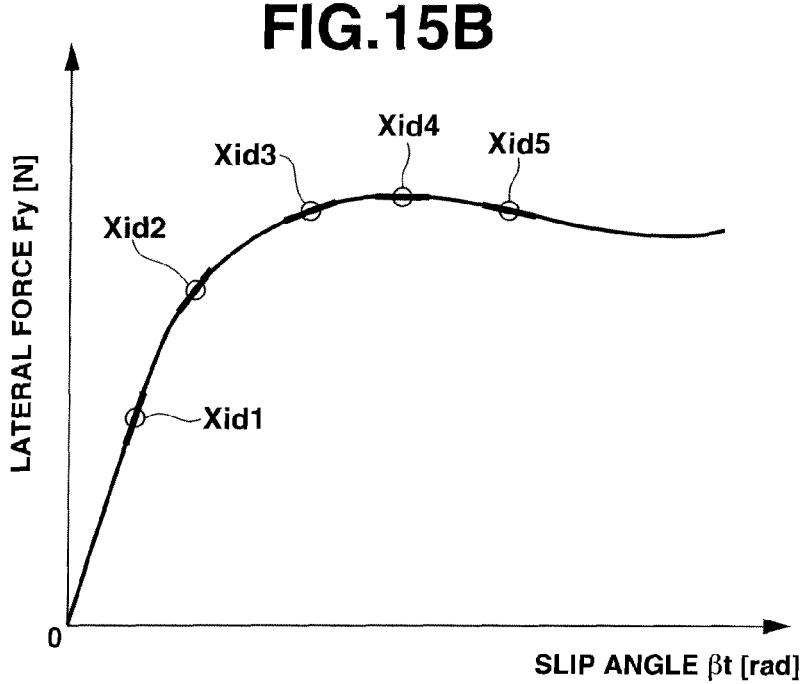

First, lateral force Fy and slip angle βt are sensed. Then, by using a characteristic curve shown in FIG. 15A (similar to the characteristic curve of FIG. 14), it is possible to determine the tangent slope of the tire characteristic curve corresponding to the sensed lateral force Fy and slip angle βt (corresponding to Fy/βt). For example, as shown in FIG. 15A, tire characteristic curve tangent slopes Id1, Id2, Id3, Id4 and Id5 are obtained. From these tire characteristic curve tangent slopes, it is possible to determine the positions on a tire characteristic curve of a road surface μ, as shown in FIG. 15B. For example, it is possible to specify positions Xid1, Xid2, Xid3, Xid4 and Xid5 corresponding to the tire characteristic curve tangent slopes Id1, Id2, Id3, Id4 and Id5. The position on the tire characteristic curve represents the frictional state and the ability of a tire at a road surface μ at which the tire characteristic curve is valid. Accordingly, it is possible to know the tire frictional state and the ability (such as the ability of gripping) of the tire by determining a position on the tire characteristic curve as shown in FIG. 15B at the road surface μ of the tire characteristic curve. When, for example, the tangent slope of the tire characteristic curve is negative or close to zero (Id4 or Id5, for example), it is possible to judge, from the position (Xid4 or Xid5) determined from the tangent slope, that the lateral force of the tire is in a limit region of critical region. As a result, even when the gripping force of the wheel is in the limit region, it is possible to estimate the margin of the tire to the friction limit of the gripping force properly.

By this process, if lateral force Fy and slip angle βt are known, it is possible to determine the frictional state and ability of the tire at the road surface μ at which the lateral force Fy and slip angle βt are obtained, by using the characteristic curve (grip characteristic curve).

Figure 16A:
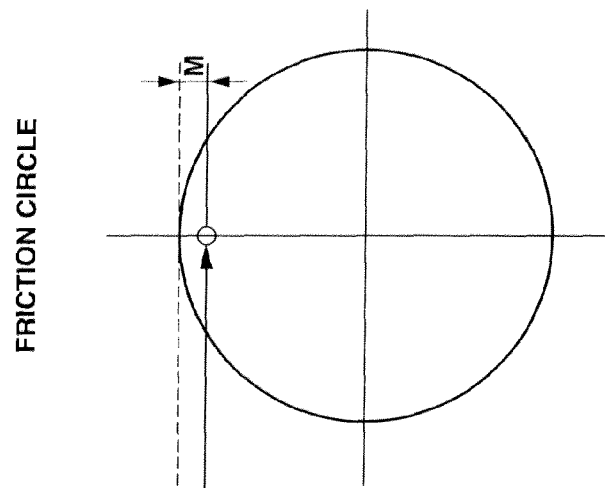
FIG. 16 is a view used for illustrating the underlying technology, and more specifically a view for showing relation among the characteristic curve (μ gradient characteristic map), tire characteristic curve (Fy-βt characteristic curve) and friction circle.
Figure 16B:
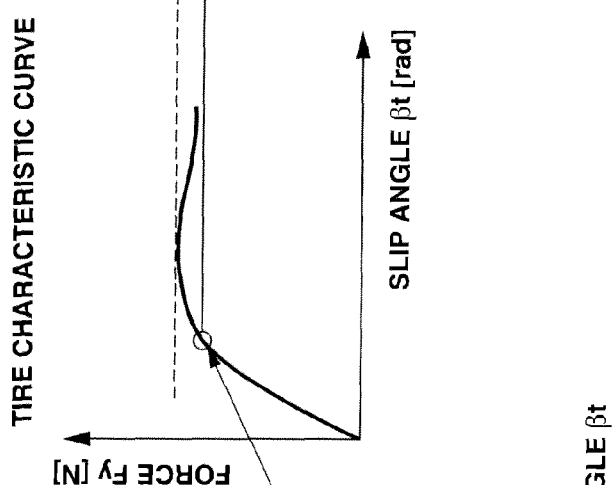
Figure 16C:
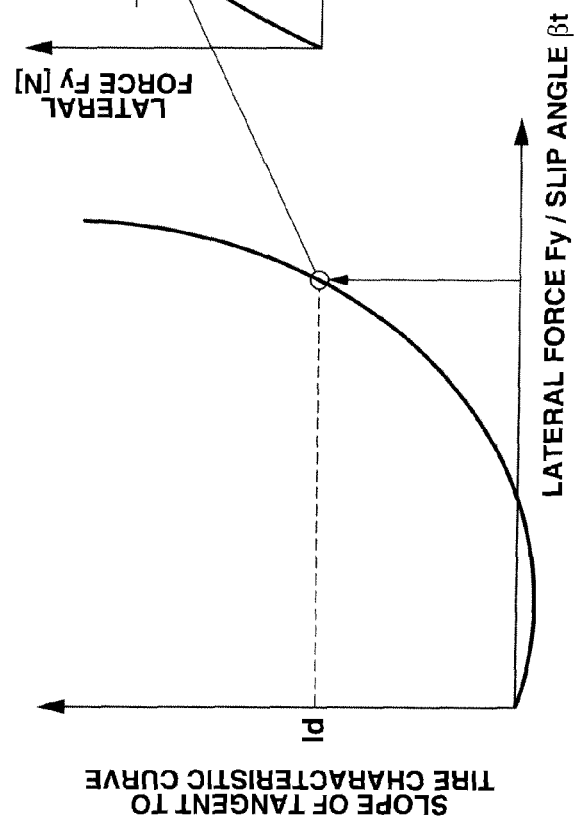

FIG. 16 shows a relation with a friction circle. FIG. 16A shows a relationship between the ratio (Fy/βt) between lateral force Fy and slip angle βt, and the tire characteristic curve tangent slope (like FIG. 14). FIG. 16B shows a tire characteristic curve, and FIG. 16C shows a friction circle. In these relationships, first, the tire characteristic curve tangent slope Id corresponding to the lateral force Fy and slip angle βt (corresponding to Fy/Pt) is obtained (FIG. 16A). Accordingly, the position on the tire characteristic curve can be determined (FIG. 16B). Furthermore, a relative value of the lateral force in the friction circle can be determined. That is, it is possible to determine a margin M to the lateral force which can be allowed by the tire. The tangent slope of the tire characteristic curve represents the rate of change of the lateral force Fy with respect to a change in slip angle βt. Therefore, the value, along the vertical axis, of the characteristic curve shown in FIG. 16A (the tire characteristic curve tangent slope can be regarded as a quantity indicative of a varying speed of a vehicle behavior.

Figure 17:
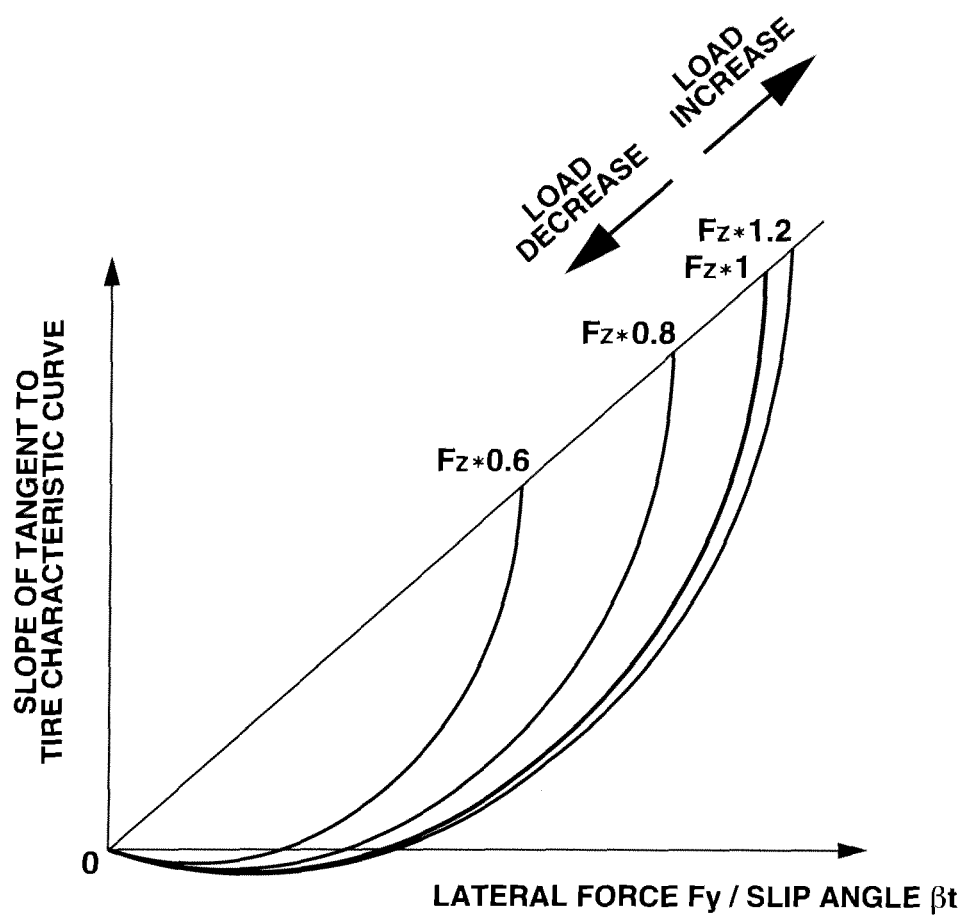
FIG. 17 is a view used for illustrating the underlying technology, and more specifically a characteristic view showing a relationship between the ratio (Fy/βt) of lateral force Fy and slip angle βt and the slope of tangent (μ gradient) to the tire characteristic curve (Fy-βt characteristic curve) obtained when the wheel load is varied.

Furthermore, a relation between the ratio (Fy/βt) of lateral force Fy and slip angle βt and the tire characteristic curve tangent slope has been ascertained when a wheel load is varied, by a process similar to the before-mentioned process. FIG. 17 shows this relation. In this example, the wheel load is varied by multiplying an initial value Fz of the wheel load (the value of the wheel load obtained when there is no variation), by 0.6, 0.8 and 1.2. In the case of multiplication by 1.0, the wheel load is equal to the initial value Fz. When the wheel load of the tire becomes smaller, the tire characteristic curve tangent slope obtained by each wheel load value becomes smaller, as shown in FIG. 17. In this case, the greatest value of the tire characteristic curve tangent slope obtained by each wheel load value (the value of the linear region) is moved on a straight line passing through the original of the characteristic view shown in FIG. 17. Moreover, the characteristic curve representing the relationship between the ratio (Fy/βt) of lateral force Fy and slip angle βt and the tire characteristic curve tangent slope (the slope of a tangent to the tire characteristic curve) is varied in the size while the shape is maintained, so that the forms are like similar figures having different sizes. The inventor of the present application has found such relation with the wheel load, too.

(3) Relation Between Tire Friction Circle and Wheel Force

Figure 18:
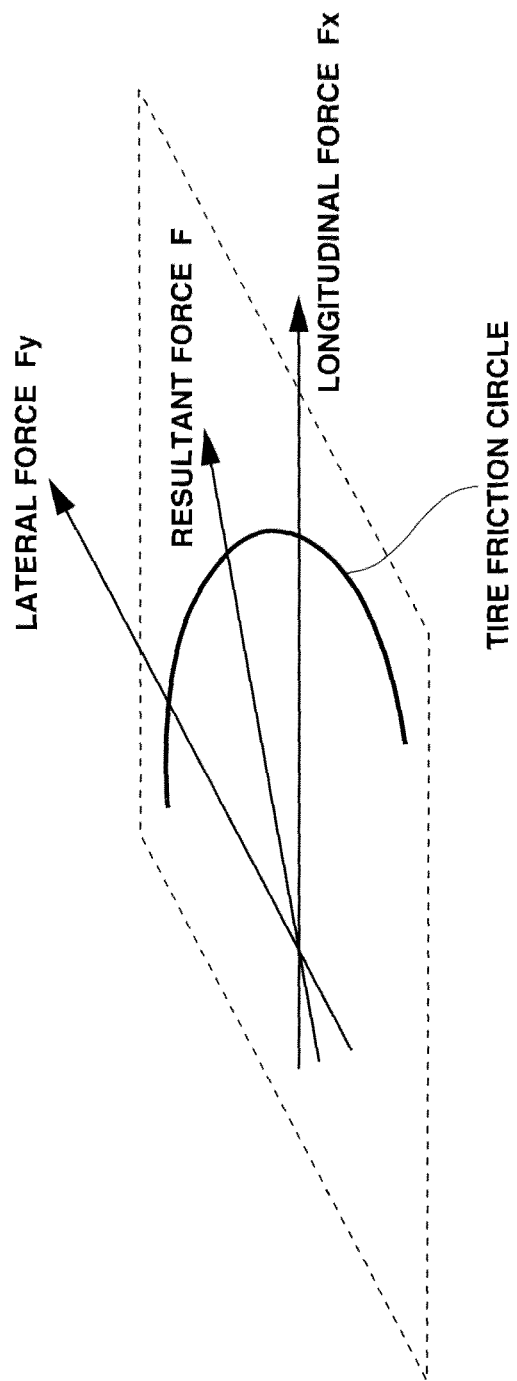
FIG. 18 is a view used for illustrating the underlying technology, and more specifically a characteristic view showing a friction circle in an orthogonal coordinate plane representing the driving/braking force (longitudinal force) Fx along a first axis, and the lateral force Fy along a second axis.

FIG. 18 shows a friction circle described on an orthogonal coordinate plane represented by an X axis expressing a longitudinal force Fx and a Y axis expressing a lateral force Fy.

The tire friction circle shows a frictional limit to which a tire can maintain a friction state in a ground contact surface. The frictional limit is not yet reached, and the tire is in the state sustaining the friction state when the value of lateral force Fy, longitudinal Fx or a resultant force resulting from lateral force Fy and longitudinal force Fx is within the friction circle. When the value of the force is equal to the friction circle, the tire is in the state producing a greatest frictional force. When an external force applied to the tire in the tire-ground contact surface is greater than the friction circle, the tire is in the state in which the friction state between the tire and the ground surface is lost, and a relative displacement between the tire and the ground surface becomes greater, that is, the tire is in a so-called slipping state. This means the relation of the tire friction circle and the gripping forces in the longitudinal and lateral direction in which the greatest gripping forces can not be achieved simultaneously in the longitudinal and lateral directions.

It is possible to describe the tire friction circle having an elliptic shape by plotting the greatest value of the resultant force of the longitudinal force Fx due to the grip force in the longitudinal direction and the lateral force Fy due to the grip force in the lateral direction, in conformity with the direction of the resultant force. In the following explanation, the lateral force Fy, longitudinal force Fx and the resulting force of the lateral and longitudinal forces Fy and Fx are generically referred to as a wheel force, as a generic term.

Therefore, it is possible to judge, in accordance with the relation between the tire friction circle and the magnitude of the wheel force, that, as the magnitude of the wheel force approaches the radius of the friction circle (the outer circumference), the frictional force approaches the greatest value which can be produced by the tire (the friction limit). In this way, it is possible theoretically to determine a margin, or the degree of margin or room of the grip force of the tire, to the friction limit. However, the detection of the size of the tire friction circle is difficult in practice, and it is not possible hitherto to determine the margin to the friction limit based on the above-mentioned theory.

The size of the friction circle is determined by the greatest value of the frictional force between the tire and ground contact surface. The earlier technique hitherto known can only estimate the greatest value of the frictional force in the state exceeding the friction limit. Therefore, the system of the earlier technique cannot estimate the greatest value of the frictional force before the friction limit is reached, and cannot know the margin to the friction limit in the state before the friction limit, so that it is difficult to control the tire frictional force so as to prevent the friction limit from being reached. By contrast, this embodiment of the present invention makes it possible to determine the margin to the friction limit directly without depending on the frictional force.

(4) Relation Between Wheel Force and Grip State (μ Gradient), Using Three Dimensional Coordinates As mentioned before, this embodiment of the present invention makes it possible to determine the margin or degree of margin to the friction limit directly without depending on the frictional force. To this end, a relationship (three dimensional characteristic map) between the wheel force of the wheel and grip state (μ gradient) is obtained by using a three dimensional coordinate system according to a following process as explained below.

(4-1) Relation Between Wheel Force and Wheel Slip Degree Using Three Dimensional Coordinate System.

FIG. 19 shows a process of transforming the relationship between the longitudinal force Fx and slip rate λ (two dimensional coordinate system) into a form in the three dimensional coordinate system. As shown in FIG. 19A (corresponding to the tire characteristic curve (Fx-λ characteristic curve)), the slip rate at which the longitudinal force Fx becomes greatest is defined as λpeak. Namely, the longitudinal force Fx increases with increase of the slip rate λ. However, when the slip rate λ increases to a certain level, the longitudinal force Fx becomes saturated, and thereafter the longitudinal force Fx decreases. This saturation point at which the longitudinal force Fx reaches the saturation is defined as λpeak. Then, as shown in FIG. 19B, the axis of slip rate λ is transformed into a non-dimensional form from λpeak to λ/λpeak, and thereafter the location of λ/λpeak being equal to one is changed to the origin (the axis of longitudinal force Fx is shifted to the value of λ/λpeak being equal to one). Then, as shown in FIG. 19C, the two dimensional coordinate system of FIG. 19B is rotated through 90 degrees. Thereafter, the relationship line (characteristic curve) between longitudinal force Fx and λ/λpeak is depicted in one quadrant of the three dimensional coordinate system, as shown in FIG. 19D. In FIG. 19D, the axis of λ/λ peak is the Z axis. As mentioned later, Z is a slip degree.

FIG. 20 shows a process of transforming the relationship between the lateral force Fy and slip angle βt (two dimensional coordinate system) into a form in the three dimensional coordinate system. The relationship between the lateral force Fy and the slip angle βt is transformed into the three dimensional coordinate system in the same manner as in the relationship between the longitudinal force Fx and slip rate λ. As shown in FIG. 20A (corresponding to the tire characteristic curve (Fy-βt characteristic curve of FIG. 10), the slip angle at which the lateral force Fy becomes greatest is defined as βpeak. The lateral force Fy increase with increase of slip angle βt. However, when the slip angle βt increases to a certain level, the lateral force Fy becomes saturated, and thereafter decreases. The saturation point where the lateral force Fy is saturated is defined as βtpeak. Then, as shown in FIG. 20B, the axis of slip angle β is transformed into a non-dimension axis of βt/βtpeak, and the value of β/βpeak equaling one is set as the origin (the axis of lateral force Fy is shifted to the value of βt/βtpeak equaling one). Thereafter, as shown in FIG. 20C, the two dimensional coordinate system of FIG. 20B is rotated through 90 degrees. Then, as shown in FIG. 20D, the relationship line (characteristic curve) between lateral force Fy and βt/βtpeak is depicted in a quadrant of the three dimensional coordinate system. In FIG. 20D, the axis of βt/βtpeak is set as the Z axis.

Figure 19A:
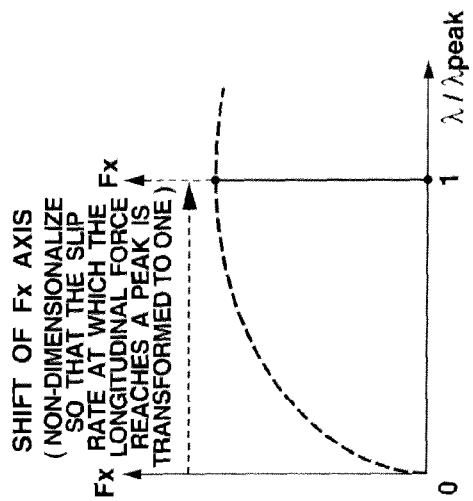
FIG. 19 is a view used for illustrating a process of showing the relationship between the longitudinal force Fx and the slip rate λ in a three dimensional coordinate system in the underlying technology, and a characteristic view for showing the relationship between the longitudinal force Fx and slip rate λ.
Figure 19D:
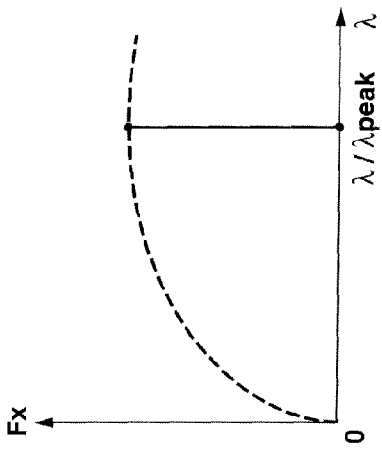
Figure 19B:
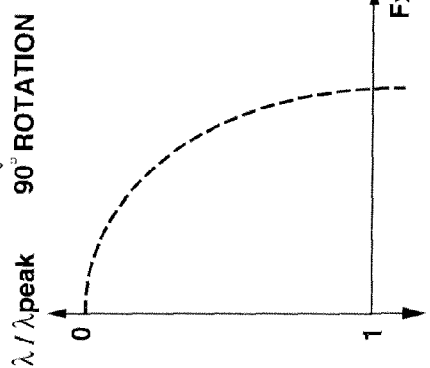
Figure 19C:
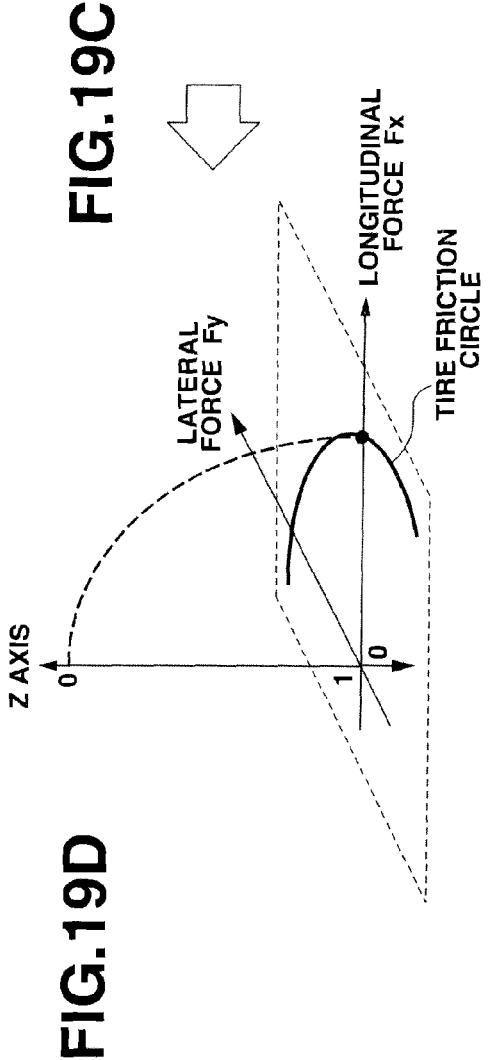
Figure 20A:
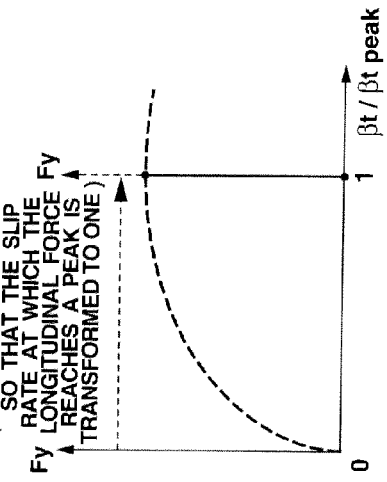
FIG. 20 is a view used for illustrating the process of showing the relationship between the lateral force Fy and the slip angle βt in a three dimensional coordinate system in the underlying technology, and a characteristic view for showing the relationship between the lateral force Fy and slip angle βt.
Figure 20B:
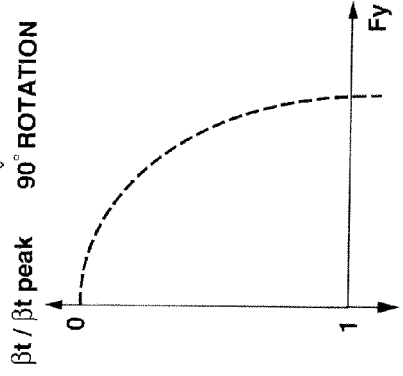
Figure 20C:
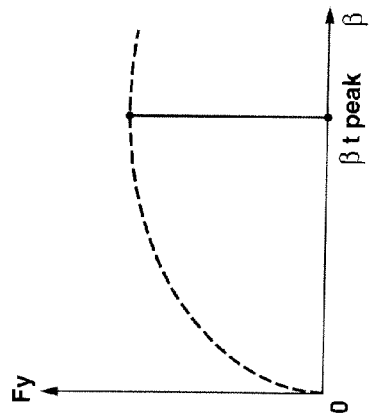
Figure 20D:
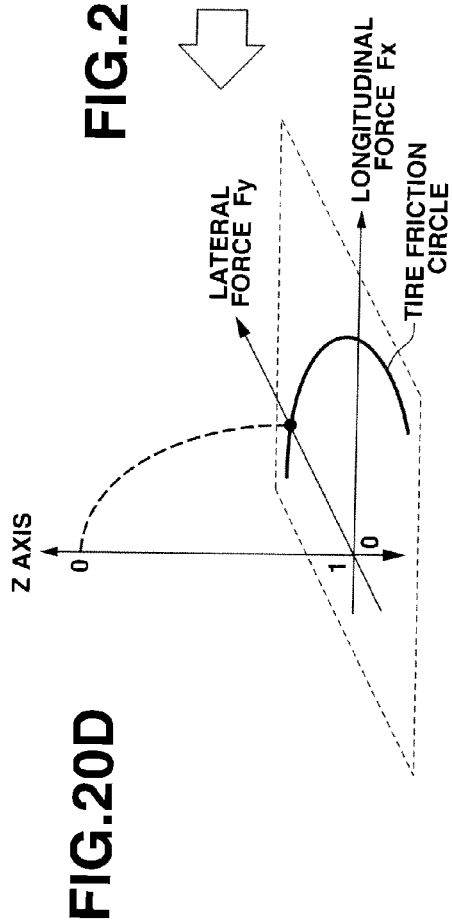
Figure 21:
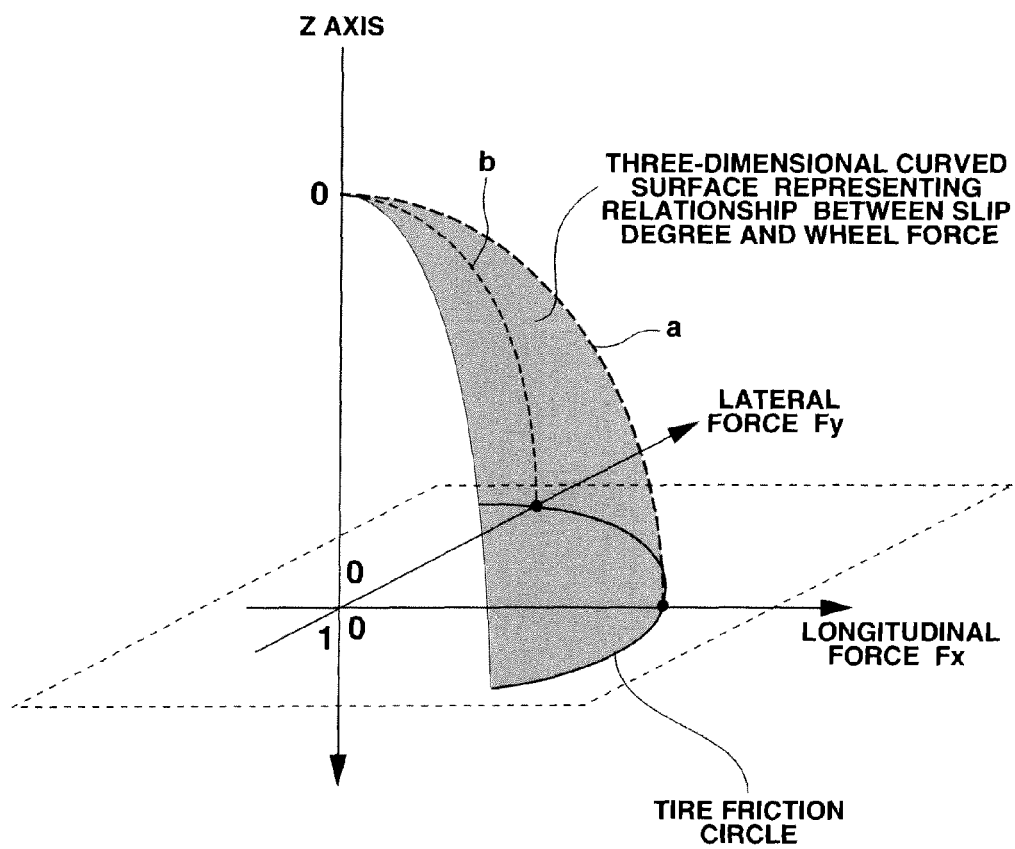
FIG. 21 is a view used for illustrating a process of showing the relationship between a wheel force (longitudinal force Fx, lateral force Fy) and a slip degree (slip rate λ, slip angle βt) in a three dimensional coordinate system in the underlying technology, and a characteristic view showing the relationship between the wheel force (longitudinal force Fx, lateral force Fy) and the slip degree (slip rate λ, slip angle β0 in the form of a three dimensional curved surface.

FIG. 21 shows a three-dimensional curved surface obtained by interpolation between the relationship line of longitudinal force Fx and λ/λpeak (characteristic line, Fx-Z plane) shown in FIG. 19D and the relationship line of lateral force Fy and βt/βtpeak (characteristic line, Fy-Z plane) shown in FIG. 20D. The three-dimensional curved surface of FIG. 21 is obtained by complementarily inserting an ellipse corresponding to the tire friction circle for each value along the Z axis, between the relationship line (characteristic line) "a" of FIG. 19D between the longitudinal force Fx and λ/λpeak and the relationship line (characteristic line) "b" of FIG. 20D between the lateral force Fy and βt/βtpeak. The three-dimensional curved surface of FIG. 21 is a curved surface existing between the Fx-Z plane containing the Fx axis and the Z axis and the Fy-Z plane containing the Fy axis and the Z axis.

As mentioned before, the slip degree (Z) is used as a generic concept for naming generically the slip rate λ attributable to longitudinal force Fx and the slip angle βt attributable to lateral force Fy. Accordingly, the Z axis shown in FIG. 21 is an axis representing the slip degree (λ/λpeak, βt/βtpeak). The three-dimensional curved surface represents the relationship between the slip degree and the wheel force. In FIG. 21, the three-dimensional curved surface representing the relationship between the slip degree and the wheel force is shown partly only for a ¼ part (quadrant) and a little more of the entire circumference. However, the three-dimensional curved surface representing the relationship between the slip degree and the wheel force extends over the entire circumference in practice, and accordingly the three-dimensional curved surface representing the relationship between the slip degree and the wheel force is dome-shaped or hemispherical.

In FIG. 21, the slip rate λ and slip angle βt which are different in the unit are depicted in the same coordinate system by nondimensionalization into λ/λpeak and βt/βtpeak, respectively. Therefore, the three-dimensional curved surface of FIG. 21 represents a set of relationship lines between the resultant force F of the longitudinal force Fx and lateral force Fy, and the slip degree Z attributable to the resultant force F. The resultant force F corresponds to an oblique force acting in an oblique direction of the tire. The slip degree Z attributable to the resultant force F is a concept formed by combining the slip rate λ and slip angle βt.

FIG. 22 is a view for explaining the set of relationship lines (two-dimensional characteristic curves) between the resultant force F of the longitudinal force Fx and lateral force Fy, and the slip degree Z attributable to the resultant force F, shown in FIG. 21. In the three-dimensional coordinate system, there are a countless number of combinations of the magnitude and direction of the resultant force F resulting from different combinations of the scalar quantity and direction of longitudinal force Fx and the scalar quantity and direction of lateral force Fy. In this embodiment, the wheel force (F) may act in any direction over 360 degrees around the Z axis, and the illustrated embodiment is adapted for all directions. Accordingly, the relationship between the resultant force F and the slip degree attributable to the resultant force F in the three-dimensional coordinate system can be said to be a set of two-dimensional characteristics shown in the plane containing the Z axis and the resultant force F. As shown in FIG. 22B, it is possible to obtain the relationship between the resultant force F and the slip degree Z attributable to resultant force F in the form of a two-dimensional characteristic curve. There are a countless number of planes containing the Z axis and resultant force F depending on the direction of the resultant force F around the Z axis, and these planes form a sheaf of planes having the Z axis as the axis. Each of these planes includes a two-dimensional characteristic curve as shown in FIG. 22B.

The following is explanation on the margin (or the degree of margin) of the resultant force F to the friction limit in the three-dimensional coordinate system. The tire characteristic curve shown in FIG. 22B is a line of intersection between the three-dimensional curved surface representing the relationship between the slip degree and the wheel force (Fx, Fy, F) shown in FIG. 22A and the plane containing the vector of resultant force F and the Z axis. The tangent slope of the thus-obtained tire characteristic curve shown in FIG. 22B is a quantity representing the margin to the tire friction limit. As the tangent slope of the tire characteristic curve of FIG. 22B becomes closer to zero from a positive value, the condition becomes closer to the friction limit. Therefore, if the slope of the tangent line to the tire characteristic curve is sensed, then it is possible to determine the margin to the friction limit in the state before the friction limit is reached. When the slope of the tangent line to the tire characteristic curve of FIG. 22B is negative, the tire is in the state in which the frictional force is saturated, that is, the slip state. In this point, it is possible to ascertain the margin to the friction limit (the frictional force is saturated) before the tire reaches the slip state if the tangent slope of the tire characteristic curve can be detected.

Figure 23B:
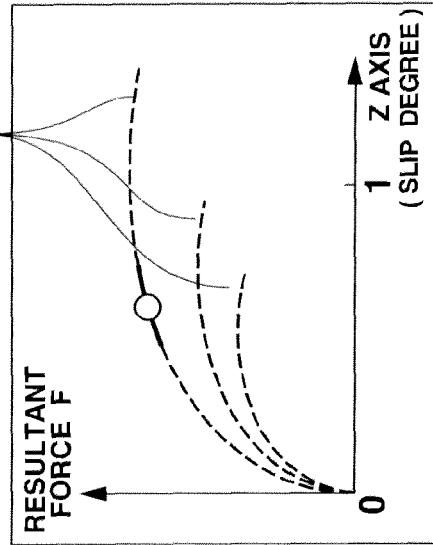
FIG. 23B is a characteristic view sowing variation of the tire characteristic curve (F-Z characteristic curve) due to the difference in magnitude of the greatest friction force determining the size of the friction circle.
Figure 23A:
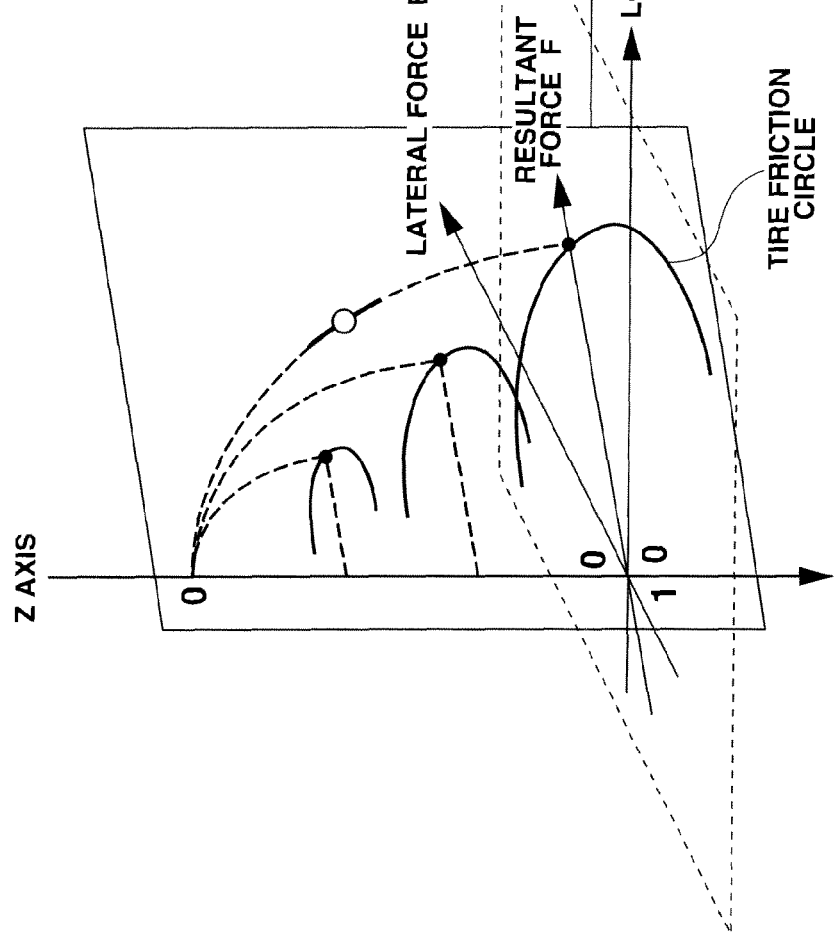
FIG. 23A is a characteristic view for showing tire friction circles of different sizes in the three dimensional coordinates system.

FIG. 23 shows the relation between the resultant force F and the slip degree Z caused by the resultant force F when the size of the tire friction circle is varied. As mentioned before, the size of the tire friction circle is determined by the greatest value of the friction force between the tire and the ground contact surface (hereinafter referred to as "greatest friction force"). The tire friction circle becomes smaller when the greatest value of the friction force between the tire and the ground contact surface. Therefore, as shown in FIGS. 23(a) and 23(b), the tire characteristic curve (tire friction circle) changes in dependence on the magnitude of the greatest friction force. Since it is not possible to estimate the greatest value of the friction force before the friction limit is reached, as mentioned before, the application to the vehicle control is not feasible if nothing is done.

Figure 24B:
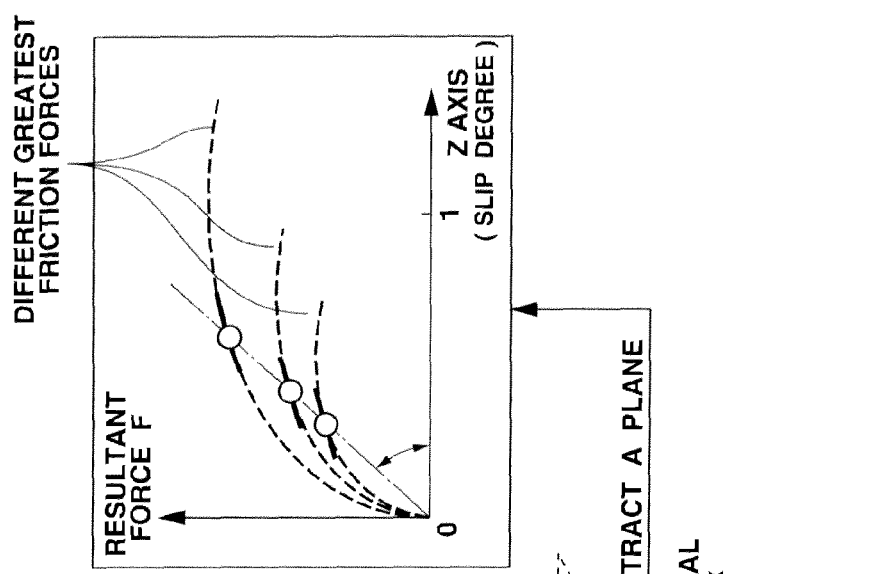
FIG. 24B is a characteristic view of the two dimensional coordinate system for showing that the slope at an intersection point between the tire characteristic curve and a straight line passing through the origin O is constant without regard to the magnitude of the greatest friction force.
Figure 24A:
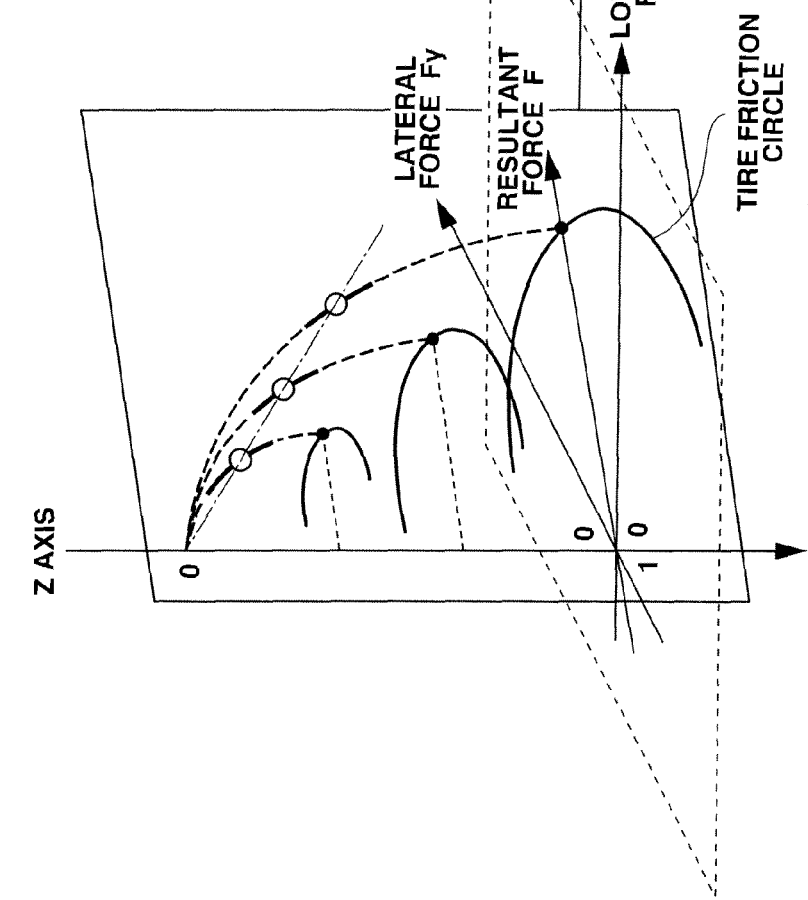
FIG. 24A is a characteristic view of the three dimensional coordinate system for showing that the slope at an intersection point between the tire characteristic curve and a straight line passing through the origin O (the point at which the slip degree and wheel force are both equal to zero) is constant without regard to the magnitude of the greatest friction force.

FIG. 24 shows the relation between the tire characteristic curves (F-Z characteristic curves) of different values of the greatest friction force (road surface μ, for example) and a straight line (shown by a one-dot chain straight line) passing through the origin O (that is, the point at which the slip degree and the wheel force are both equal to zero). As shown in FIGS. 24A and 24B, the slope (hereinafter referred to as p gradient) at a point of intersection between the tire characteristic curve and the straight line passing through the origin O is constant irrespective of the magnitude of the greatest friction force. That is, as to the tire characteristic curves of different values of the greatest friction force, the slopes are equal to one another if the ratio (F/Z) of the resultant force F and slip degree Z is the same. By the use of this property, the relation between the ratio (F/Z) of the resultant force F and slip degree Z and the tangent slope γ of the tire characteristic curve can be rearranged into a form that is not dependent on the greatest friction force.

Figure 25:
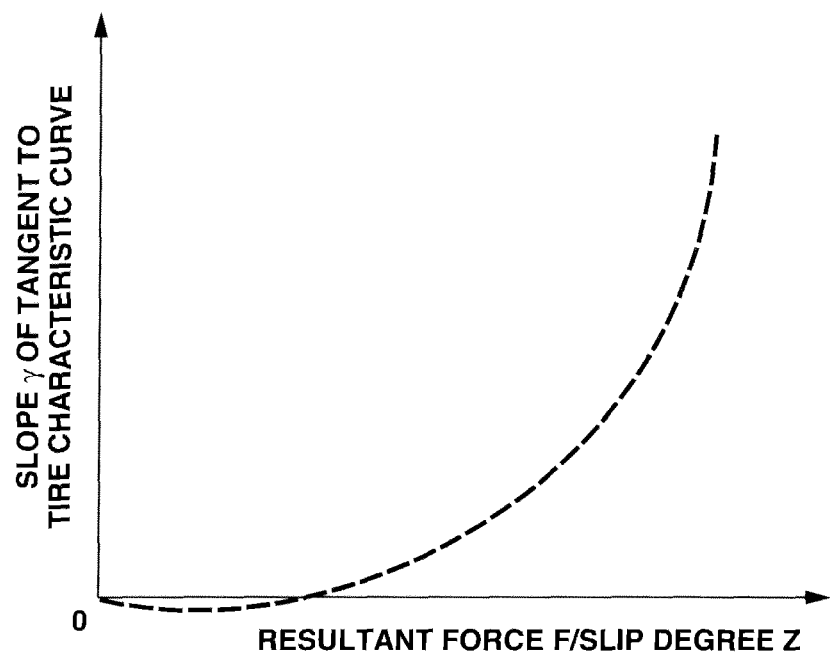
FIG. 25 is a view used for illustrating the underlying technology, and more specifically a characteristic view showing the relationship (2D μ gradient characteristic map) between the ratio (F/Z) of the resultant force F and the slip degree Z and the slope γ of tangent to the tire characteristic curve (F-Z characteristic curve).

(4-2) Relation Between the Wheel Force and the Grip State (μ Gradient) Using the Three-Dimensional Coordinate System FIG. 25 shows the relation between the ratio (F/Z) of the resultant force F and slip degree Z and the tangent slope γ of the tire characteristic curve. It is possible to obtain a single concentrated characteristic (two-dimensional characteristic curve) that is not dependent on the greatest friction force as shown in FIG. 25, by rearranging the relation between the ratio (F/Z) of the resultant force F and slip degree Z, and the tangent slope γ of the tire characteristic curve. By preparing the characteristic data of FIG. 25 beforehand in the form of a characteristic map, for example, it is possible to determine the value of the slope of the tangent line to the tire characteristic curve by using the characteristic data and to judge the margin to the friction limit if the resultant force F and the slip degree can be determined. That is, it is possible to determine the margin to the friction limit without obtaining information on the greatest friction force (without estimating the greatest friction force).

Since the magnitude and direction of the resultant force F in the three-dimensional coordinate axes can assume a countless number of values because of different combinations of values of the scalar quantity and direction of longitudinal force Fx and the scalar quantity and direction of lateral force Fy, there are innumerable forms of the relationship, shown in FIG. 25, between the ratio (F/Z) of resultant force F and slip degree Z and the tangent slope γ of tire characteristic curve, in a countless number corresponding to the number of the directions of the resultant force F. In the plane containing the Z axis and the Fx axis in the three-dimensional coordinate system shown in FIG. 26A, there exists a relationship between the ratio (Fx/λ) of the longitudinal force Fx and slip rate λ and the tangent slope γ of the tire characteristic curve, as shown in FIG. 26D. In the plane containing the Z axis and the Fy axis, there exists a relationship between the ratio (Fy/βt) of the lateral force Fy and slip angle βt and the tangent slope γ of the tire characteristic curve. In the plane containing the Z axis and the resultant force F, there exists a relationship between the ratio (F/Z) of the resultant force F and slip degree Z and the tangent slope γ of the tire characteristic curve.

By using the above-mentioned technology as the underlying technology, the inventors of the present application has realized the representation of the innumerable forms of the relationship between the ratio (F/Z) of the resultant force F and slip degree Z and the tangent slope of the tire characteristic (μ gradient) collectively in one three-dimensional coordinate system.

Figure 27C:
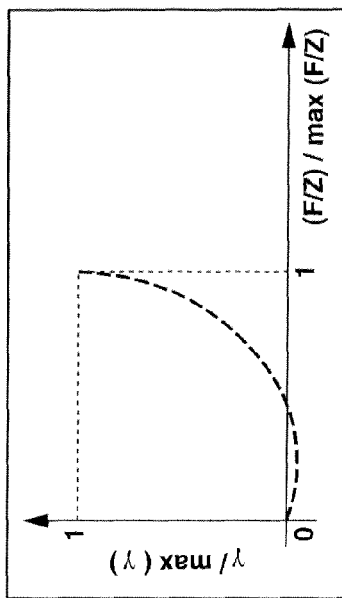
FIG. 27 is a view used for illustrating the underlying technology, and more specifically a characteristic view for illustrating the process of showing many relationships (2D μ gradient characteristic maps) of FIG. 26 collectively in the three dimensional coordinate system.
Figure 27D:
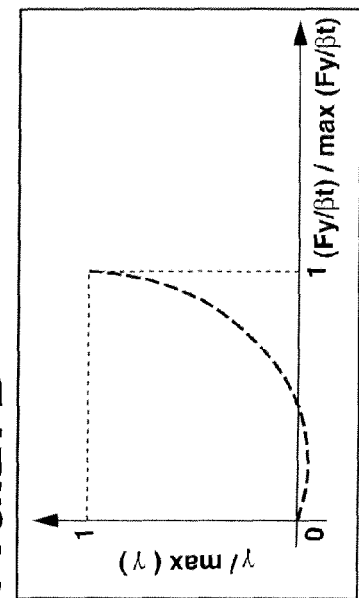
Figure 27B:
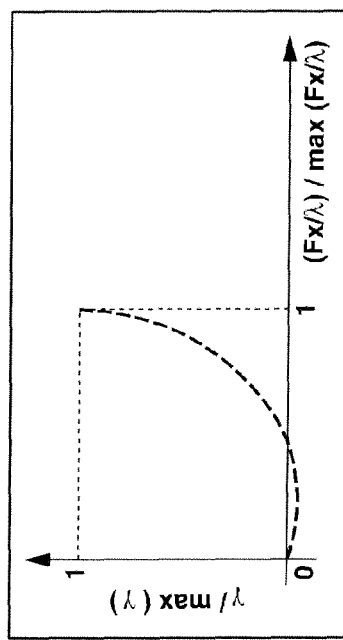
Figure 27A:
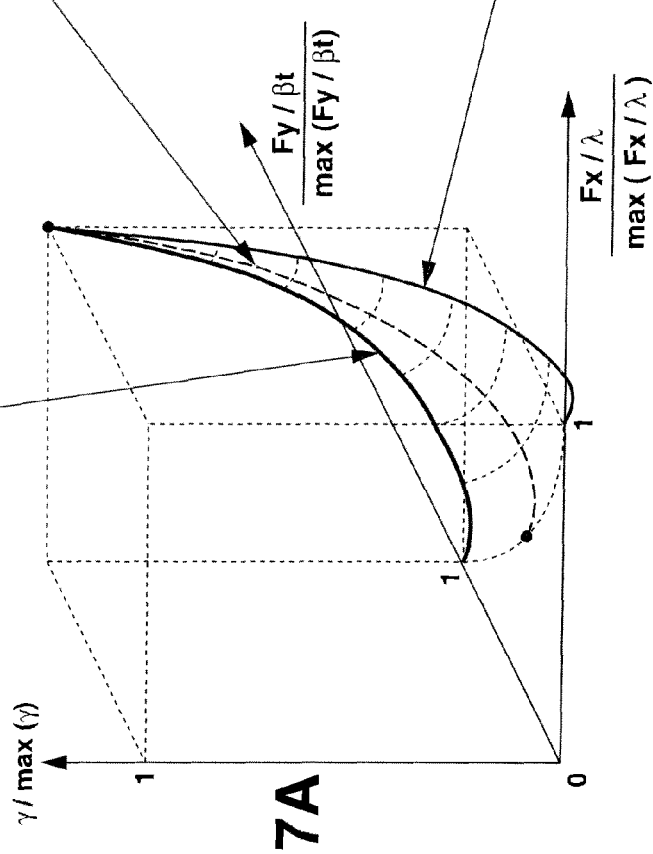

FIG. 27A shows, as an example, the relationship between the ratio (F/Z) of resultant force F and slip degree Z and the tangent slope (μ gradient) γ of the tire characteristic curve in the three-dimensional coordinate system. In FIG. 27(c), the axis representing the ratio (F/Z) of the resultant force F (wheel force) and slip degree Z is nondimensionalized (normalized) ((F/Z)/max(F/Z)) with a greatest value max(F/Z) of the ratio (F/Z) of the resultant force F (wheel force) and slip degree Z so as to make the quantity represented by the axis equal to one at the greatest value max(F/Z). That is, as shown in FIG. 27B, the axis representing the ratio (Fx/A) of the longitudinal force as the component of the resultant force F and slip rate λ is nondimensionalized ((Fx/λ)/max(Fx/λ)) with a greatest value max(Fx/λ) of the ratio (Fx/λ) so as to make the quantity represented by the axis equal to one at the greatest value max(Fx/λ). Moreover, as shown in FIG. 27D, the axis representing the ratio (Fy/βt) of the lateral force Fy as the component of the resultant force F and slip angle βt is nondimensionalized (normalized) ((Fy/βt)/max(Fy/βt)) with a greatest value max(Fy/βt) of the ratio (Fy/βt) so as to make the quantity of the axis equal to one at the greatest value max(Fy/βt).

Furthermore, the axis representing the tangent slope γ of the tire characteristic curve is nondimensionalized (normalized) with the greatest value max(γ) of the tangent slope so as to make the quantity represented by the axis equal to one at the greatest value max(γ).

Figure 28A:
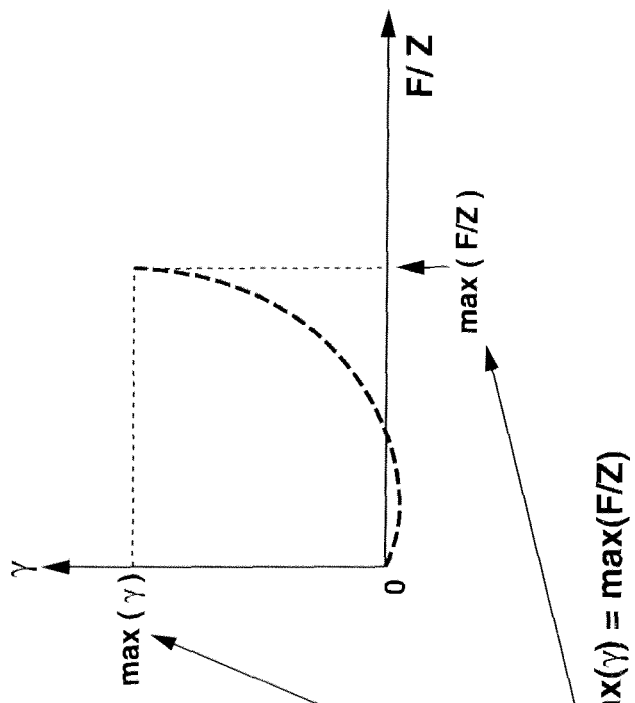
FIG. 28 is a view used for illustrating the underlying technology and more specifically a characteristic view showing a max (F/Z) and a max (γ).
Figure 28B:
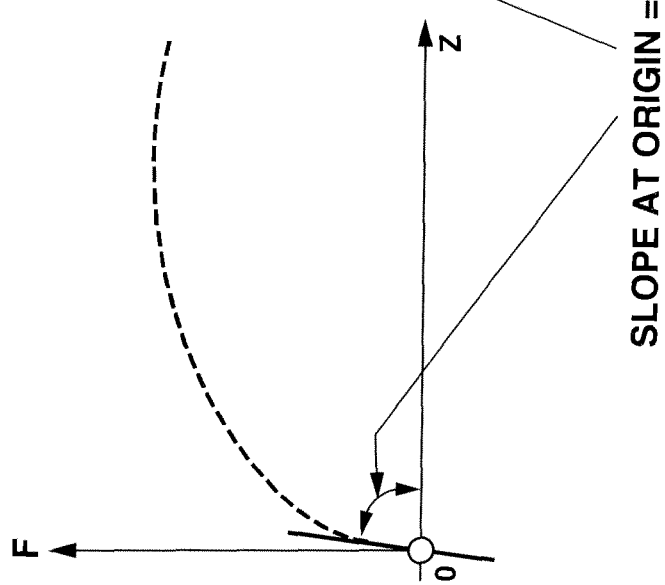

The greatest values max(F/Z) and max(γ) are determined in the following manner, as shown in FIG. 28. The greatest values max(F/Z) and max(γ) are values in the state in which the slip degree Z is very small and the tire is securely in the gripping state, that is, values in the linear state of the tire characteristic. As shown in FIG. 28A, in the relationship line (tire characteristic curve) of the resultant force F and slip degree Z, the greatest value max(γ) is the tangent slope of the relationship line in the region where the change in resultant force F and the change in the slip degree Z are in a linear relationship. That is, max(γ) is the tangent slope at the origin O. As shown in FIG. 28B, the greatest value max(F/Z) is the ratio (F/Z) of resultant force F and slip degree Z at which max(γ) is obtained. This greatest value max(F/Z) is a value inherent in the vehicle. The slope max(γ) is invariable even if the friction force acting in the tire ground contact surface is varied. Therefore, it is possible to determine the slope max(γ) and max(F/Z) readily in advance.

The relation between resultant force F and slip degree Z can be explained in the following manner by using the relation between longitudinal force Fx and slip rate λ. The greatest values max(Fx/λ) and max(γ) are values in the state in which the slip rate λ is very small and the tire is securely in the gripping state, that is, values in the linear state of the tire characteristic. In the relationship line (tire characteristic curve) of the longitudinal force Fx and slip rate λ, the greatest value max(γ) is the tangent slope of the relationship line in the region where the change in longitudinal force Fx and the change in the slip rate λ are in a linear relationship. That is, max(γ) is the tangent slope at the origin O. The greatest value max(Fx/λ) is the ratio (Fx/λ) of longitudinal force Fx and slip rate λ at which max(γ) is obtained. This greatest value max (Fx/λ) is a value inherent in the vehicle. The slope max(γ) is invariable even if the friction force acting in the tire ground contact surface is varied. Therefore, it is possible to determine the slope max(γ) and max(Fx/λ) readily in advance.

The relation between resultant force F and slip degree Z can be explained similarly in the following manner by using the relation between lateral Fy and slip angle βt. The greatest values max(Fy/βt) and max(γ) are values in the state in which the slip rate λ is very small and the tire is securely in the gripping state, that is, values in the linear state of the tire characteristic. In the relationship line (tire characteristic curve) of the lateral Fy and slip angle βt, the greatest value max(γ) is the tangent slope of the relationship line in the region where the change in lateral force Fy and the change in the slip angle βt are in a linear relationship. That is, max(γ) is the tangent slope at the origin O. The greatest value max(Fy/βt) is the ratio (Fy/βt) of lateral force Fy and slip angle βt at which max(γ) is obtained. This greatest value max(Fy/βt) is a value inherent in the vehicle. The slope max(γ) is invariable even if the friction force acting in the tire ground contact surface is varied. Therefore, it is possible to determine the slope max(γ) and max(Fy/βt) readily in advance.

In this way, it is possible to obtain the relationship among the ratio (F/Z) of resultant force F and slip degree Z and the tangent slope (μ gradient) of the tire characteristic curve, in the form of the characteristic (μ gradient characteristic) in the three-dimensional coordinate system.

Figure 29:
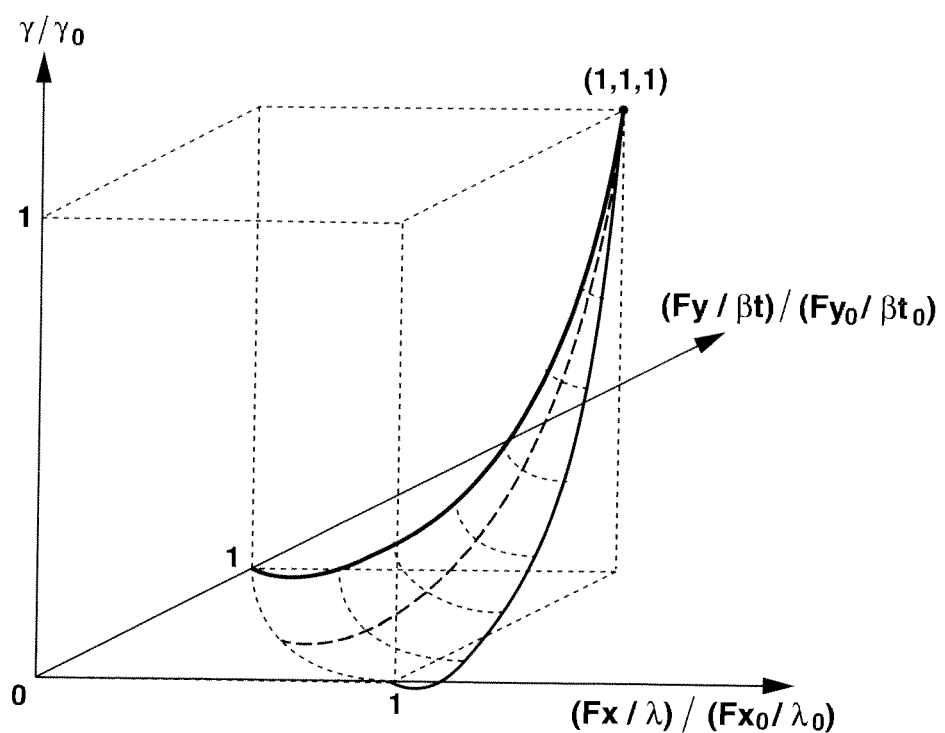
FIG. 29 is a characteristic view showing the relationship between the ratio (F/Z) of the resultant force F and the slip degree Z and the slope γ of tangent to the tire characteristic curve (F-Z characteristic curve), in the form of a three dimensional curved surface (3D μ gradient characteristic map).

FIG. 29 shows the relationship among the ratio (F/Z) of resultant force F and slip degree Z and the tangent slope (μ gradient) of the tire characteristic curve, in the form of the characteristic (μ gradient characteristic) in the three-dimensional coordinate system. In FIG. 29, γ0 corresponds to a reference value which is max(γ); (Fx0/λ0) corresponds to a reference ratio which is max(Fx/λ); and (Fy0/βt0) corresponds to a reference ratio which is max(Fy/βt). The embodiments are arranged to determine the grip state and the margin or degree of margin to the friction limit directly without regard to the friction force, by having the characteristic as shown in FIG. 29 in the form of map (3D μ gradient characteristic map).

EMBODIMENTS

The Following is Explanation on Embodiments Realized by Using the above-mentioned technology.

First Embodiment

Construction

Figure 30:
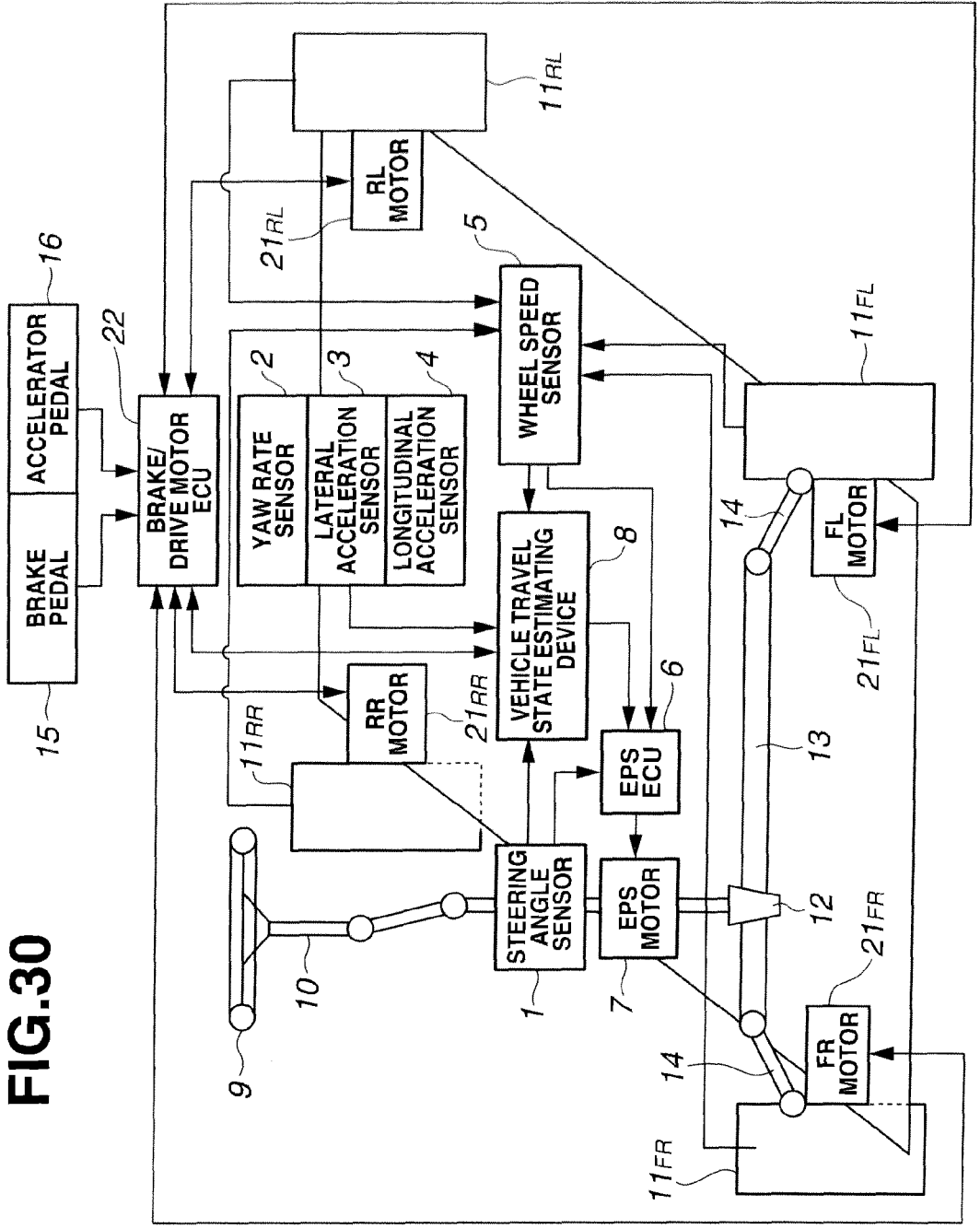
FIG. 30 is a schematic view showing an outline construction of an electric vehicle according to a first embodiment of the present invention schematically.

FIG. 30 is a view schematically showing the outline construction of a vehicle according to the first embodiment. The Vehicle Shown in FIG. 30 is an Electric Four Wheel Drive vehicle. As shown in FIG. 30, the vehicle includes a steering angle sensor 1, a yaw rate sensor 2, a lateral acceleration sensor 3, a longitudinal acceleration sensor 4, a wheel speed sensor 5, EPSECU (Electric Power Steering Electronic Control Unit) 6, an EPS (Electric Power Steering) motor 7, and a vehicle travel (or running) state estimating device or unit 8. The vehicle further includes driving/braking motors 21FL~21RR connected directly with respective vehicle wheels 11FL~11RR, and a drive/brake motor ECU (Electronic Control Unit) 22.

Steering angle sensor 1 senses the rotational angle of a steering shaft 10 rotating as a unit with a steering wheel 9. Steering angle sensor 1 delivers the sensing result (steering angle) to vehicle travel state estimating device 8. Yaw rate sensor 2 senses the yaw rate of the vehicle, and delivers the sensing result to vehicle travel state estimating device 8. Lateral acceleration sensor 3 senses the lateral acceleration of the vehicle, and delivers the sensing result to vehicle travel state estimating device 8. Longitudinal acceleration sensor 4 senses the longitudinal acceleration of the vehicle and delivers the sensing result to vehicle travel state estimating device 8. Wheel speed sensor 5 senses the wheel speeds of wheels 11FL~11RR provided in the vehicle body, and delivers the sensing results to vehicle travel state estimating device 8.

EPSECU 6 outputs a steering assist command to EPS motor 7 in accordance with the steering angle sensed by steering angle sensor 1. This steering assist command is a command signal for performing steering force assistance. Furthermore, EPSECU 6 outputs a steering assist command to EPS motor 7 in accordance with a command (an unstable behavior restraining assist command) produced by vehicle travel state estimating device 8. This steering assist command is a command signal for restraining unstable behavior of the vehicle.

EPS motor 7 imparts a rotational torque to steering shaft 10 in accordance with the steering assist command outputted from EPSECU 6. Therefore, EPS motor 7 gives assistance to the steering movement of left and right front wheels 11FL and 11FR through a rack and pinion mechanism (pinion 12 and rack 13) connected with steering shaft 10, tie rods 14 and knuckle arms.

The drive/brake motor ECU 22 controls the driving/braking motors 21FL~21RR in accordance with driver inputs from brake pedal 15 and accelerator pedal 16 and information from vehicle travel state estimating device 8.

Vehicle travel state estimating device 8 estimates the travel (or running) state of the vehicle in accordance with the sensing results of steering angle sensor 1, yaw rate sensor 2, lateral acceleration sensor 3, longitudinal acceleration sensor 4 and wheel speed sensor 5. In accordance with the result of the estimation, the vehicle travel state estimating device 8 outputs the command (unstable behavior restraining assist command) to EPSECU 6 and drive/brake motor ECU 22. This command is a command signal for controlling EPS motor 7 and the longitudinal force so as to restrain unstable behavior of the vehicle.

Figure 31:
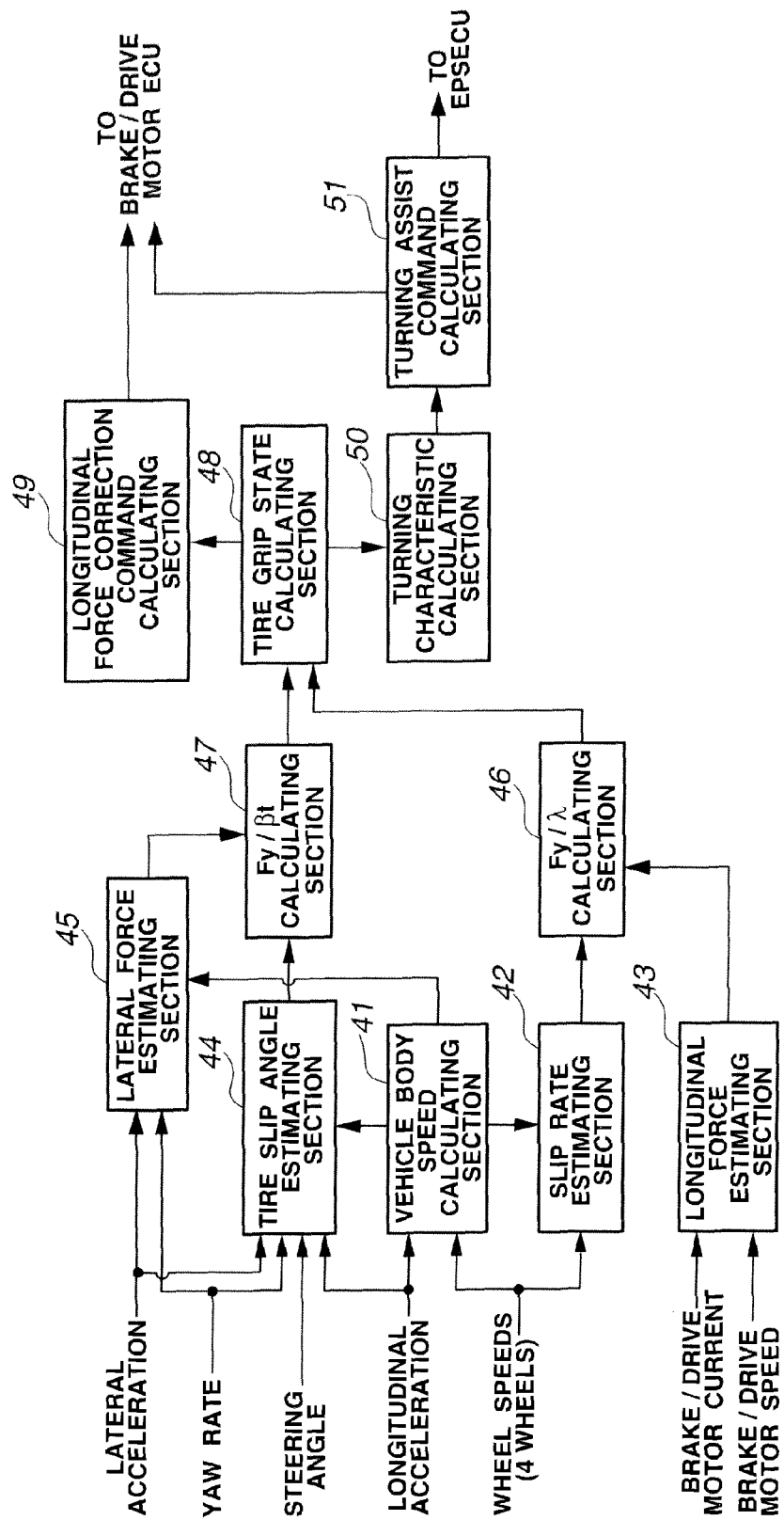
FIG. 31 is a block diagram showing an example of the construction of a vehicle travel state estimating device.

FIG. 31 shows the internal configuration of vehicle travel state estimating device or unit 8. As shown in FIG. 31, vehicle travel state estimating device 8 includes a vehicle body speed calculating section 41, a slip rate estimating section 42, a longitudinal force estimating section 43, a tire slip angle estimating section 44, a lateral force estimating section 45, a longitudinal force-slip rate ratio estimating section (hereinafter referred to as Fx/λ calculating section) 46, a lateral force-slip angle ratio estimating section (hereinafter referred to as Fy/(βt calculating section) 47, a tire grip state calculating section (μ gradient calculating section) 48, a longitudinal force correction command calculating section 49, a turning characteristic calculating section 50 and a turning assist command calculating section 51.

Vehicle body speed calculating section 41 estimates the vehicle body speed in accordance with the wheel speeds sensed by wheel speed sensor 5, and the longitudinal acceleration sensed by longitudinal speed sensor 4. In particular, vehicle body speed calculating section 41 calculates a mean value (or average) of the wheel speeds of driven wheels 11RL and 11RR or a mean value (or average) of the wheel speeds of wheels 11FL~11RR, and sets the calculated value as a base value of the vehicle body speed. Vehicle body speed calculating section 41 modifies this base value with the longitudinal acceleration. Specifically, vehicle body speed calculating section 41 modifies the base value so as to remove influence of errors due to tire spin at the time of rapid acceleration and tire lock at the time of hard braking. The vehicle body speed calculating section 41 sets the thus-modified value as the estimated vehicle body speed. Vehicle body speed calculating section 41 outputs the calculation result to the slip rate estimating section 42 and tire slip angle estimating section 44.

Slip rate estimating section 42 calculates slip rates λf and λr of the front and rear wheels (for the two front wheels and for the two rear wheels) in accordance with the wheel speeds of wheels 11FL~11RR sensed by wheel speed sensor 5 and the vehicle body speed calculated by vehicle body speed calculating section 41. Then, slip rate estimating section 42 outputs the calculation results to the Fx/λ calculating section 46.

The longitudinal force estimating section 43 estimates longitudinal forces (driving/braking torques) Fxf and Fxr outputted at the front and rear wheels in accordance with the rotational speeds and current values of drive/brake motors 21FL~21RR. For example, longitudinal force estimating section 43 obtains the rotational speeds and current values of drive/brake motors 21FL~21RR through drive/brake motor ECU 22. As to the calculation of the longitudinal forces Fxf and Fxr of the front wheels and rear wheels, the longitudinal force estimating section 43 specifically calculates driving/braking torques TTir of drive/brake motors 21FL~21RR according to a following mathematical expression (1).

[Math. 1]

$$T_{Tir} = K_{MTR} \cdot I - (I_{MTR} \cdot \ddot{\theta}_{MTR} + C_{MTR} \cdot \dot{\theta}_{MTR} + R_{MTR}) \qquad (1)$$

Each of drive/brake motors 21FL~21RR produces torque which is proportional to current I. The proportionality coefficient of this proportional relationship is KMTR. Moreover, since there are involved torque losses proportional to the angular acceleration and angular speed about a motor angle θMTR, and a torque loss due to friction, correction is made for these torque losses. In this case, a gain corresponding to inertia is IMTR, a grain corresponding to viscosity (including counter electromotive force) is CMTR, and friction is RMTR, and these parameters are identified in advance.

Then, longitudinal force estimating section 43 sets the sum of driving/braking torques TTir of drive/brake motors 21FL and 21FR for front wheels 11FL and 11FR as the driving/braking torque for the left and right front wheels. Furthermore, longitudinal force estimating section 43 sets the sum of driving/braking torques TTir of drive/brake motors 21RL and 21RR for rear wheels 11RL and 11RR as the driving/braking torque for the left and right rear wheels.

Longitudinal force estimating section 43 calculates the longitudinal force Fxf for the front wheels by multiplying the driving/braking torques TTir of the front wheels by their dynamic radius and calculates the longitudinal force Fxr for the rear wheels by multiplying the driving/braking torques TTir of the rear wheels by their dynamic radius. Longitudinal force estimating section 43 outputs the calculation results (the results of the estimation) to Fx/λ calculating section 45. The longitudinal force Fxf is a resultant force of the left and right front wheels, and longitudinal force Fxr is a resultant force of the left and right rear wheels.

Fx/λ calculating section 46 calculates the ratios (Fxf/λf, Fxr/λr) of the front and rear wheel longitudinal force Fxf and Fxr and the front and rear wheel slip rates λf and λr, respectively, in accordance with the front and rear wheel slip rates λf and λr calculated by slip rate estimating section 42 and the front and rear wheel longitudinal forces Fxf and Fxr calculated by longitudinal force estimating section 43. Fx/λ calculating section 46 outputs the calculation results to tire grip state calculating section 48.

Tire slip angle estimating section 44 estimates the vehicle body slip angle (the side slip angle of the vehicle) and converts the estimated vehicle body slip angle β into the slip angle (tire slip angle) βt of each of the front and rear wheels.

To this end, tire slip angle estimating section 44 first estimates the side slip angle of the vehicle (slip angle) in accordance with the steering angle (tire steer angle δ) sensed by steering angle sensor 1, yaw rate γ (V) sensed by yaw rate sensor 2, lateral acceleration sensed by lateral acceleration sensor 3, longitudinal acceleration sensed by longitudinal acceleration sensor 4, and vehicle body speed V calculated by vehicle body speed calculating section 41.

Figure 32:
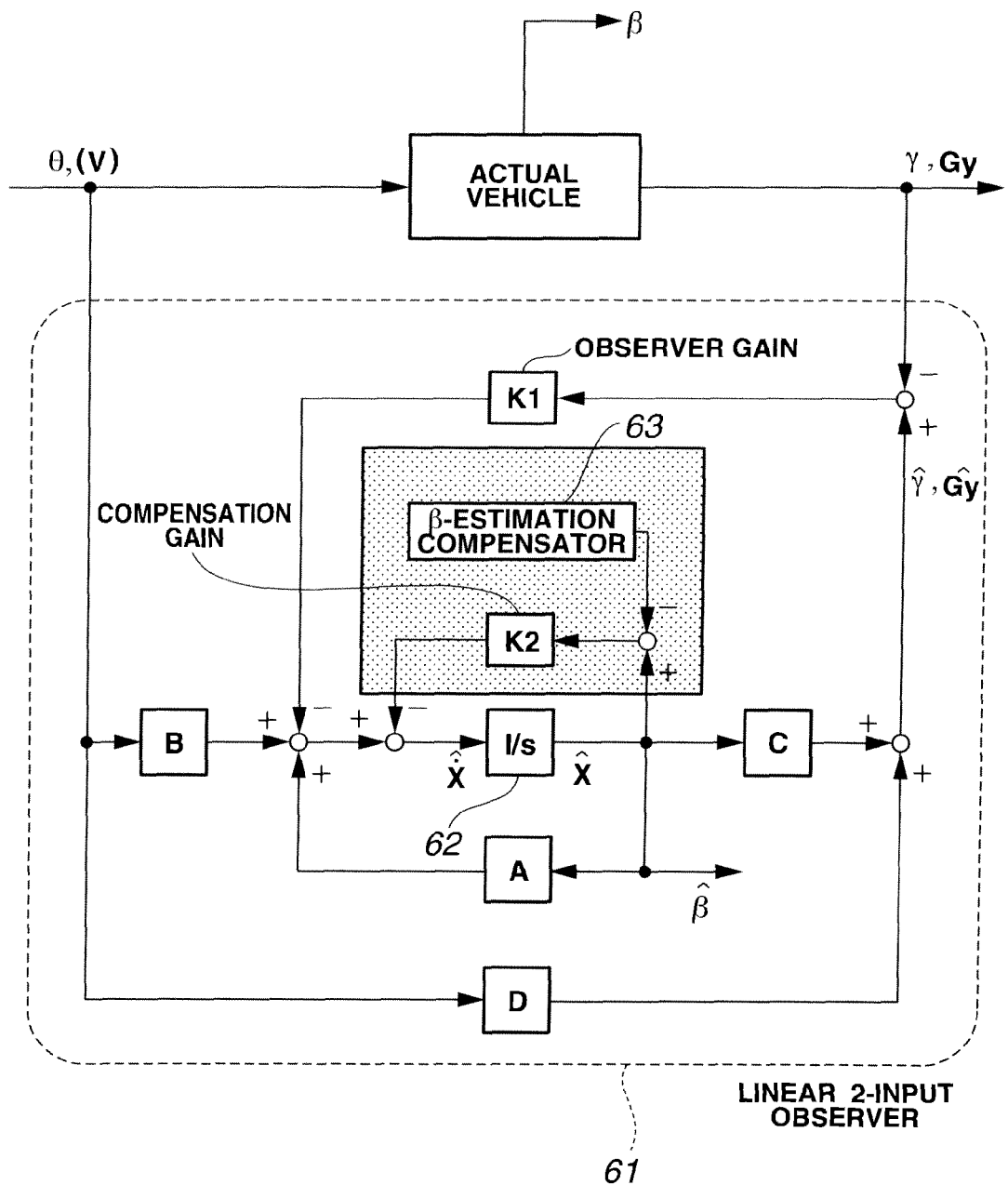
FIG. 32 is a block diagram showing an example of the construction of a tire slip angle estimating section.

FIG. 32 shows, as an example, the configuration of vehicle body slip angle estimating section 44 for estimating vehicle side slip angle (slip angle). As shown in FIG. 32, vehicle body slip angle estimating section 44 includes a linear two-input observer 61 estimating one or more vehicle state variables (vehicle side slip angle β, slip angle β). With this construction, the vehicle body slip angle estimating section 44 estimates the vehicle side slip angle (slip angle) β. Linear two-input observer 61 is based on a two-wheel vehicle model, which can be expressed by a following mathematical expression (2), by using balance of forces in the lateral direction and moment of the vehicle.

[Math. 2]

$$mV(\dot{\beta}+\gamma)=-Cpf(\beta+l_f\gamma/V-\delta)-Cpr(\beta-l_r\gamma/V)$$

$$I\dot{\gamma}=-Cpf(\beta+l_f\gamma/V-\delta)l_f+Cpr(\beta-l_r\gamma/V)l_r \quad (2)$$

In these equations, A, B, C and D shown in FIG. 32 are matrices determined by the linear two-wheel vehicle model. By setting the tire steer angle as an input u, and the yaw rate and lateral acceleration as an output γ, it is possible to obtain a state equation (output equation) of the mathematical expression (2), expressed by a following mathematical expression (3).

[Math. 3]

$$\dot{x} = Ax + Bu, \quad (3)$$

$$x = \begin{pmatrix} \beta \\ \gamma \end{pmatrix},$$

$$u = \delta$$

$$y = Cx + Du,$$

$$y = \begin{pmatrix} \gamma \\ Gy \end{pmatrix}$$

$$A = \begin{pmatrix} -\dfrac{Cpf + Cpr}{mV} & -\dfrac{Cp_f l_f - Cp_r l_r}{mV^2} - 1 \\ -\dfrac{Cp_f l_f - Cp_r l_r}{I} & -\dfrac{Cp_f l_f^2 + Cp_r l_r^2}{IV} \end{pmatrix}$$

$$B = \begin{pmatrix} \dfrac{Cpf}{mV} \\ \dfrac{Cp_f l_f}{I} \end{pmatrix},$$

$$C = \begin{pmatrix} 0 & 1 \\ Va_{11} & V(a_{12}+1) \end{pmatrix},$$

$$D = \begin{pmatrix} 0 \\ Vb_1 \end{pmatrix}$$

In these equations, m is the vehicle mass, I is a yawing moment of inertia, If is a distance between the center of gravity of the vehicle and the front axle, Ir is a distance between the center of gravity of the vehicle and the rear axle, Cpf is a front wheel cornering power (a total for the left and right wheels), Cpr is a rear wheel cornering power (a total for the left and right wheels), V is the vehicle body speed, β is the vehicle side slip angle, γ is the yaw rate, Gy is the lateral acceleration, and a11, a12 and b1 are elements of the matrices A and B.

On the basis of this state equation, the linear two-input observer 61 is formed by setting the yaw rate and lateral acceleration as input, and using an observer gain K1. Observer gain K1 is a value so set as to restrain influence from modeling error and to enable stable estimation. It is possible to replace the observer by actual measurement using GPS (Global Positioning System) or other technique or an estimation method different from the above-mentioned estimation.

Linear two-input observer 25 includes a compensator 63 for β estimation, used to modify an input of an integrator 62. With this β estimation compensator 63, the linear two-input observer 61 can ensure sufficient estimation accuracy even in the limit or critical region. By the use of β estimation compensator 63, it is possible to estimate sideslip angle β accurately even in the case of change of the road surface p condition, and the case of a critical vehicle running state, as well as in the linear region in which a road-surface μ state presupposed at the time of designing the linear two-wheel vehicle model exists and the characteristic of the tire sideslip angle does not become nonlinear.

Figure 33:
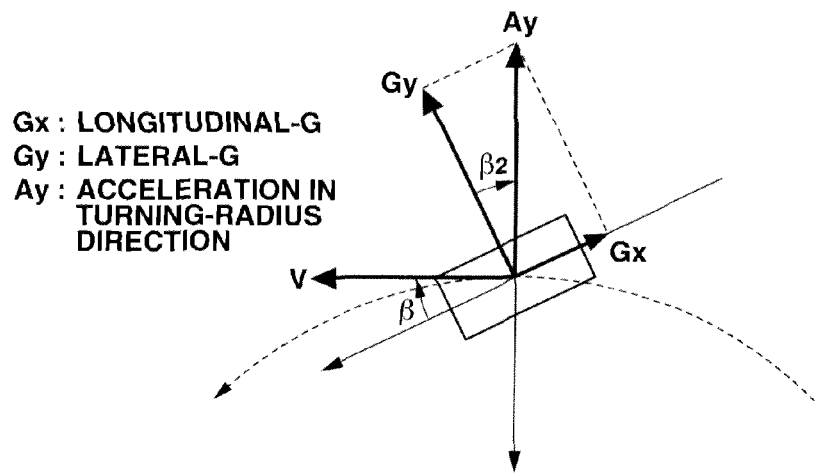
FIG. 33 is a view used for explanting field forces acting on a vehicle body in a turning motion.

FIG. 33 shows the vehicle in a turning motion with vehicle body sideslip angle β. As shown in FIG. 33, the field force acting on the vehicle body, that is, the centrifugal force acting outwards from the turning center, is also generated in the direction deviated from the vehicle widthwise direction by the amount corresponding to sideslip angle β. Therefore, β estimation compensator 63 calculates a deviation β2 of the field force according to a following mathematical expression (4). This deviation β2 serves as a reference value (target value) G used to modify the vehicle sideslip angle β estimated by linear two-input observer 61.

[Math 4]

$$\beta_2 = \frac{1}{2}\pi - A\tan\left(\frac{Gy}{Gx}\right) \quad (4)$$

Figure 34:
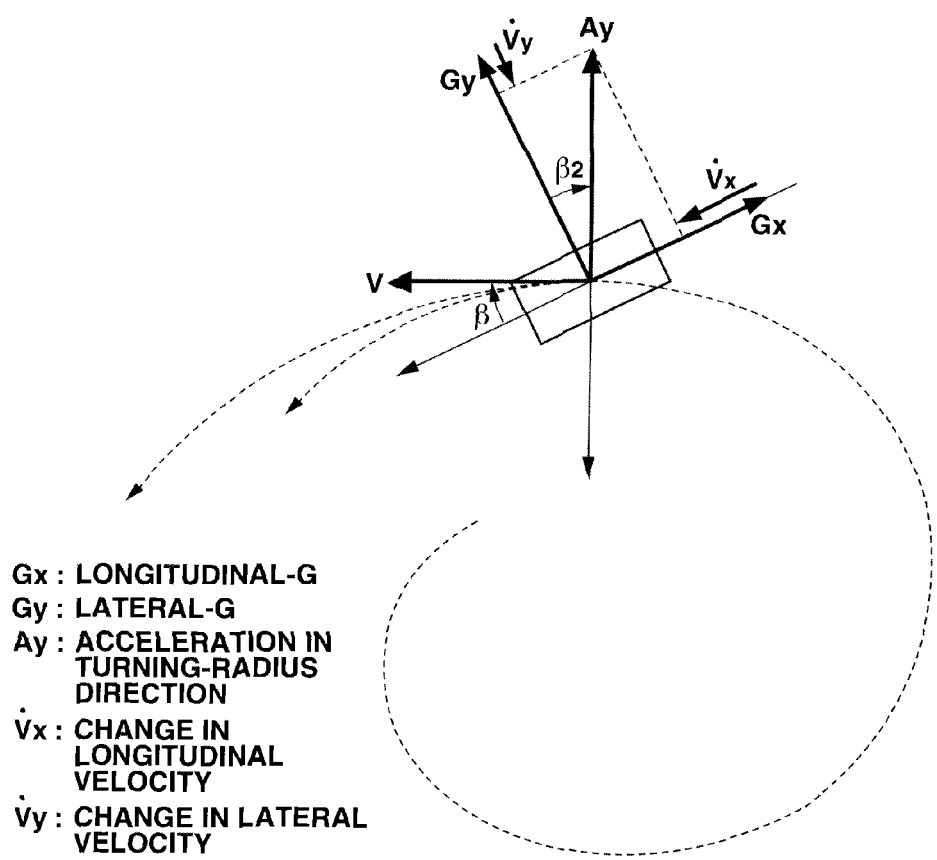
FIG. 34 is a view used for explaining field forces acting on the body of the vehicle in a turning motion.

In this equation, Gx is the longitudinal acceleration. Moreover, as shown in FIG. 34, balance of forces due to speed changes is taken into account. Accordingly, by extracting only components due to the turning motion, the expression (4) can be rewritten as a following mathematical expression (5).

[Math 5]

$$\beta_2 = \frac{1}{2}\pi - A\tan\left(\frac{Gy - \dot{V}y}{Gx - \dot{V}x}\right) \quad (5)$$

The β estimation compensator 63 subtracts the target value β2 from the sideslip angle β estimated by linear two-input observer 61. Moreover, β estimation compensator 63 multiplies the result of the subtraction by a compensation gain K2 set according to a control map of FIG. 35. Then, β estimation compensator 63 uses the result of the multiplication as an input to integrator 62.

Figure 35:
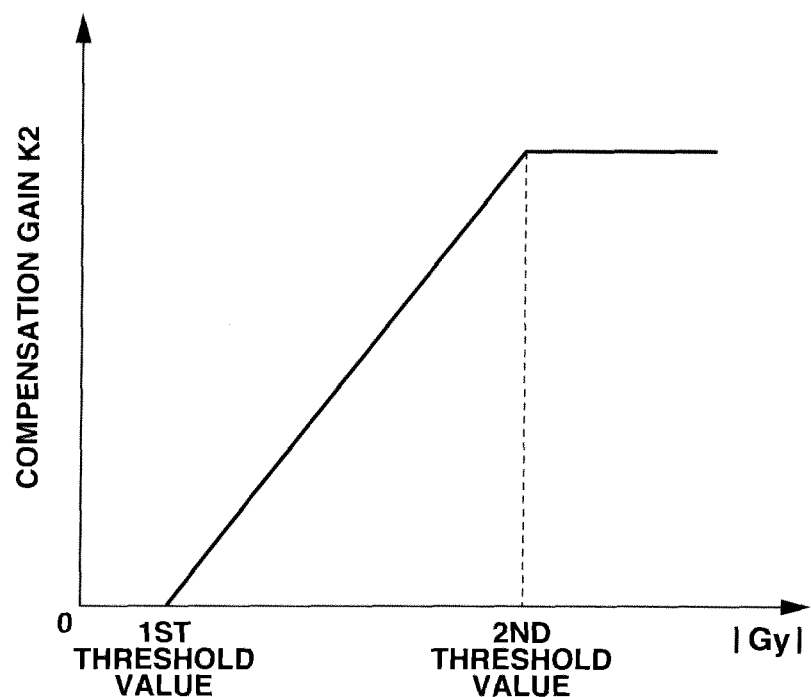
FIG. 35 is a characteristic view used for explaining a control map for setting a compensation gain.

In the control map shown in FIG. 35, compensation gain K2 is set equal to zero when the absolute value (|Gy|) of lateral acceleration Gy of the vehicle is less than or equal to a first threshold value, and held at a relatively large constant value when the absolute value of lateral acceleration Gy of the vehicle is greater than or equal to a second threshold value which is greater than the first threshold value. When the absolute value of the vehicle lateral acceleration Gy is intermediate between the first and second threshold values, the compensation gain K2 is increased as the absolute value of lateral acceleration Gy increases.

With the control map of FIG. 35 in which compensation gain K2 is set equal to zero when the absolute value of lateral acceleration Gy is smaller than or equal to the first threshold value and close to zero, the system does not perform erroneous modification since there is no need of modification in a situation, such as a straight ahead driving situation, in which no turning G is produced. Moreover, in the control map of FIG. 35, the feedback gain (compensation gain) K2 is increased in proportion to the absolute value of lateral acceleration Gy when the absolute value of lateral acceleration Gy becomes greater than the first threshold value (0.1 G, for example), and the compensation gain K2 is held invariably at the constant value to stabilize the control when the absolute value of lateral acceleration Gy becomes greater than or equal to the second threshold value (0.5G, for example). By adjusting the compensation gain K2 in this way, the system improves the estimation accuracy of sideslip angle β.

Then, tire slip angle estimating section 44 calculates front and rear wheel slip angles βf and βr (wheel slip angles βtf and βtr), in accordance with the thus-calculated vehicle sideslip angle (vehicle slip angle)β, by using following expression (6).

[Math 6]

$$\beta_f = \beta l_f \gamma / V - \delta$$

$$\beta_r = \beta - l_r \gamma / V \quad (6)$$

Tire slip angle estimating section 44 outputs the calculated front and rear wheel slip angles βtf and βtr (βt) to Fy/βt calculating section 47.

Lateral force estimating section 45 calculates front and rear wheel lateral forces Fyf and Fyr, in accordance with yaw rate γ sensed by yaw rate sensor 2 and lateral acceleration Gy sensed by lateral acceleration sensor 3 by using a following expression (7).

[Math 7]

$$mGy = Fyf + Fyr$$

$$\dot{I}\gamma = Fyf \cdot l_f - Fyr \cdot l_r \quad (7)$$

Figure 36:
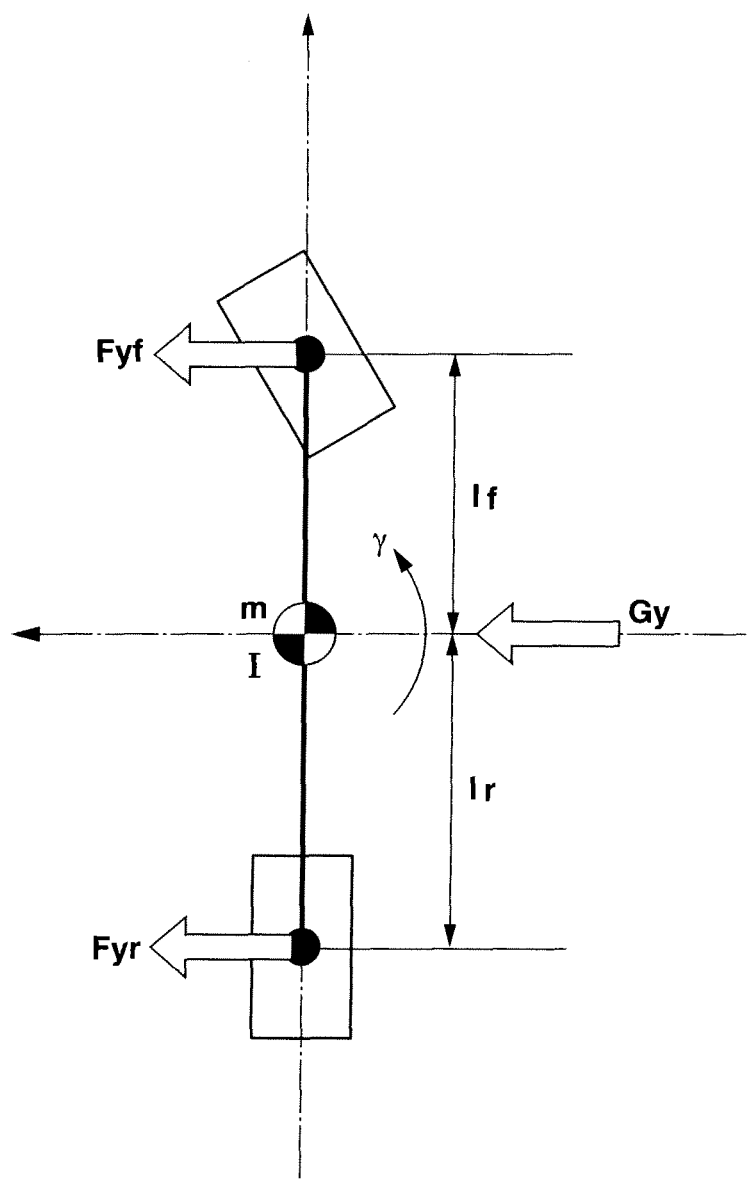
FIG. 36 is a view used for explaining a linear two-wheel model of a vehicle.

Yaw rate γ and lateral acceleration Gy are quantities as shown in FIG. 36. Lateral force estimating section 45 outputs the calculated lateral forces Fyf and Fyr to Fy/βt calculating section 47. Each of the front and rear wheel lateral forces Fyf and Fyr is a resultant force of the left and rear two wheels on the front or rear side.

The Fy/βt calculating section 47 calculates the ratios (Fyf/βtf, Fyr/βtr) of the lateral forces Fyf and Fyr and slip angles βtf and βtr in accordance with front and rear wheel slip angles βtf and βtr and front and rear wheel lateral forces Fyf and Fyr calculated by tire slip angle estimating section 44 and lateral force estimating section 45. Fy/βt calculating section 47 outputs the results of the calculation to the tire grip state calculating section 48.

The tire grip state calculating section (μ gradient calculating section) 48 estimates the front wheel grip state and rear wheel grip state in accordance with the ratios (Fxf/λf, Fxr/λr) of the front and rear wheel longitudinal forces Fxf and Fxr and front and rear wheel slip rates λf and λr calculated by Fx/λ calculating section 46, and the ratios (Fyf/βtf, Fyr/βtr) of the front and rear wheel lateral forces Fyf and Fyr and front and rear wheel slip angles βtf and βtr calculated by Fy/βt calculating section 47. That is, tire grip state calculating section 48 estimates the μ gradient of the front wheels and the μ gradient of the rear wheels. To this end, tire grip state calculating section 48 has the 3D μ gradient characteristic map shown in FIG. 29. Tire grip state calculating section 48 has such 3D μ gradient characteristic maps for the front wheels and for the rear wheels. For example, tire grip state calculating section 48 holds the 3D μ gradient characteristic maps stored in a storage medium such as a memory.

The 3D μ gradient characteristic maps are prepared on the basis of data obtained by performing straight traveling test and turning traveling test on a predetermined reference road surface in advance. Concretely, actual measurement is performed for the longitudinal force-slip rate characteristic curve by straight acceleration experiment with an actual vehicle on the reference road surface. Furthermore, actual measurement is performed for the lateral force (cornering force)—tire slip angle characteristic curve by turning experiment (preferably accelerating circular turning motion with a constant turning radius) with the actual vehicle on the reference road surface. The 3D μ gradient characteristic maps are formed from the results of the actual measurements. When direct measurement is not feasible, it is possible to measure another physical quantity and convert the measured quantity. For example, it is possible to obtain the front and rear tire lateral forces Fyf and Fyr by measuring the lateral acceleration Gy and yaw rate γ, and solving the above-mentioned simultaneous equations (7) including these quantities and the vehicle parameters (see FIG. 36).

Figure 37:
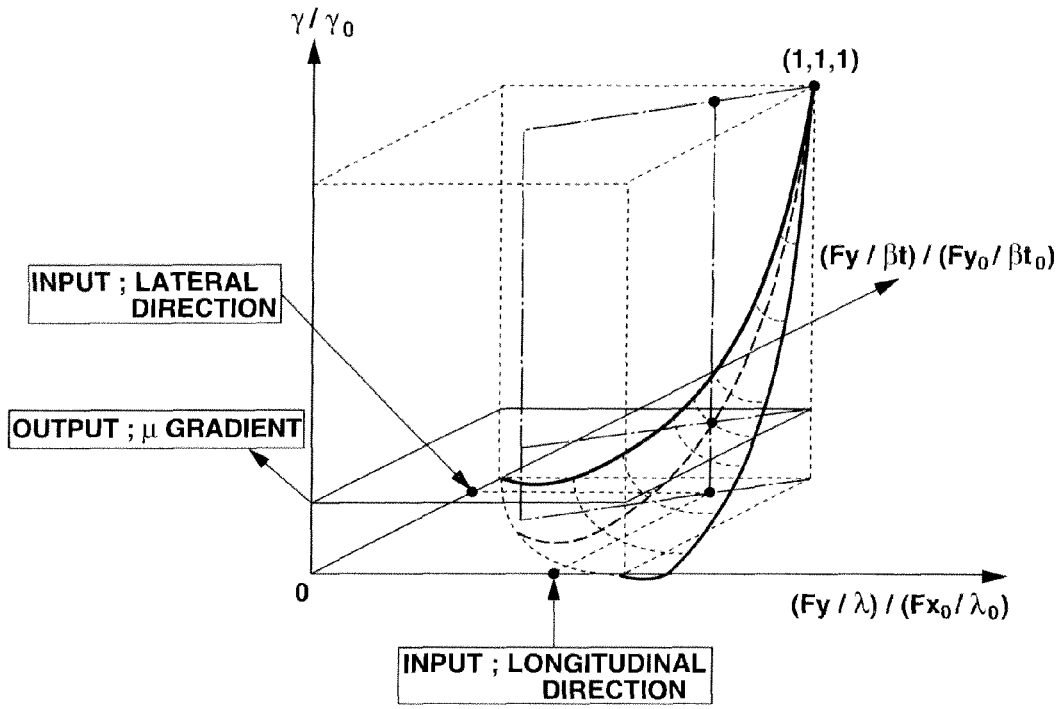
FIG. 37 is a characteristic view showing a relation between an input (Fx/λ, Fy/βt) and an output (μ gradient γ) of the 3D μ gradient characteristic map.

Accordingly, tire grip state calculating section 48 obtains the μ gradients by looking up or consulting the 3D μ gradient characteristic maps. FIG. 37 shows a relation to obtain the μ gradient from the 3D μ gradient map, as a relation between inputs and output of the 3D μ gradient map. As shown in FIG. 37, tire grip state calculating section 48 refers to the 3D μ gradient characteristic map for the front wheels, uses, as inputs, the ratio (Fxf/λf) of the front wheel longitudinal force Fxf and front wheel slip rate λf, and the ratio (Fyf/βtf) of the front wheel lateral force Fyf and front wheel slip angle βtf, and calculates (or outputs) the front wheel μ gradient (γ/γ0) of the front wheels corresponding to the inputs. Similarly, tire grip state calculating section 48 refers to the 3D μ gradient characteristic map for the rear wheels, uses, as inputs, the ratio (Fxr/λr) of the rear wheel longitudinal force Fxr and rear wheel slip rate λr, and the ratio (Fyr/βtr) of the rear wheel lateral force Fyr and rear wheel slip angle βtr, and calculates (outputs) the rear wheel μ gradient (γ/γ0) of the rear wheels corresponding to the inputs.

In this case, by so doing, the tire grip state calculating section 48 determines the μ gradient (γ/γ₀) of one characteristic curve (corresponding to the 2D μ gradient characteristic map) constituting the 3D μ gradient characteristic map (characteristic surface). That is, in the 3D μ gradient characteristic map as in the 2D μ gradient characteristic map (FIG. 6 and FIG. 14), the μ gradient in the form of a tangent slope of a tire characteristic curve is a grip characteristic parameter, a variable representing a tire grip state or a parameter representing a saturation state of a force the tire can develop in the lateral direction. Therefore, from the μ gradient, the system can determine that the grip force of the tire is in a limit region. As a result, the system can estimate the margin of the tire grip force to the friction limit properly even when the wheel gripping force is in a limit region.

Furthermore, tire grip state calculating section 48 decomposes each of the μ gradients (γ/γ0) of the front wheels and the rear wheels into a component contributing in the longitudinal direction and a component contributing in the lateral direction. Without such decomposition, the calculated p gradient (γ/γ0) is a quantity in the direction of the resultant force F of longitudinal force Fx and lateral force Fy. The μ gradient (γ/γ0) in the direction of the resultant force F is decomposed into the longitudinal component contributing in the longitudinal direction and the lateral component contributing in the lateral direction, and outputted. The component contributing in the longitudinal direction of the calculated μ gradient (γ/γ0) (hereinafter referred to as μ gradient longitudinal component) is proportional to the μ gradient in the longitudinal direction of the wheel. The component contributing in the lateral direction of the calculated μ gradient (γ/γ0) (hereinafter referred to as p gradient lateral component) is proportional to the μ gradient in the lateral direction of the wheel. Tire grip state calculating section 48 outputs the μ gradient longitudinal component to longitudinal force correction command calculating section 49, and outputs the μ gradient lateral component to turning characteristic calculating section 50.

Figure 38:
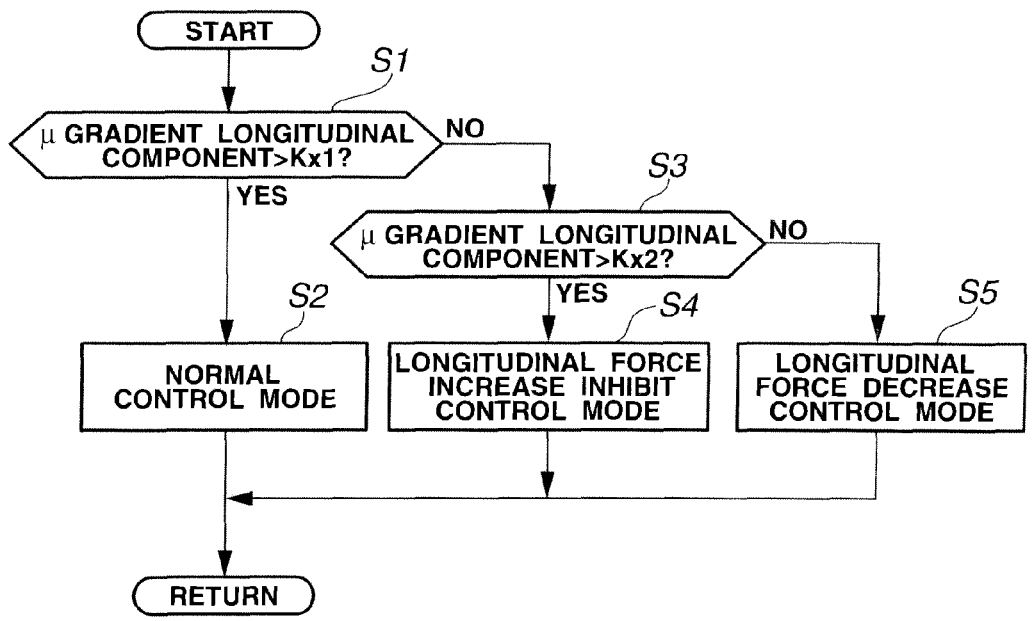
FIG. 38 is a flowchart showing a process of a longitudinal force correction command calculating section, based on a p gradient longitudinal component.

The longitudinal force correction command calculating section 49 outputs a longitudinal force control correction command in accordance with the μ gradient longitudinal component. FIG. 38 shows an example of the process. As shown in FIG. 38, first at a step S1, longitudinal force correction command calculating section 49 determines whether the μ gradient longitudinal component is greater than a predetermined threshold Kx1 or not. The predetermined threshold Kx1 is an experimental value, an empirical value or a theoretical value. For example, predetermined threshold Kx1 is an arbitrary positive value. The μ gradient longitudinal component is a quantity obtained from μ gradient nondimensionalized in the form of γ/γ0. Accordingly, the predetermined threshold Kx1 is a value determined in consideration of the nondimensionalization.

When the μ gradient longitudinal component is greater than predetermined threshold Kx1 (the μ gradient longitudinal component>Kx1), the longitudinal force correction command calculating section 49 proceeds to a step S2. When the μ gradient longitudinal component is smaller than or equal to predetermined threshold Kx1 (the μ gradient longitudinal component≤Kx1), then longitudinal force correction command calculating section 49 proceeds to a step S3. When the μ gradient longitudinal component is Kx0 in the linear region (the region in which the relationship between change in the wheel force and change in the slip degree is linear), then Kx0 is greater than predetermined threshold Kx1 (Kx0>Kx1).

At step S2, longitudinal force correction command section 49 judges that the tire is in a grip state (higher grip state), and performs a normal longitudinal force control (normal control mode). Accordingly, the control correction command of the longitudinal force is not outputted to the drive/brake motor ECU 22, by longitudinal force correction command section 49. Alternatively, longitudinal force correction command calculating section 49 outputs a control correction command enabling the drive/brake motor ECU 22 to perform the normal longitudinal force control. Then, longitudinal force correction command calculating section 49 terminates the process shown in FIG. 38.

At step S3, longitudinal force correction command calculating section 49 determines whether the μ gradient longitudinal component is greater than a predetermined threshold Kx2 or not. Predetermined threshold Kx2 is an experimental value, an empirical value or a theoretical value. Predetermined threshold Kx2 is smaller than the predetermined threshold Kx1 (Kx2<Kx1). For example, predetermined threshold Kx2 is a value close to zero. The μ gradient longitudinal component is a quantity obtained from μ gradient nondimensionalized in the form of γ/γ0. Accordingly, the predetermined threshold Kx2 is a value determined in consideration of the nondimensionalization.

When the μ gradient longitudinal component is greater than predetermined threshold Kx2 (Kx1≥the μ gradient longitudinal component>Kx2), the longitudinal force correction command calculating section 49 proceeds to a step S4. When the μ gradient longitudinal component is smaller than or equal to predetermined threshold Kx2 (the μ gradient longitudinal component≤Kx2), then longitudinal force correction command calculating section 49 proceeds to a step S5.

At step S4, longitudinal force correction command section 49 judges that the condition is in the nonlinear state, but the grip force has not yet reached the saturation point, and performs a longitudinal force control for restraining the longitudinal force from further increasing (longitudinal force increase inhibit control mode). Accordingly, longitudinal force correction command calculating section 49 outputs a control correction command to restrain an increase of the longitudinal force based on an accelerator operation or a brake operation, to drive/brake motor ECU 22. For, example, longitudinal force correction command calculating section 49 outputs the control correction command which is set equal to a value for subtracting an increase quantity of the longitudinal force due to the accelerator operation or brake operation. Then, longitudinal force correction command calculating section 49 terminates the process shown in FIG. 38.

At step S5, longitudinal force correction command calculating section 49 judges that the condition is in the region in which the grip force is saturated, and performs the longitudinal force control (longitudinal force decrease control mode)

to recover the grip force by decreasing the longitudinal force. Accordingly, longitudinal force correction command calculating section 49 outputs, to drive/brake motor ECU 22, the control correction command to decrease the longitudinal force (drain the longitudinal force). For example, even in the case of an accelerator operation or a brake operation, the longitudinal force correction command calculating section 49 outputs the control correction command to decrease the longitudinal force while cancelling an increase of the longitudinal force due to that operation. Then, longitudinal force correction command calculating section 49 terminates the process of FIG. 38.

As explained above, longitudinal force correction command calculating section 49 performs the process in accordance with the μ gradient longitudinal component. Longitudinal force correction command calculating section 49 performs this process in accordance with each of the μ gradient longitudinal components of the front wheels and the rear wheels.

Figure 39:
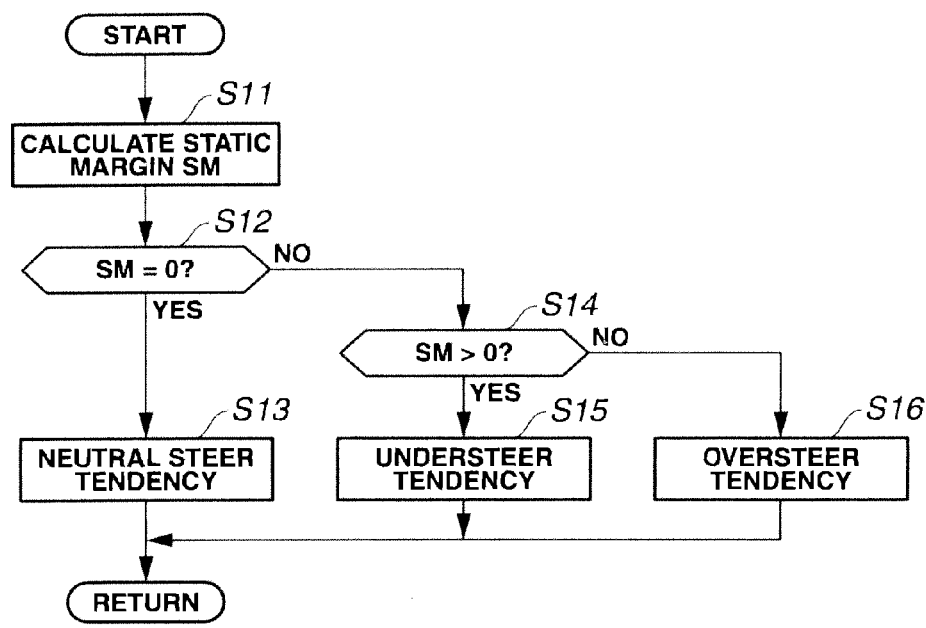
FIG. 39 is a flowchart showing a process of a turning characteristic calculating section, based on a μ gradient lateral component.

The turning characteristic calculating section 50 determines a turning state (vehicle behavior) in accordance with the μ gradient lateral component according to a judging process. FIG. 39 shows an example of the judging process. As shown in FIG. 39, first at a step S11, turning characteristic calculating section 50 calculates a static margin SM serving as an index of the vehicle behavior. Turning characteristic calculating section 50 of this example calculates the static margin SM in accordance with the front and rear wheel μ gradient lateral components Kf and Kr, by using a following expression (8).

[Math 8]

$$SM = -\frac{l_f K_f - l_r K_r}{(l_f + l_r)(K_f + K_r)} \quad (8)$$

Static margin SM is a quantity indicative of the ease of occurrence of drift-out and spin. Moreover, static margin SM is a quantity indicative of a saturation state of the tire lateral force. For example, when the grip condition of front wheels 11FL, 11FR reaches a limit (the tire lateral force becomes saturated), and the front wheel μ gradient lateral component Kf becomes zero or negative, the static margin SM becomes smaller. That is, the static margin SM becomes smaller when the possibility of drift-out increases in the state (saturated state of the wheel force) in which the wheel force is not increased at the front wheels irrespective of an increase of the slip degree.

At a next step S12, turning characteristic calculating section 50 determines whether the static margin SM calculated at S11 is equal to zero or not. Turning characteristic calculating section 50 proceeds to a step S13 when static margin SM is equal to zero (SM=0), and to a step S14 when static margin SM is not equal to zero (SM≠0). It is optional to determine that static margin SM is equal to zero when static margin SM is within a predetermined range including zero.

At step S14, turning characteristic calculating section 50 determines whether static margin SM is positive or not. Turning characteristic calculating section 50 proceeds to a step S15 when static margin SM is positive (SM>0), and to a step S16 when static margin SM is not positive (SM<0).

At step S13, turning characteristic calculating section 50 judges that the turning characteristic of the vehicle tends to be neutral steer (the possibility of becoming neutral steer is high). At step S15, turning characteristic calculating section 50 judges that the turning characteristic of the vehicle tends to be understeer (the possibility of becoming understeer is high). At step S16, turning characteristic calculating section 50 judges that the turning characteristic of the vehicle tends to be oversteer (the possibility of becoming oversteer is high). The turning characteristic calculating section 50 outputs the result of the judgment to the turning assist command calculating section 51

In this way, turning characteristic calculating section 50 performs operations in accordance with the μ gradient lateral components of the front and rear wheels.

Figure 40:
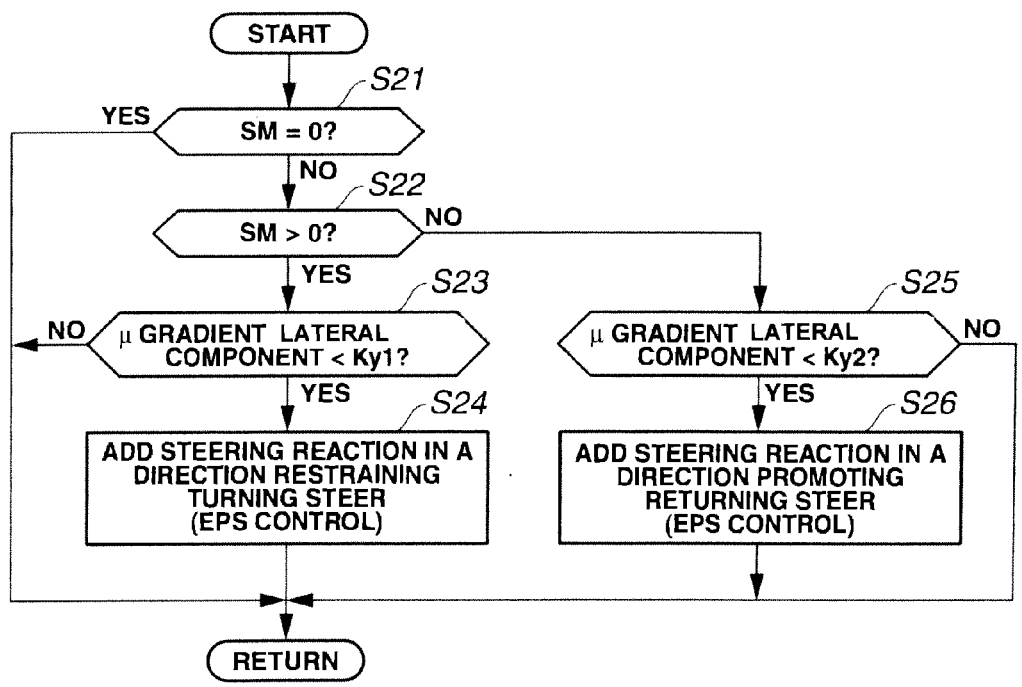
FIG. 40 is a flowchart showing a process of a turning assist command calculating section, based on a static margin SM.

The turning assist command calculating section 51 calculates the turning assist command in accordance with the result of judgment of turning characteristic calculating section 50. FIG. 40 shows an example of the process performed by turning assist command calculating section 51. As shown in FIG. 40, first, at a step S21, turning assist command calculating section 51 determines whether the turning characteristic is a neutral steer tendency (SM=0) or not. When the turning characteristic is the neutral steer tendency, then the turning assist command calculating section 51 terminates the process of FIG. 40. Otherwise (when SM≠0, in the case of understeer tendency or oversteer tendency), the turning assist command calculating section 51 proceeds to a step S22.

At step S22, turning assist command calculating section 51 determines whether the turning characteristic is an understeer tendency (SM>0) or not. Turning assist command calculating section 51 proceeds to a step S23 when the turning characteristic is the understeer tendency (the possibility of becoming understeer is high), and proceeds to a step S25 otherwise (SM≤0, the oversteer tendency).

At step S23, turning assist command calculating section 51 determines whether the front wheel μ gradient lateral component (lateral grip) is smaller than a predetermined threshold Ky1 or not. Predetermined threshold Ky1 is an experimental value, an empirical value or a theoretical value. For example, predetermined threshold Ky1 is a value close to zero. The μ gradient lateral component is a quantity obtained from the μ gradient nondimensionalized in the form of γ/γ0. Accordingly, the predetermined threshold Ky1 is a value determined in consideration of the nondimensionalization.

The turning assist command calculating section 51 proceeds to a step S24 when the front wheel μ gradient lateral component is smaller than predetermined threshold Ky1 (μ gradient lateral component<Ky1), and terminates the process of FIG. 40 when the front wheel μ gradient lateral component is greater than or equal to predetermined threshold Ky1 (μ gradient lateral component≥Ky1)

At step S24, the turning assist command calculating section 51 judges that the possibility of drift-out of the vehicle is high, and performs the steering reaction control of EPS. In particular, turning assist command calculating section 51 outputs the turning assist command for adding the steering reaction in a direction restraining a driver's steering operation in the turning direction away from the straight ahead neutral position, to EPSECU 6. Then, steering assist command calculating section 51 terminates the process shown in FIG. 40.

At step S25, turning assist command calculating section 51 determines whether the front wheel μ gradient lateral component is smaller than a predetermined threshold Ky2 or not. Predetermined threshold Ky2 is an experimental value, an empirical value or a theoretical value. Predetermined threshold Ky2 may be set equal to the predetermined threshold Ky1 or may be set equal to a value different from the predetermined threshold Ky1. For example, predetermined threshold Ky2 is a value close to zero. The μ gradient lateral component is a quantity obtained from the μ gradient nondimensionalized in the form of γ/γ0. Accordingly, the predetermined threshold Ky2 is a value determined in consideration of the nondimensionalization.

The turning assist command calculating section 51 proceeds to a step S26 when the front wheel μ gradient lateral component is smaller than predetermined threshold (μ gradient lateral component<Ky2), and terminates the process of FIG. 40 when the front wheel μ gradient lateral component is greater than or equal to predetermined threshold Ky2 (μ gradient lateral component≥Ky2).

At step S26, the turning assist command calculating section 51 judges that the possibility of spin of the vehicle is high, and performs the steering reaction control of EPS. In particular, turning assist command calculating section 51 outputs the turning assist command to add the steering reaction in the direction for inducing a drivers' steering operation in the returning direction toward the neutral position, to EPSECU 6. That is, torque is added so as to assist the counter steer (returning steering). Then, turning assist command calculating section 51 terminates the process of FIG. 40.

In this way, turning assist command calculating section 51 performs the operations on the basis of the result of judgment of turning characteristic calculating section 50.

(Actions and Operations)

Figure 41:
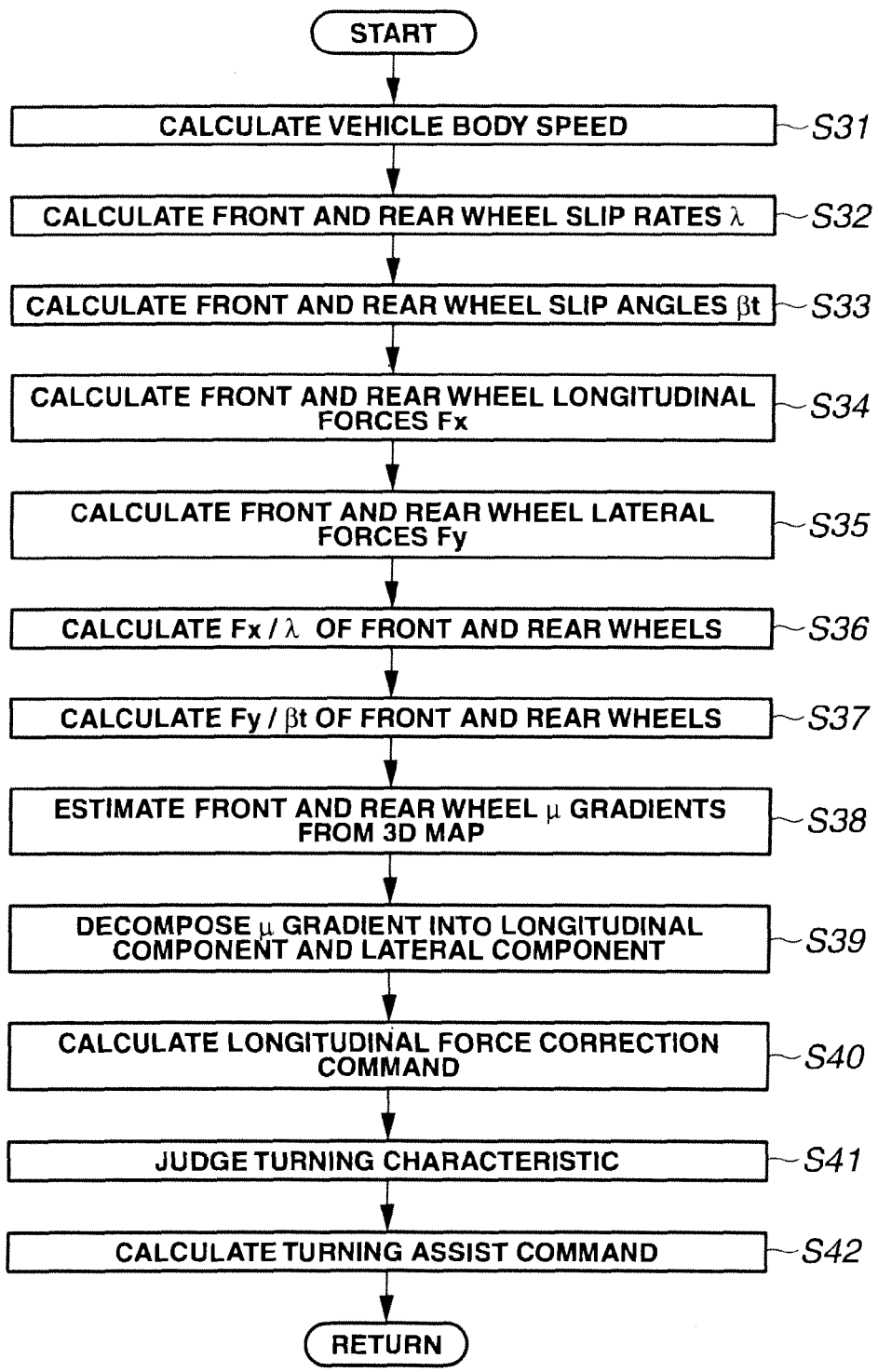
FIG. 41 is a flowchart showing a calculation process of a vehicle travel state estimating device.

FIG. 41 shows one example of the process in the vehicle travel state estimating device 8. Vehicle travel state estimating device 8 performs this process during travel or movement of the vehicle.

First, in vehicle travel state estimating device 8, the vehicle body speed calculating section 41 calculates the vehicle body speed (step S31). In vehicle travel state estimating device 8, the slip rate estimating section 42 calculates the front wheel slip rate λf and rear wheel slip rate λr in accordance with the vehicle body speed (step S32). Furthermore, the tire slip angle estimating section 44 in the vehicle travel state estimating device 8 calculates the front wheel slip angle βtf and rear wheel slip angle βtr (step S33). In vehicle travel state estimating device 8, the longitudinal force estimating section 43 calculates the front wheel longitudinal force Fxf and rear wheel longitudinal force Fxr (step S34). Furthermore, the lateral force estimating section 45 in vehicle travel state estimating device 8 calculates the front wheel lateral force Fyf and rear wheel lateral force Fyr (step S35). In vehicle travel state estimating device 8, the Fx/λ calculating section 46 calculates the ratios (Fxf/λf, Fxr/λr) of the longitudinal force Fxf, Fxr to the slip rate (λf, λr) (step S36). Furthermore, the Fy/βt calculating section 47 calculates the ratios (Fyf/βtf, Fyr/βtr) of the lateral force Fyf, Fyr to the slip angle βtf, βtr (step S37).

Subsequently, the tire grip state calculating section 48 in vehicle travel state estimating device 8 estimates the μ gradient (the grip characteristic parameter) on the basis of the 3D μ gradient characteristic map (step S38). That is, tire grip state calculating section 48 calculates the μ gradient (γ/γ0) for each of the front wheel pair and the rear wheel pair during traveling, corresponding to the ratio (Fx/λ) of the longitudinal force Fxf or Fxr to the slip rate λf or λr and the ratio (Fy/βt) of the lateral force Fyf or Fyr to the slip angle βtf or βtr by using the 3D μ gradient characteristic map for the front wheels or the 3D μ gradient characteristic map for the rear wheels. Then, tire grip state calculating section 48 decomposes each of the front wheel μ gradient and rear wheel μ gradient (γ/γ0) into the component contributing in the longitudinal direction (the μ gradient longitudinal component) and the component contributing in the lateral direction (the μ gradient lateral component) (step S39).

In vehicle travel state estimating device 8, the longitudinal force correction command calculating section 49 outputs the control correction command for the longitudinal force (that is each of the front wheel longitudinal force and the rear wheel longitudinal force) in accordance with the front wheel or rear wheel μ gradient longitudinal component (step S40). On the other hand, the turning characteristic estimating section 50 in vehicle travel state estimating device 8 determines the turning state (vehicle behavior) in accordance with the front wheel μ gradient lateral component and the rear wheel μ gradient lateral component (step S41). In accordance with the result of the determination of turning characteristic estimating section 50, the turning assist command calculating section 51 calculates the turning assist command for the control for adding the steering reaction (EPS control) (step S42).

Thus, vehicle body travel state estimating device 8 performs the longitudinal force control, and the steering reaction control in the following manner in accordance with the longitudinal component and the lateral component of the μ gradient (grip characteristic parameter).

That is, when the μ gradient longitudinal component is greater than predetermined threshold Kx1 (μ gradient longitudinal component>Kx1), the vehicle travel state estimating device 8 judges that the wheel satisfying that condition is in the grip state, and performs the normal longitudinal force control (normal control mode) (S1→S2).

Moreover, when the μ gradient longitudinal component is smaller than or equal to predetermined threshold Kx1 and greater than predetermined threshold Kx2 (Kx1≥μ gradient longitudinal component>Kx2), then the vehicle body travel state estimating device 8 performs the longitudinal force control to restrain the longitudinal force for the wheel satisfying that condition from increasing (longitudinal force increase inhibiting control mode) (S1→S3→S4). Accordingly, the system can prevent the grip force from becoming saturated by an increase of the longitudinal force caused by a driver's accelerator operation or brake operation.

By performing these processes, when the driver performs an accelerator operation or a brake operation (when a request for increasing the longitudinal force is produced) while the μ gradient longitudinal component is greater than predetermined threshold Kx1, then the longitudinal force is increased until the μ gradient longitudinal component becomes smaller than or equal to predetermined threshold Kx1 (until the control enters the longitudinal force increase inhibiting mode).

Moreover, when the μ gradient longitudinal component is smaller than or equal to predetermined threshold Kx2 (Kx2≥μ gradient longitudinal component), the vehicle travel state estimating device 8 performs the longitudinal force control to decrease the longitudinal force (a longitudinal force decrease control mode) for the wheel satisfying that condition (S1→S3→S5). With this control, even if the grip force is saturated, the system can regain the grip force.

In the above-mentioned process, the vehicle travel state estimating device 8 judges the grip state of the wheel only by comparing the μ gradient longitudinal component with predetermined thresholds Kx1 and Kx2. By so doing, vehicle travel state estimating device 8 estimates the margin to the friction limit adequately and performs the longitudinal force control suitable to the estimated margin even when the grip force of the wheel is in the limit state (the saturated state or the state in the vicinity of the saturated state).

Moreover, in accordance with the μ gradient lateral component, the vehicle travel state estimating device 8 calculates the static margin SM (S11). in accordance with the calculated static margin SM, the vehicle travel state estimating device 8 judges the turning state (vehicle behavior) and performs the longitudinal force control based on the result of the judgment. Specifically, vehicle travel state estimating device 8 judges that the turning characteristic is the understeer tendency when static margin SM is positive (SM>0)(at step S15). In this case, vehicle travel state estimating device 8 performs the control to add the steering reaction in the direction restraining the driver steering operation away from the neutral position on the condition that the front wheel μ gradient lateral component is smaller than predetermined threshold Ky1 (S21→S22→S23→S24). Thus, when the grip characteristic parameter decreases, the system performs the control so as to increase the tire slip angle, and thereby prevents drift-out of the vehicle.

Furthermore, vehicle travel state estimating device 8 judges that the turning characteristic is the oversteer tendency when the static margin SM is negative (SM<0)(at step S16). In this case, vehicle travel state estimating device 8 performs the control to add the steering reaction in the direction for inducing the driver to a returning steering operation toward the straight ahead neutral position on the condition that the front wheel μ gradient lateral component is smaller than predetermined threshold Ky2 (S21→S22→S25→S26). With this control, the control system adds the torque so as to assist the counter steer (returning steering), and thereby prevents spin of the vehicle.

In this process, too, the system judges the wheel grip state only by comparing the μ gradient lateral component with predetermined thresholds Ky1 and Ky2. By so doing, the system estimates the margin to the friction limit adequately and performs the steering reaction adding control suitable to the estimated margin even when the grip force of the wheel is in the limit state (the saturated state or the state in the vicinity of the saturated state).

Figure 42:
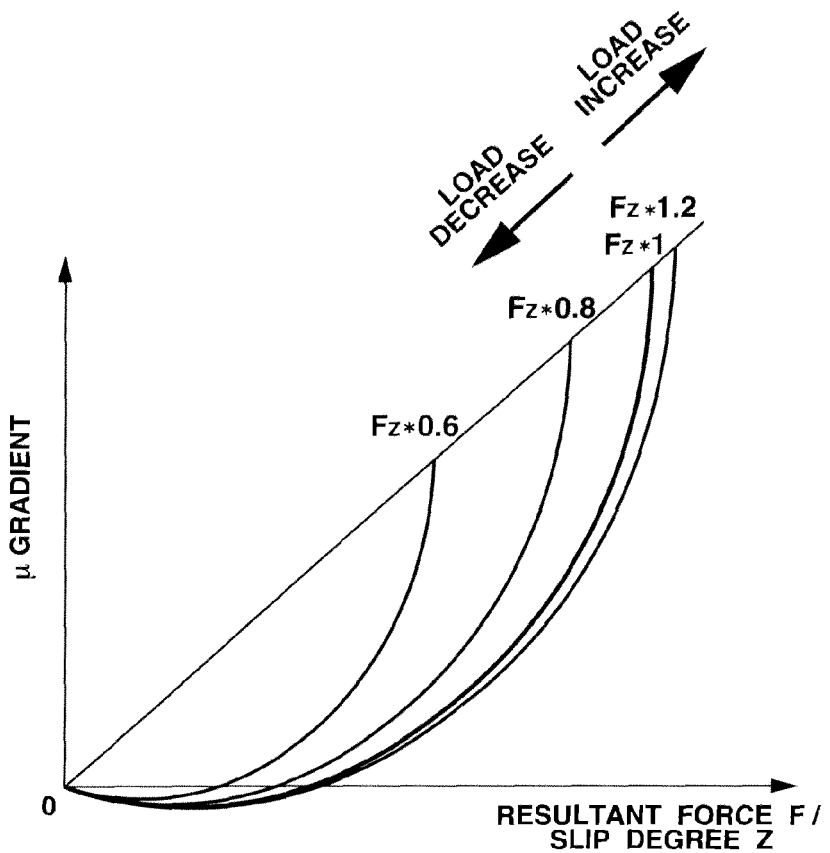
FIG. 42 is a characteristic view showing a relationship between the ratio (F/Z) of the resultant force F and slip degree Z and the tangent slope of the tire characteristic curve (μ gradient) in the case in which the wheel load is varied.

Variations of the First Embodiment (1) It is possible to modify the μ gradient in accordance with variation of the wheel load. FIG. 42 shows a characteristic curve (corresponding to a 2D μ gradient characteristic map) constituting the 3D μ gradient characteristic map (characteristic surface). As shown in FIG. 42, the wheel load is varied by multiplying an initial value Fz of the wheel load (the value of the wheel load obtained when there is no variation), by 0.6, 0.8 and 1.2. The characteristic curve representing the relationship between the ratio (F/Z) of the resultant force F and the slip degree Z and the μ gradient is varied in dependence on the wheel load. Specifically, the characteristic curve is varied in the form of similar characteristic curves (a group of characteristic curves) having different sizes depending on the wheel load, and having similar forms like similar figures having different sizes.

Figure 43:
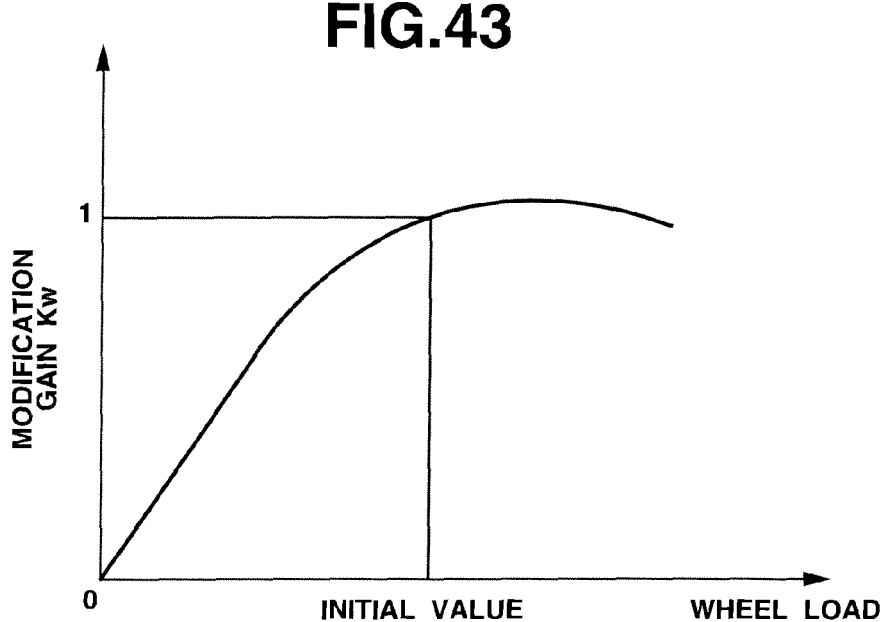
FIG. 43 is a characteristic view showing a relationship between the wheel load and a modification gain Kw.

FIG. 43 shows the variation of the characteristic curve depending on the wheel load, in the form of a relationship of the wheel load and a modification gain (modification coefficient) Kw is for enlarging and reducing the characteristic curve. As shown in FIG. 43, modification gain Kw increases as the wheel load is increased. Moreover, the rate of increase of the modification gain Kw is decreased as the wheel load increases.

Figure 44:
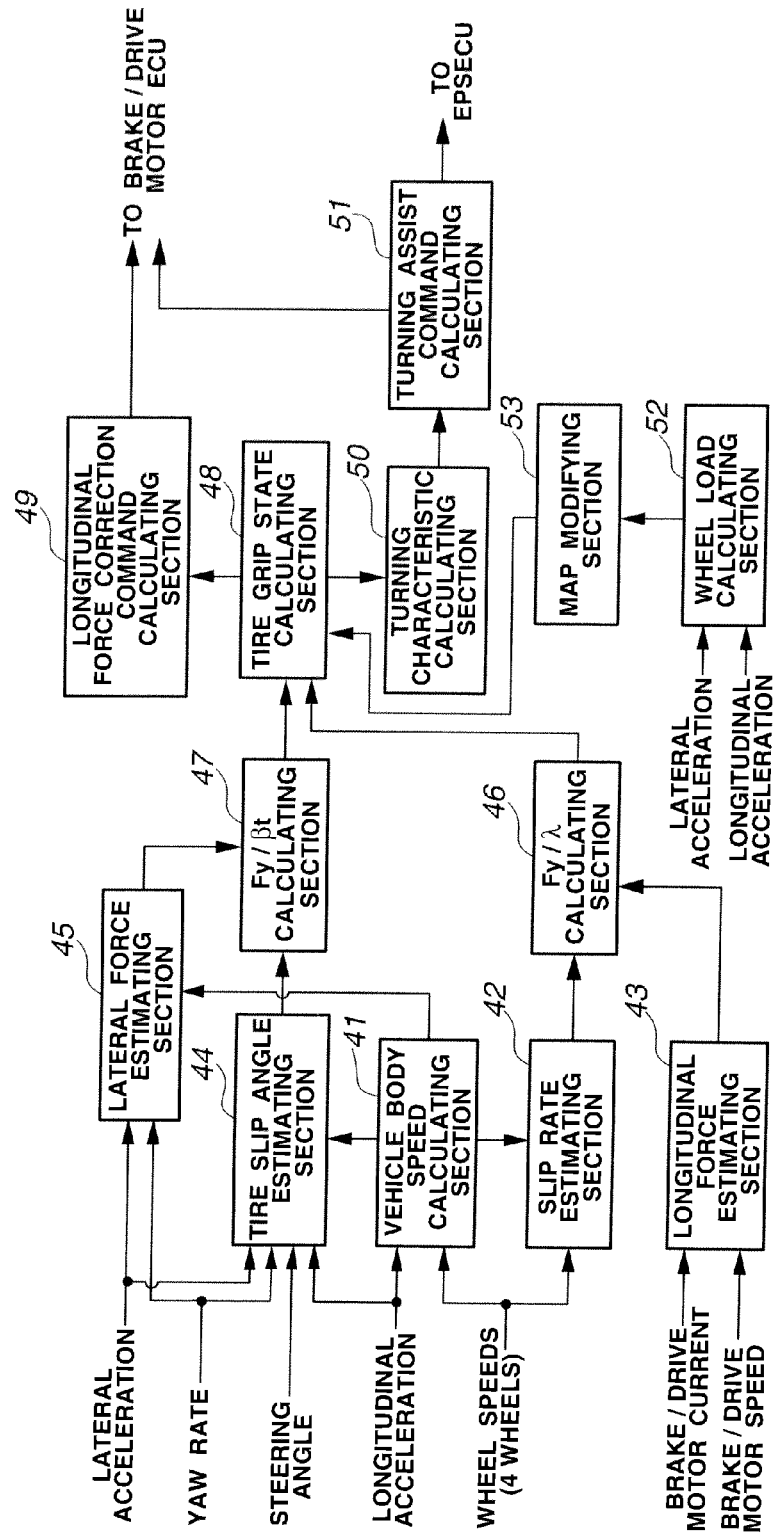
FIG. 44 is a block diagram showing another construction example of the vehicle travel state estimating device in the first embodiment.

FIG. 44 shows one example of the construction for correcting the μ gradient in accordance with variation of the wheel load. As shown in FIG. 44, there are provided a wheel load calculating section 52 and a map modifying section 53.

Figure 45:
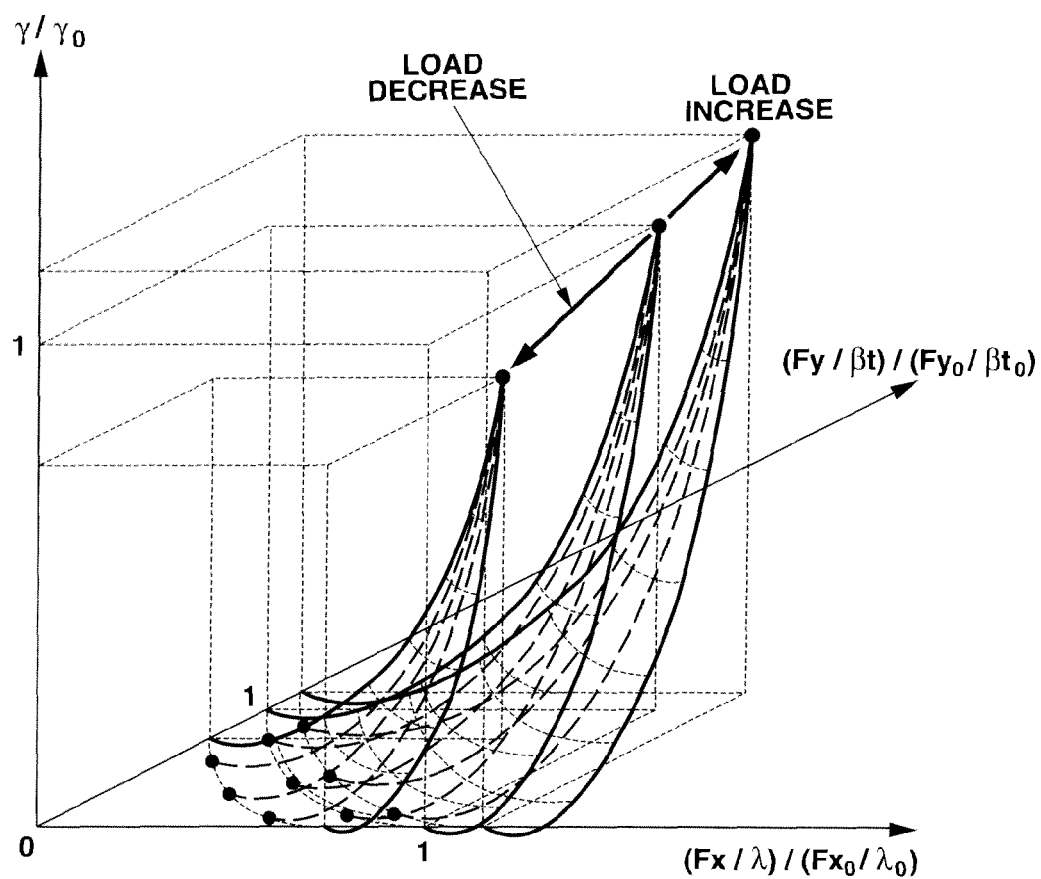
FIG. 45 is a characteristic view showing a 3D μ gradient characteristic map varied in dependence on the wheel load.

The wheel load calculating section 52 calculates a wheel load variation in accordance with the lateral acceleration sensed by the lateral acceleration sensor 3 and the longitudinal acceleration sensed by the longitudinal acceleration sensor 4. Specifically, wheel load calculating section 52 calculates a value of the wheel load variation corresponding to the lateral acceleration and the longitudinal acceleration. Wheel load calculating section 52 outputs the result of the calculation to the map modifying section 53. Map modifying section 53 modifies the 3D μ gradient characteristic map by using the modification gain Kw shown in FIG. 43. In this example, the characteristic curve shown in FIG. 43 is obtained beforehand, as a load modification coefficient map or the like, from results of test using a tire testing machine. Map modifying section 53 determines a value of the correction gain Kw corresponding to a measured value of the wheel load by using the load modification coefficient map, and corrects the μ gradient. Specifically, map modifying section 53 multiplies the input(s) to the 3D μ gradient map (cf. FIG. 37) by 1/Kw, and multiplies the output of the 3D μ gradient map (cf. FIG. 37) by Kw, (2) Furthermore, it is possible to prepare a plurality of 3D μ gradient characteristic maps (characteristic surfaces) corresponding to the wheel load as shown in FIG. 45, to modify the gradient in accordance with the wheel load variation. In this case, the 3D μ gradient characteristic map (characteristic surface) used for calculating the μ gradient is specified or selected in accordance with the measure value of the wheel load.

(3) In the first embodiment, the predetermined nonlinear relation among the two input variables Fx/λ and Fy/βt and the output variable that is the grip characteristic parameter (μ gradient) is in the form of the characteristic map or characteristic figure. By contrast, it is optional to treat such nonlinear relation in the form of mathematical expression(s). Moreover, if possible, it is optional to simplify the nonlinear relation into a linear relationship.

(4) In the first embodiment, the 3D μ gradient characteristic map is obtained by swinging the longitudinal force and the lateral force simultaneously in various directions, that is, by shifting the direction of the resultant force widely. Instead, it is optional to obtain the 3D μ gradient characteristic map by obtaining the μ gradient characteristic map of the longitudinal direction (longitudinal force Fx)(2D μ gradient characteristic map) and the μ gradient characteristic map of the lateral direction (lateral force Fy) (2D μ gradient characteristic map) individually, and complementing the gap between these μ gradient characteristic maps. In this case, the gap between the μ gradient characteristic maps is complemented by using elliptical approximation.

(5) In the first embodiment, the system is arranged to control the turning behavior or behavior in the lateral direction of the vehicle by performing the steering control (steering reaction adding control). However, the system may be arranged to control the vehicle behavior by the turning motion control by the difference between the longitudinal forces of the left and right wheels such as VDC (Vehicle Dynamics Control). In this case, the system can realize a more responsive vehicle behavior stabilizing control (side slip preventing control).

(6) In the first embodiment, the vehicle is a front wheel steering vehicle. However, the vehicle may be a rear wheel steering vehicle having steerable rear wheel(s).

(7) In the first embodiment, the system is arranged to judge the vehicle characteristic or control the vehicle behavior in accordance with the front wheel μ gradient (grip characteristic parameter) and the rear wheel μ gradient (grip characteristic parameter). However, the system may be arranged to judge the vehicle characteristic or control the vehicle behavior in accordance with the left wheel μ gradient (grip characteristic parameter) and the right wheel μ gradient (grip characteristic parameter).

(8) In the first embodiment, the system includes the longitudinal force correction command calculating section 49 to control the longitudinal force in accordance with the μ gradient, and the turning characteristic calculating section 50 and assist command calculating section 51 to control the addition of the steering reaction in accordance with the μ gradient. However, the system may be arranged to include only either of the longitudinal force correction command calculating section 49 and the assist command calculating section 51 (including the turning characteristic calculating section 50). That is, the system may be arranged to perform only one of the longitudinal force control and the steering reaction adding control.

In the first embodiment, each of the construction including the slip rate estimating section 42, longitudinal force estimating section 43 and Fx/λ calculating section 46, and the construction including the tire slip angle estimating section 44, lateral force estimating section 45 and Fy/βt calculating section 47 realizes either of the first input section for setting the first input which is the ratio of the first wheel force acting on the wheel in the first direction in the ground contact surface, to the first wheel slip degree of the wheel, and the second input section for setting the second input which is the ratio of the second wheel force acting on the wheel in the second direction different from the first direction in the ground contact surface, to the second wheel slip degree of the wheel. Furthermore, the tire grip state estimating section 48 realizes the output section for determining the output which is the grip characteristic parameter representing the grip characteristic of the wheel, in accordance with the first and second inputs set by the first and second input sections. That is, the vehicle ground contact surface friction state estimating apparatus is realized, in the first embodiment, by the slip rate estimating section 42, longitudinal force estimating section 43, Fx/λ calculating section 46, tire slip angle estimating section 44, lateral force estimating section 45, Fy/βt calculating section 47 and tire grip state calculating section 48.

In this embodiment, either of the longitudinal force estimating section 43 and lateral force estimating section 45 realizes a first wheel force detecting section for detecting the first wheel force. Either of the slip rate estimating section 42 and tire slip angle estimating section 44 realizes a first wheel slip degree detecting section for detecting a first wheel slip degree. Either of Fx/λ calculating section 46 and Fy/βt calculating section 47 realizes a first dividing section for determining a ratio of the first wheel force to the first wheel slip degree by diving the first wheel force determined by the first wheel force detecting section by the first wheel slip degree detected by the first wheel slip degree detecting section. The other of the longitudinal force estimating section 43 and lateral force estimating section 45 realizes a second wheel force detecting section for detecting the second wheel force. The other of the slip rate estimating section 42 and tire slip angle estimating section 44 realizes a second wheel slip degree detecting section for detecting a second wheel slip degree. The other of Fx/λ calculating section 46 and Fy/βt calculating section 47 realizes a second dividing section for determining a ratio of the second wheel force to the second wheel slip degree by diving the second wheel force determined by the second wheel force detecting section by the second wheel slip degree detected by the second wheel slip degree detecting section.

In the first embodiment, the tire grip state calculating section 48 (3D μ gradient characteristic map) realizes the output section to determine the grip characteristic parameter only from the ratio of the first wheel force and the first slip degree and the ratio of the second wheel force and the second slip degree, without using a friction coefficient of a ground surface.

Furthermore, the tire grip state calculating section 48 (3D μ gradient characteristic map) realizes the output section to determine the grip characteristic parameter in accordance with the ratio of the first wheel force and the first slip degree in a nonlinear region in which the first wheel force varies nonlinearly with the first slip degree, and the ratio of the second wheel force and the second slip degree in a nonlinear region in which the second wheel force varies nonlinearly with the second slip degree.

In the first embodiment, the tire grip state calculating section 48 (3D μ gradient characteristic map) realizes the output section to determine the grip characteristic parameter from the ratio of the first wheel force and the first wheel slip degree and the ratio of the second wheel force and the second wheel slip degree according to a predetermined nonlinear relationship between two input variables represented by the two inputs and an output variable represented by the output. In this case, the μ gradient realizes the grip characteristic parameter which is a quantity representing a margin to a tire friction limit.

In the first embodiment, the slip rate λ and slip angle βt are the wheel slip degrees (first and second wheel slip degrees) which are degrees of slip of the vehicle wheel relative to the ground surface in the direction of the longitudinal force Fx and the direction of the lateral force Fy The tire grip state calculating section 48 (3D μ gradient characteristic map) realizes the output section configured to determine the grip characteristic parameter only from the ratio of the first wheel force and the first slip degree and the ratio of the second wheel force and the second slip degree, without using a friction coefficient of the ground surface.

In the first embodiment, the slip rate λ and slip angle βt are quantities representing a relative velocity vector of the vehicle wheel relative to the ground surface in the direction of the wheel force (the first and second wheel forces). The tire grip state calculating section 48 (3D μ gradient characteristic map) realizes the output section configured to determine the grip characteristic parameter only from the ratio of the first wheel force and the first wheel slip degree and the ratio of the second wheel force and the second wheel slip degree without using the friction coefficient of the ground surface.

In the first embodiment, each of the longitudinal force and lateral force is either of the first and second wheel forces which are tire forces in the first and second directions acting on the tire. The μ gradient (the grip characteristic parameter) is quantity representing a gradient of a tire characteristic curve of a resultant tire force with respect to a resultant wheel slip degree where the resultant wheel slip degree is a wheel slip degree produced in a direction (the direction of the resultant force F) of a combination of the first wheel force and the second wheel force, and the resultant tire force is a combined tire force resulting from the first wheel force and the second wheel force. The tire grip state calculating section 48 (μ gradient characteristic map) realizes the output section configured to determine the gradient of the tire characteristic curve only from the ratio of the first wheel force and the first wheel slip degree and the ratio of the second wheel force and the second wheel slip degree, without using the friction coefficient of the ground surface.

In the first embodiment, the tire characteristic curve (shown in FIG. 23 and FIG. 24, for example) realizes the tire characteristic curve including a linear segment in which the resultant tire force increases linearly from zero when the absolute value of the resultant wheel slip degree increases from zero in a smaller slip region in which the resultant wheel slip degree is smaller, and a nonlinear segment in which the resultant tire force varies nonlinearly when the absolute value of the resultant wheel slip degree increases in a greater slip region in which the absolute value of the resultant wheel slip degree increases beyond the smaller slip region. The grip characteristic parameter increases from zero to a greatest parameter value when at least one of the ratio of the first wheel force and the first wheel slip degree and the ratio of the second wheel force and the second wheel slip degree increases. The greatest parameter value represents the gradient of the linear segment of the tire characteristic curve. The tire grip state calculating section 48 (μ gradient characteristic map) realizes the output section configured to determine the gradient of the nonlinear segment of the tire characteristic curve from the ratio of the first wheel force and the first wheel slip degree and the ratio of the second wheel force and the second wheel slip degree.

In the first embodiment, the tire characteristic curve includes a higher friction tire characteristic curve for a higher friction road surface having a higher friction coefficient, and a lower friction tire characteristic curve for a lower friction road surface having a lower friction coefficient lower than the higher friction coefficient. The μ gradient (the grip characteristic parameter) is a quantity representing gradients of the higher friction tire characteristic and the lower friction tire characteristic. The slip rate estimating section 42, longitudinal force estimating section 43, Fx/λ calculating section 46, tire slip angle estimating section 44, lateral force estimating section 45 and Fy/βt calculating section 47 realizes the input sections configured to determine a current value of the ratio of the wheel force and the wheel slip degree from a current value of the tire force and a current value of the wheel slip degree. The tire grip state calculating section 48 (μ gradient characteristic map) realizes the output section which is configured to determine a current value of the grip characteristic parameter from the current values of the ratios of the wheel force and the wheel slip degree, and to set a value of the gradient of the higher friction tire characteristic curve corresponding to the current value of the tire force and the current value of the wheel slip degree, and a value of the gradient of the lower friction tire characteristic curve corresponding to the current value of the tire force and the current value of the wheel slip degree, equal to each other, and equal to the current value of the grip characteristic parameter.

In the first embodiment, the tire characteristic curve is a characteristic curve representing a tire characteristic dependent on a road surface friction coefficient. The tire grip state calculating section 48 (μ gradient characteristic map) realizes the output section configured to determine the gradient of the tire characteristic curve only from the ratio of the first wheel force and the first wheel slip degree and the ratio of the second wheel force and the second wheel slip degree without using the road surface friction coefficient.

In the first embodiment, the μ gradient (grip characteristic parameter) is a function increasing when at least one of the ratio of the first wheel force and the first wheel slip degree and the ratio of the second wheel force and the second wheel slip degree increases from a predetermined critical ratio value. The predetermined critical ratio value is the value of ratio of the first wheel force and the first wheel slip degree or the value of the ratio of the second wheel force and the second wheel slip degree when the μ gradient is equal to zero. In a greater ratio region greater than the predetermined critical ratio value, when at least one of the ratio of the first wheel force and the first wheel slip degree and the ratio of the second wheel force and the second wheel slip degree increases, the grip characteristic parameter increases nonlinearly so that a rate of increase of the grip characteristic parameter with respect to an increase of that ratio of the wheel force and the wheel slip degree increases.

In the first embodiment, in the 3D μ gradient characteristic map, the grip characteristic parameter is equal to a predetermined critical parameter value when the ratio of the first wheel force and the first slip degree and the ratio of the second wheel force and the second wheel slip degree are equal to the predetermined critical ratio value or values. Alternatively, the grip characteristic parameter is equal to a predetermined critical parameter value when one of the ratio of the first wheel force and the first slip degree and the ratio of the second wheel force and the second wheel slip degree is equal to a greatest value in a range of that ratio, and the other of the ratio of the first wheel force and the first slip degree and the ratio of the second wheel force and the second wheel slip degree is equal to equal to a predetermined critical ratio value. Moreover, in the 3D μ gradient characteristic map, the grip characteristic parameter decreases below the critical parameter value when at least one of the ratio of the first wheel force and the first wheel slip degree and the ratio of the second wheel force and the second wheel slip degree decreases below the critical ratio value. In the 3D μ gradient characteristic map, the grip characteristic parameter increases above the critical parameter value when the ratio of the first wheel force and the first wheel slip degree and the ratio of the second wheel force and the second wheel slip degree both increase above the critical ratio value or values.

In the first embodiment, the longitudinal force correction command calculating section 49 realizes a controlling section. Specifically, the longitudinal force decrease control mode of longitudinal force correction command calculating section 49 realizes a grip recovery control to increase the grip characteristic parameter above a critical parameter value in a critical region in which the grip characteristic parameter is smaller than or equal to the critical parameter value (corresponding to the predetermined threshold Kx1). The longitudinal force increase inhibit control mode of longitudinal force correction command calculating section 49 realizes a grip decrease preventing control to prevent a decrease of the grip characteristic parameter toward the critical parameter value when the grip characteristic parameter is in a marginal region in which the grip characteristic parameter is greater than the critical parameter value but smaller than a predetermined threshold parameter value (corresponding to the predetermined threshold Kx1) which is greater than the critical parameter value. The normal control mode of longitudinal force correction command calculating section 49 realizes a grip state control which is performed when the grip characteristic parameter is greater than the threshold parameter value.

In the first embodiment, the turning characteristic calculating section 50 realizes a stability estimating section to estimate a vehicle stability parameter representing a vehicle stability, from the grip characteristic parameter. Moreover, the turning characteristic calculating section 50 realizes the stability estimating section configured to estimate the vehicle stability parameter from the grip characteristic parameter of a first wheel (one of the front and rear wheels or one of the left and right wheel), and the grip characteristic parameter of a second wheel (the other of the front and rear wheels or the other of the left and right wheel).

In the first embodiment, the turning assist command calculating section 51 realizes a vehicle stability control section to control the vehicle in accordance with the vehicle stability parameter. Moreover, in the first embodiment, the longitudinal force correction command calculating section 49 and turning characteristic calculating section 50 realize a vehicle behavior estimating section to estimate a vehicle behavior in accordance with the grip characteristic parameter.

In the first embodiment, tire grip state calculating section 48 realizes a decomposing section to decompose the grip characteristic parameter into a lateral component in the lateral direction and a longitudinal component in the longitudinal direction. The turning characteristic calculating section 50 realizes a lateral behavior estimating section to estimate a lateral behavior of the vehicle in the lateral direction in accordance with the lateral component of the grip characteristic parameter decomposed by the decomposing section. Specifically, the turning characteristic calculating section 50 realizes a vehicle behavior estimating section 50 realizes the vehicle behavior estimating section (longitudinal behavior estimating section which estimates the lateral behavior of the vehicle in the lateral direction in accordance with the lateral component of the grip characteristic parameter of a first wheel (one of the front and rear wheels) of the vehicle and the grip characteristic parameter of a second wheel (the other of the front and rear wheels) of the vehicle. Turning characteristic calculating section 50 realizes a turning characteristic estimating section to estimate a vehicle turning characteristic from the grip characteristic parameter. The longitudinal correction command calculating section 49 has the function of a longitudinal behavior estimating section to estimate a longitudinal behavior of the vehicle in the longitudinal direction in accordance with the longitudinal component of the grip characteristic parameter decomposed by the decomposing section. It is possible to provide at least one of the lateral vehicle behavior estimating section and longitudinal behavior estimating section.

In the first embodiment, the longitudinal force correction command calculating section 49 and turning assist command calculating section 51 realizes a vehicle behavior control section to control the vehicle behavior of the vehicle in accordance with the vehicle behavior estimated by the vehicle behavior estimating section.

Moreover, in the first embodiment, the longitudinal force correction command calculating section 49 (specifically, the longitudinal force increase inhibit mode and the longitudinal force decrease control mode) controls a vehicle behavior controlling actuator so as to increase the grip characteristic parameter when the grip characteristic parameter becomes lower. The turning assist command calculating section 51 (the steering reaction adding control) controls the vehicle behavior controlling actuator so as to increase the grip characteristic parameter when the grip characteristic parameter becomes lower.

In the first embodiment, the turning assist command calculating section 51 (the steering reaction adding control) controls the vehicle behavior controlling actuator so as to decrease the wheel slip angle when the grip characteristic parameter becomes lower.

In the first embodiment, a vehicle ground contact surface friction state estimating method for estimating a gripping characteristic of a vehicle wheel of a vehicle on a ground contact surface is realized by a method comprising: a first input step to set a first input which is a ratio of a first wheel force acting on the vehicle wheel in the ground contact surface in a first direction, and a first wheel slip degree of the vehicle wheel; a second input step to set a second input which is a ratio of a second wheel force acting on the vehicle wheel in the ground contact surface in a second direction different from the first direction, and a second wheel slip degree of the vehicle wheel; and an output step to determine, from the inputs set by the first and second input steps, an output which is a grip characteristic parameter indicative of the gripping characteristic of the vehicle wheel.

Effects in the First Embodiment (1) The first input section sets the first input which is a ratio of a first wheel force acting on the vehicle wheel in the ground contact surface in a first direction, and a first wheel slip degree of the vehicle wheel. The second input section to set a second input which is a ratio of a second wheel force acting on the vehicle wheel in the ground contact surface in a second direction different from the first direction, and a second wheel slip degree of the vehicle wheel. In accordance with the inputs set by the first and second input steps, the output section to determine, an output which is a grip characteristic parameter indicative of the gripping characteristic of the vehicle wheel.

By arranging the tire characteristic (gripping characteristic of a vehicle wheel) by using the ratio of the wheel force and wheel slip degree, it is possible to determiner the tire characteristic while canceling the influence of road surface $\mu$ variation. Furthermore, it is possible to cancel the influence of the road surface $\mu$ variation, and to obtain the tire characteristic without receiving the influence of the road surface $\mu$ variation irrespective of the direction of the wheel force. Accordingly, if the wheel force and the wheel slip degree can be determined in the first direction and second direction, the estimating system according to the first embodiment can obtain the grip characteristic parameter representing the wheel gripping characteristic from the ratios of the wheel force and the wheel slip degree. From the grip characteristic parameter representing the gripping characteristic of the wheel, the system can estimate the grip state properly. Even when the grip force of the wheel is in the limit region, the system can estimate the grip state properly, and hence estimate the margin to the friction limit properly.

Furthermore, it is possible to determine or obtain the grip characteristic parameter only from the relationship between the longitudinal force and the slip rate, or only from the relationship between the lateral force and the slip angle. In other words, it is possible to determine the grip characteristic parameter on the assumption that the force acts only in one direction of the wheel such as the longitudinal direction or the lateral direction. In this case, however, the accuracy of detecting the grip characteristic parameter may become lower when the vehicle is accelerated greatly during a turn of the vehicle, or when the vehicle is steered during braking. By contrast, the system of the first embodiment can determine the grip characteristic parameter accurately even in a situation of rapid acceleration during a cornering operation or the like, by determining the grip characteristic parameter from the relationship of the wheel force and wheel slip degree in one direction and the relationship of the wheel force and wheel slip degree in another direction (2) The grip characteristic parameter is a rate of change of the wheel force with respect to a change of the wheel slip degree. Therefore, the system of the first embodiment can estimate the grip state and the margin to the friction limit properly on the basis of the rate of change of the wheel force with respect to the change or variation quantity of the wheel slip degree.

(3) The output section is configured to determine the grip characteristic parameter only from the ratio of the first wheel force and the first slip degree and the ratio of the second wheel force and the second slip degree, without using a friction coefficient of a ground surface.

Thus, with the construction which does not require the ground surface friction coefficient, the system of the first embodiment can realize the simple construction without requiring a plurality of maps for different values of the friction coefficient, and estimate the grip state and the margin to the friction limit properly.

(4) The output section is configured to determine the grip characteristic parameter from the ratio of the first wheel force and the first wheel slip degree in a nonlinear region in which the first wheel force varies nonlinearly with the first wheel slip degree, and the ratio of the second wheel force and the second slip degree in a nonlinear region in which the second wheel force varies nonlinearly with the second wheel slip degree.

The relation among the wheel force, wheel slip degree and grip characteristic parameter can be rearranged in the form of a predetermined relationship between the ratio of the wheel force and the wheel slip degree and the grip characteristic parameter in the nonlinear region in which the wheel force varies nonlinearly in accordance with the wheel slip degree. The output section is configured to determine the grip characteristic parameter by using such a relationship. Therefore, the system can estimate the grip state and the margin to the friction limit properly.

(5) The output section is configured to determine the grip characteristic parameter from the ratio of the first wheel force and the first wheel slip degree and the ratio of the second wheel force and the second wheel slip degree according to a predetermined nonlinear relationship between two input variables represented by the two inputs and an output variable represented by the output, and the grip characteristic parameter is a quantity representing a margin to a tire friction limit.

The relation among the wheel force, wheel slip degree and grip characteristic parameter can be rearranged in the form of a predetermined relationship capable of providing the grip characteristic parameter (output variable) from the ratio of the first wheel force and the first wheel slip degree and the ratio of the second wheel force and the second wheel slip degree (from two input variables). The grip characteristic parameter can be formulated as the quantity representing the margin to the tire friction limit. The output section is configured to determine the grip characteristic parameter according to such a relationship. Therefore, the system can estimate the grip state and the margin to friction limit properly.

(6) The predetermined nonlinear relationship between the two input variables and the output variable is in the form of one of a characteristic curved surface and a mathematical formula.

With the output section having such a simplified construction, the system can estimate the grip state and the margin to the friction limit properly.

(7) The first wheel slip degree is a degree of slip of the vehicle wheel relative to the ground surface in the direction of the first wheel force, the second wheel slip degree is a degree of slip of the vehicle wheel relative to the ground surface in the direction of the second wheel force, the grip characteristic parameter is a variable representing a gripping ability of the vehicle wheel, and the output section is configured to determine the grip characteristic parameter only from the ratio of the first wheel force and the first wheel slip degree and the ratio of the second wheel force and the second wheel slip degree, without using a friction coefficient of the ground surface.

With the construction which does not require the road surface friction coefficient, the system of the first embodiment can achieve the construction which does not require a plurality of maps for different values of the road surface friction coefficient and estimate the grip state and the margin to the friction limit properly.

(8) The first wheel slip degree is a quantity representing a relative velocity vector of the vehicle wheel relative to the ground surface in the direction of the first wheel force, the second wheel slip degree is a quantity representing a relative velocity vector of the vehicle wheel relative to the ground surface in the direction of the second wheel force, and the output section is configured to determine the grip characteristic parameter only from the ratio of the first wheel force and the first wheel slip degree and the ratio of the second wheel force and the second wheel slip degree without using the friction coefficient of the ground surface.

With the construction which does not require the friction coefficient of the ground surface, the system realizes the simple construction which does not require a plurality of maps for different values of the friction coefficient, and the system can estimate the grip state and the margin to the friction limit properly.

(9) The first wheel force is a tire force in the first direction acting on a tire, the ratio of the first wheel force to the first wheel slip degree is a ratio of the tire force in the first direction to the first wheel slip degree, the second wheel force is a tire force in the second direction acting on the tire, the ratio of the second wheel force to the second wheel slip degree is a ratio of the tire force in the second direction to the second wheel slip degree, and the grip characteristic parameter represents a gradient of a tire characteristic curve of a resultant tire force with respect to a resultant wheel slip degree where the resultant wheel slip degree is a wheel slip degree produced in a direction of a combination of the first wheel force and the second wheel force, and the resultant tire force is a combined tire force resulting from the first wheel force and the second wheel force. The output section is configured to determine the gradient of the tire characteristic curve only from the ratio of the first wheel force and the first wheel slip degree and the ratio of the second wheel force and the second wheel slip degree, without using the friction coefficient of the ground surface.

With the construction which does not require the friction coefficient of the ground surface, the system realizes the simple construction which does not require a plurality of maps for different values of the friction coefficient, and the system can estimate the grip state and the margin to the friction limit properly.

(10) The tire characteristic curve includes a linear segment in which the resultant tire force increases linearly from zero when an absolute value of the resultant wheel slip degree increases from zero in a smaller slip region where the resultant wheel slip degree is smaller, and a nonlinear segment in which the resultant tire force varies nonlinearly when the absolute value of the resultant wheel slip degree increases in a greater slip region where the absolute value of the resultant wheel slip degree increases beyond the smaller slip region. The grip characteristic parameter increases from zero to a greatest parameter value when at least one of the ratio of the first wheel force and the first wheel slip degree and the ratio of the second wheel force and the second wheel slip degree increases. The greatest parameter value represents the gradient of the linear segment of the tire characteristic curve. The output section is configured to determine the gradient of the nonlinear segment of the tire characteristic curve from the ratio of the first wheel force and the first wheel slip degree and the ratio of the second wheel force and the second wheel slip degree.

With this construction, the system can determine the gradient of the nonlinear segment of the tire characteristic curve as the tire characteristic parameter in the form of the relationship of the resultant wheel slip degree and the resultant tire force.

(11) The tire characteristic curve includes a higher friction tire characteristic curve for a higher friction road surface having a higher friction coefficient, and a lower friction tire characteristic curve for a lower friction road surface having a lower friction coefficient lower than the higher friction coefficient. The grip characteristic parameter represents gradients of the higher friction tire characteristic and the lower friction tire characteristic. The input sections are configured to determine a current value of the ratio of the wheel force and the wheel slip degree from a current value of the tire force and a current value of the wheel slip degree. The output section is configured to determine a current value of the grip characteristic parameter from the current values of the ratios of the wheel force and the wheel slip degree, and to set a value of the gradient of the higher friction tire characteristic curve corresponding to the current value of the tire force and the current value of the wheel slip degree, and a value of the gradient of the lower friction tire characteristic curve corresponding to the current value of the tire force and the current value of the wheel slip degree, equal to each other, and equal to the current value of the grip characteristic parameter.

In this way, the construction requiring no friction coefficient of the ground surface is achieved by the system using the tire characteristic curve which includes the higher friction tire characteristic curve for a higher friction road surface having a higher friction coefficient, and the lower friction tire characteristic curve for a lower friction road surface having a lower friction coefficient lower than the higher friction coefficient. With the construction which does not require the friction coefficient of the ground surface, the system realizes the simple construction which does not require a plurality of maps for different values of the friction coefficient, and the system can estimate the grip state and the margin to the friction limit properly.

(12) The tire characteristic curve is a characteristic curve representing a tire characteristic dependent on a road surface friction coefficient, and the output section is configured to determine the gradient of the tire characteristic curve only from the ratio of the first wheel force and the first wheel slip degree and the ratio of the second wheel force and the second wheel slip degree without using the road surface friction coefficient.

With the construction which does not require the friction coefficient of the ground surface, the system realizes the simple construction which does not require a plurality of maps for different values of the friction coefficient, and the system can estimate the grip state and the margin to the friction limit properly.

(13) The grip characteristic parameter is a function which increases when at least one of the ratio of the first wheel force and the first wheel slip degree and the ratio of the second wheel force and the second wheel slip degree increases from a predetermined critical ratio value.

By using the grip characteristic parameter in the form of the function, the system can estimate the grip state and the margin to the friction limit properly.

(14) In a greater ratio region greater than the predetermined critical ratio value, when at least one of the ratio of the first wheel force and the first wheel slip degree and the ratio of the second wheel force and the second wheel slip degree increases, the grip characteristic parameter increases nonlinearly so that a rate of increase of the grip characteristic parameter with respect to an increase of that ratio of the wheel force and the wheel slip degree increases.

Thus, by using the grip characteristic parameter in the form having a predetermined characteristic, the system can estimate the grip state and the margin to the friction limit properly.

(15) The grip characteristic parameter is equal to a predetermined critical parameter value when the ratio of the first wheel force and the first slip degree and the ratio of the second wheel force and the second wheel slip degree are equal to the predetermined critical ratio value or values. The grip characteristic parameter decreases below the critical parameter value when as at least one of the ratio of the first wheel force and the first wheel slip degree and the ratio of the second wheel force and the second wheel slip degree decreases below the critical ratio value. The grip characteristic parameter increases above the critical parameter value when the ratio of the first wheel force and the first wheel slip degree and the ratio of the second wheel force and the second wheel slip degree both increase above the critical ratio value(s).

Thus, by using the grip characteristic parameter clarified in the form having a predetermined characteristic, the system can estimate the grip state and the margin to the friction limit properly.

(16) One of the first wheel force and the second wheel force is a longitudinal force or driving/braking force acting on the vehicle wheel. Normally, it is easy to obtain information on the longitudinal or driving/braking force applied to a wheel. Accordingly, the system can estimate the grip state and the margin to the friction limit easily.

(17) One of the first wheel force and the second wheel force is the longitudinal force or driving/braking force, one of the first wheel slip degree and the second wheel slip degree corresponding to the longitudinal or driving/braking force is a longitudinal slip degree, and one of the first input and the second input is a quantity obtained by dividing the longitudinal force or driving/braking force by the longitudinal slip degree.

Therefore, the system can determine the grip characteristic parameter from the quantity obtained by dividing the longitudinal or driving/braking force by the longitudinal slip degree. Thus, the system can readily estimate the grip state and the margin to the friction limit.

(18) The longitudinal slip degree is a slip rate of the vehicle wheel. In general, it is easy to obtain information on the wheel slip rate. Accordingly, the system can estimate the grip state and the margin to the friction limit easily.

(19) One of the first wheel force and the second wheel force is a tire lateral force or a tire cornering force acting on the vehicle wheel. In general, it is easy to obtain information on the tire lateral or cornering force. Accordingly, the system can estimate the grip state and the margin to the friction limit easily.

(20) One of the first wheel force and the second wheel force is the tire lateral force or cornering force, one of the first wheel slip degree and the second wheel slip degree corresponding to the tire lateral force or cornering force is a lateral slip degree, and one of the first input and the second input is a quantity obtained by dividing the lateral force or cornering force by the lateral slip degree.

Therefore, the system can determine the grip characteristic parameter from the quantity obtained by dividing the lateral force or cornering force by the lateral slip degree, and thereby estimate the grip state and the margin to the friction limit easily.

(21) The lateral slip degree is a slip angle of the vehicle wheel. Information on the wheel slip angle is information which can be obtained easily in general. Accordingly, the system can estimate the grip state and the margin to the friction limit easily.

(22) The wheel force or each of the wheel forces is a resultant force of wheel forces of left and right wheels. Therefore, by using the averaged wheel forces, the system can estimate the grip state and margin to the friction limit properly.

(23) The first and second inputs are nondimensional quantities, and the input sections are configured to set a nondimensional input by dividing the ratio of the wheel force and wheel slip degree by a reference ratio. Therefore, by using a generalized process, the system can estimate the grip state and margin to the friction limit properly.

(24) The grip characteristic parameter is a nondimensional quantity, and the output section is configured to determine the nondimensional quantity by division by a reference parameter. Thus, by using the generalized process using the nondimensionalization, the system can estimate the grip state and margin to the friction limit properly.

(25) The output section is configured to determine the output from the two inputs according to a predetermined relationship between the two inputs and the output, and the relationship between the two inputs and the output is a relationship which can be expressed by a three dimensional curved surface in a three dimensional coordinate system having a first axis representing the first input which is the ratio of the first wheel force and the first slip degree, a second axis representing the second input which is the ratio of the second wheel force and the second wheel slip degree and a third axis representing the grip characteristic parameter.

Thus, with the output section having a simple construction, the system can estimate the grip state and margin to the friction limit properly.

(26) The first axis represents one of the ratio of the lateral force or cornering force and the lateral slip degree and the ratio of the longitudinal or driving/braking force and the longitudinal slip degree, and the second axis represents the other of the ratio of the lateral force or cornering force and the lateral slip degree and the ratio of the longitudinal or driving/braking force and the longitudinal slip degree.

Thus, with the output section having a simple construction, the system can estimate the grip state and margin to the friction limit properly.

(27) The first, second and third axes represent nondimensional quantities, the first and second axes are so arranged that the nondimensional quantity is determined by dividing the ratio of the wheel force and the wheel slip degree in the direction of each axis, by a reference ratio, and the third axis is so arranged that the nondimensional quantity is determined by dividing the grip characteristic parameter by a reference parameter.

Thus, with the process generalized by the nondimensionalization, the system can estimate the grip state and margin to the friction limit properly.

(28) The input sections comprise a first wheel force sensing section to sense the first wheel force, a first wheel slip degree sensing section to sense the first wheel slip degree, a first dividing section to determine the ratio of the first wheel force and the first wheel slip degree by dividing the first wheel force determined by the first wheel force sensing section, by the first wheel slip degree determined by the first wheel slip degree sensing section, a second wheel force sensing section to sense the second wheel force, a second wheel slip degree sensing section to sense the second wheel slip degree, and a second dividing section to determine the ratio of the second wheel force and the second wheel slip degree by dividing the second wheel force determined by the second wheel force sensing section, by the second wheel slip degree determined by the second wheel slip degree sensing section.

(29) A wheel load sensing section determines a wheel load of the vehicle wheel, and a modifying section modifies the relationship between the inputs and the output in accordance with the wheel load determined by the wheel load sensing section.

Therefore, the system can obtain the grip characteristic parameter accurately without receiving influence from the wheel load.

(30) The modifying section for correcting a wheel load variation calculates a modification coefficient in accordance with the wheel load. The modifying section performs modification of each of the first and second inputs by dividing each input by the modification coefficient, and performs modification of the output by multiplying the output determined from the modified first and second input, by the modification coefficient. Therefore, the system can determine the grip characteristic parameter which is modified adequately in accordance with the wheel load. The system can obtain the grip characteristic parameter accurately without receiving influence from the wheel load.

(31) The modification coefficient is increased as the wheel load increases. Therefore, the system can determine the grip characteristic parameter adequately in conformity with the grip force increasing with an increase of the wheel load.

(32) The rate of increase of the modification coefficient is decreased as the wheel load increases. Therefore, the system can determine the grip characteristic parameter adequately in conformity with the grip force which increases so that the rate of increase becomes lower with an increase of the wheel load.

(33) The controlling section performs a grip recovery control to increase the grip characteristic parameter above a predetermined critical parameter value in a critical region in which the grip characteristic parameter is smaller than or equal to the critical parameter value, and a grip decrease preventing control to prevent a decrease of the grip characteristic parameter toward the critical parameter value when the grip characteristic parameter is in a marginal region in which the grip characteristic parameter is greater than the critical parameter value but smaller than a predetermined threshold parameter value which is greater than the critical parameter value.

Therefore, in the grip recovery control, the system can ensure the grip force by urging the driver to return the steering wheel. In the grip decrease preventing control, the system can prevent decrease of the grip force by preventing the steering wheel from being turned too much by the driver.

(34) The controlling section is configured to perform a grip state control when the grip characteristic parameter is greater than the threshold parameter value. The grip state control is a control adapted to the situation where the normal grip state is ensured. Therefore, in accordance with the grip characteristic parameter, the system can perform the control adapted to the normal grip state.

(35) The stability estimating section is configured to estimate the vehicle stability parameter representing a vehicle stability, from the grip characteristic parameter. Therefore, the system can perform a control for stabilizing the vehicle behavior in accordance with the grip characteristic parameter.

(36) The input sections are configured to determine the ratio of the first wheel force and the first wheel slip degree of a first wheel of the vehicle and the ratio of the second wheel force and the second wheel slip degree of the first wheel of the vehicle, and the ratio of the first wheel force and the first slip degree of a second wheel of the vehicle and the ratio of the second wheel force and the second wheel slip degree of the second wheel of the vehicle. The output section is configured to determine the grip characteristic parameter of the first wheel from the ratio of the first wheel force and the first wheel slip degree of the first wheel and the ratio of the second wheel force and the second wheel slip degree of the first wheel, and the grip characteristic parameter of the second wheel from the ratio of the first wheel force and the first wheel slip degree of the second wheel and the ratio of the second wheel force and the second wheel slip degree of the second wheel. The stability estimating section is configured to estimate the vehicle stability parameter from the grip characteristic parameter of the first wheel and the grip characteristic parameter of the second wheel.

Thus, the system can estimate the vehicle stability parameter from the grip characteristic parameters of the first and second wheels. That is, the system can estimate the vehicle stability parameter from the difference of the grip characteristic parameter between the first and second wheels.

(37) The first wheel and the second wheel of the vehicle are front and rear wheels, or left and right wheels of the vehicle. Therefore, the system can estimate the vehicle stability parameter from the difference of the grip characteristic parameter between the front and rear wheel or between the left and right wheels.

(38) The stability control section is configured to control the vehicle in accordance with the vehicle stability parameter. Therefore, the system can perform a control for stabilizing the vehicle behavior in accordance with the grip characteristic parameter.

(39) The vehicle behavior estimating section is configured to estimate a vehicle behavior in accordance with the grip characteristic parameter.

(40) The vehicle ground contact surface friction state estimating apparatus or system includes the decomposing section to decompose the grip characteristic parameter into the lateral component in the lateral direction and the longitudinal component in the longitudinal direction, and the vehicle behavior estimating section includes at least one of a longitudinal behavior estimating section to estimate a longitudinal behavior of the vehicle in the longitudinal direction in accordance with the longitudinal component of the grip characteristic parameter decomposed by the decomposing section and a lateral behavior estimating section to estimate a lateral behavior of the vehicle in the lateral direction in accordance with the lateral component of the grip characteristic parameter decomposed by the decomposing section.

Therefore, the system is arranged to decompose the grip characteristic parameter into the longitudinal component and lateral component. The system can estimate the vehicle behavior in the longitudinal direction and the vehicle behavior in the lateral direction individually in accordance with the longitudinal component of the grip characteristic parameter and the lateral component of the grip characteristic parameter.

(41) The lateral behavior estimating section estimates the lateral behavior of the vehicle in the lateral direction in accordance with the lateral component of the grip characteristic parameter of a first wheel of the vehicle and the lateral component of the grip characteristic parameter of a second wheel of the vehicle. Thus, the system can estimate the lateral behavior of the vehicle properly in accordance with the lateral components of the grip characteristic parameters of the first and second wheels.

(42) The vehicle behavior control section controls the vehicle behavior in accordance with the vehicle behavior estimated by the vehicle behavior estimating section. For example, the vehicle behavior control section controls at least one of the longitudinal behavior and the lateral behavior of the vehicle in accordance with the estimation result of at least one of the longitudinal behavior estimating section and the longitudinal behavior estimating section. Therefore, the system can perform the control for stabilizing the vehicle behavior in accordance with the grip characteristic parameter.

(43) The vehicle behavior controlling section controls the vehicle behavior by controlling a vehicle behavior controlling actuator (EPS motor 7) in accordance with the vehicle behavior estimated by the vehicle behavior estimating section. Therefore, the system can perform the control for stabilizing the vehicle behavior in accordance with the grip characteristic parameter.

(44) The vehicle behavior controlling actuator (EPS motor 7) is used as the steering force assist actuator to assist a steering force of a vehicle driver, or a wheel steer angle controlling actuator to control a wheel steer angle of the vehicle. Therefore, by assisting the driver's steering effort or by controlling the wheel steer angle, the system can performs the control for stabilizing the vehicle behavior.

(45) The vehicle behavior control section is configured to control the vehicle behavior controlling actuator (brake/drive motor 21) in a manner to increase the grip characteristic parameter when the grip characteristic parameter decreases.

Therefore, the system can recover the grip force by increasing the grip characteristic parameter. That is, the system can perform the control for stabilizing the vehicle behavior by increasing the grip characteristic parameter.

(46) The vehicle behavior control section is configured to control the vehicle behavior controlling actuator in a manner to decrease the slip angle of the vehicle wheel when the grip characteristic parameter decreases.

Therefore, the system can recover the grip force by decreasing the tire slip angle. The system can perform the control for stabilizing the vehicle behavior by decreasing the tire slip angle.

(47) The v vehicle behavior estimating section is configured to estimate a vehicle turning characteristic from the grip characteristic parameter, and the vehicle behavior controlling section is configured to control a turning behavior of the vehicle in accordance with the vehicle turning characteristic estimated by the vehicle behavior estimating section.

Therefore, the system can estimate the vehicle turning characteristic by using the grip characteristic parameter and performs the control to stabilize the vehicle behavior by using the estimated turning characteristic.

(48) The vehicle behavior estimating section is configured to estimate at least one of a vehicle drift out tendency and a vehicle spin out tendency from the grip characteristic parameter, and the vehicle behavior controlling section is configured to control the turning behavior of the vehicle in a manner to decrease the tendency which is at least one of the vehicle drift out tendency and the vehicle spin out tendency estimated by the vehicle behavior estimating section.

Therefore, the system can control the vehicle for stabilizing the vehicle turning behavior by decreasing the vehicle drift out tendency or the vehicle spin out tendency in accordance with the grip characteristic parameter.

(49) The wheel torque control section (brake/drive motor ECU 22 and longitudinal force correction command calculating section 49) controls a wheel torque which is one of a braking torque and a driving torque of the wheel, in accordance with the grip characteristic parameter.

Therefore, the system can control the grip characteristic of the wheel by controlling at least one of the braking torque and driving torque of the wheel, and thereby achieve a desired grip characteristic of the wheel.

(50) The wheel torque control section is configured to control at least one of the braking torque and the driving torque of the wheel, in accordance with the longitudinal component of the grip characteristic parameter.

By using the longitudinal component of the grip characteristic parameter, the system can control the braking torque and driving torque of the wheel properly.

(51) The wheel torque control section controls the wheel torque controlling actuator (brake/drive motor 21) to control the wheel torque.

Therefore, by controlling the wheel torque controlling actuator, the system can control the braking torque or the driving torque of the wheel properly.

(52) The wheel torque control section is configured to control at least one of the braking torque and the driving torque of the wheel in a manner to decrease the wheel torque until the grip characteristic parameter becomes greater than a predetermined critical parameter value (predetermined threshold Kx2) when the grip characteristic parameter becomes lower than the predetermined critical parameter value.

Therefore, the system can recover the grip force by controlling the wheel braking force or driving force and making the grip characteristic of the wheel to a desired form.

(53) The wheel torque control section controls at least one of the braking torque and driving torque of the wheel in a manner to restrain an increase of the wheel torque when the grip characteristic parameter is in a region greater than the predetermined critical parameter value (predetermined threshold Kx2) and smaller than a predetermined threshold value (predetermined threshold Kx1).

Therefore, the system can prevent decrease of the grip force by controlling the braking torque and driving torque of the wheel and achieving a desired form of the gripping characteristic of the wheel.

(54) The wheel toque control section controls at least one of the braking torque and driving torque of the wheel in a manner to increase the wheel torque until the grip characteristic parameter becomes smaller than a predetermined threshold value upon receipt of a request of a vehicle driver to increase the longitudinal force when the grip characteristic parameter is greater than the predetermined critical parameter value.

Therefore, the system can produce the longitudinal force in conformity with the driver's intention while preventing a decrease of the grip force by controlling the braking torque and driving torque of the wheel.

(55) The predetermined critical parameter value is equal to zero. Therefore, the system can control the braking torque and driving torque of the wheel in conformity with the grip force which becomes saturated in the vicinity of the point at which the grip characteristic is equal to zero.

Figure 46:
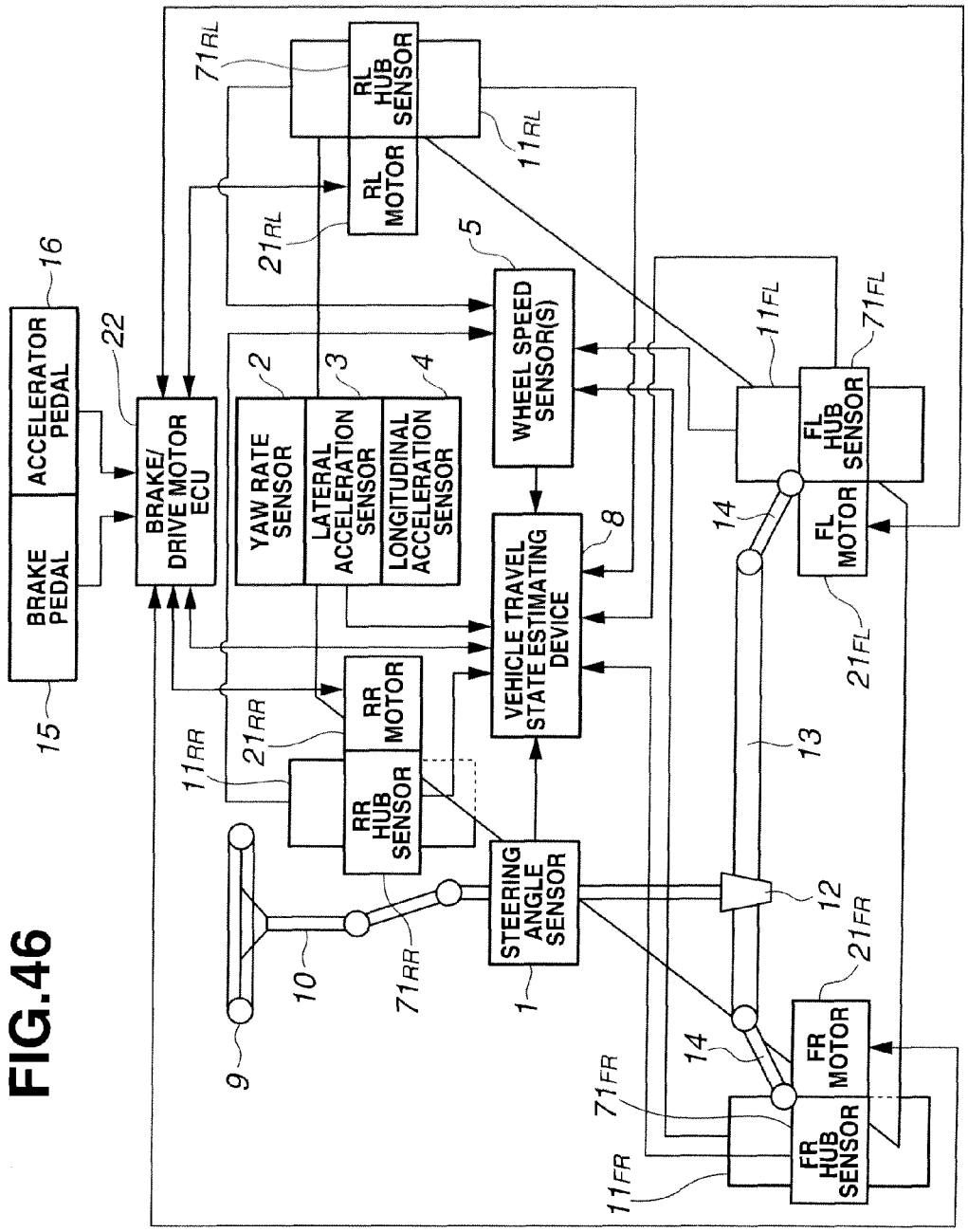
FIG. 46 is a schematic view showing an outline construction of an electric vehicle according to a second embodiment of the present invention.
Figure 47:
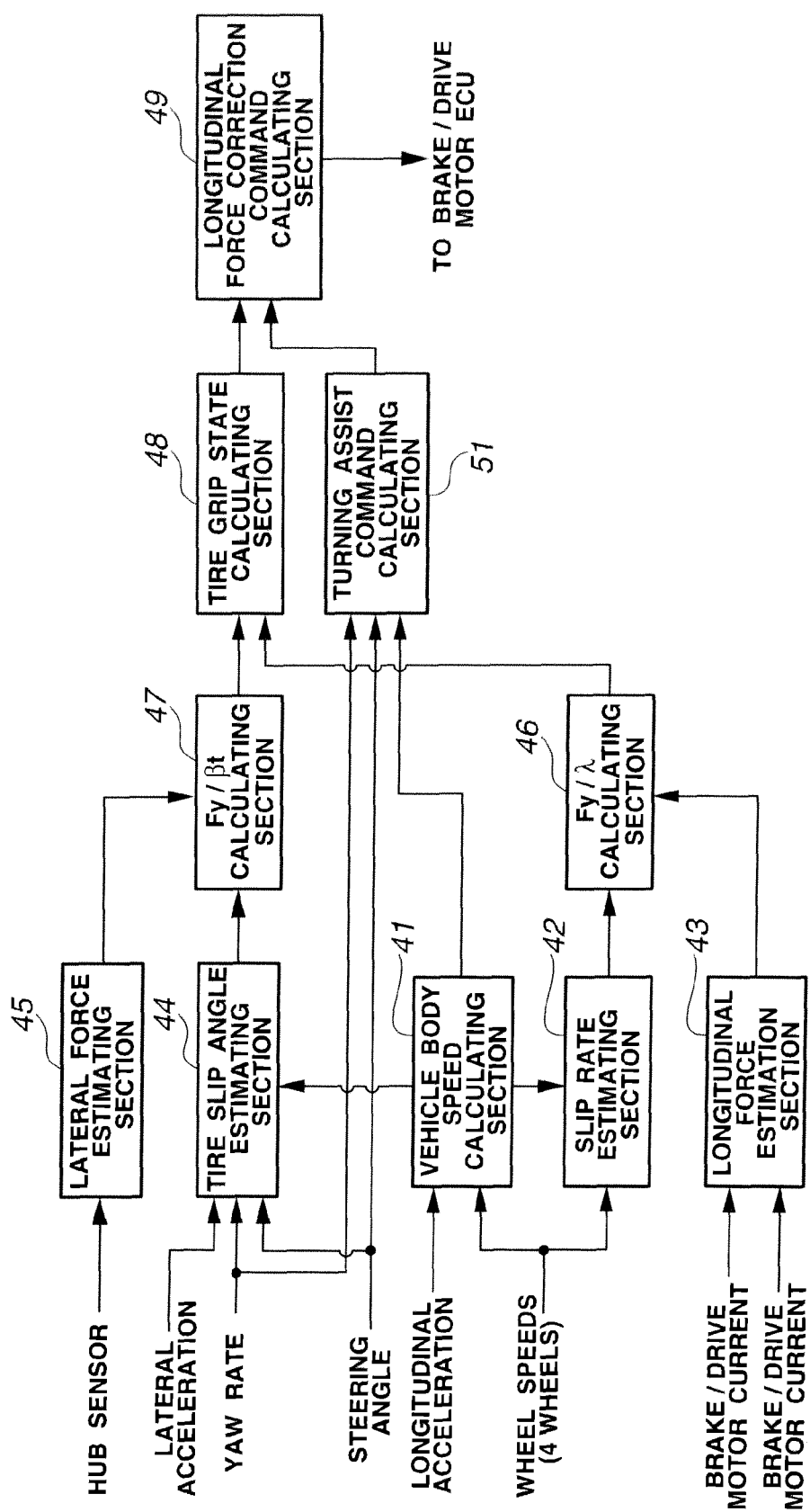
FIG. 47 is a block diagram showing a construction example of a vehicle travel state estimating device according to the second embodiment.

Second Embodiment (Construction) FIG. 46 schematically shows the outline construction of a vehicle according to the second embodiment. FIG. 47 shows the internal structure of a vehicle travel state estimating device 8 provided in the vehicle. As shown in FIGS. 46 and 47, the basic construction of the vehicle of the second embodiment is fundamentally identical to the construction of the vehicle of the first embodiment shown in FIGS. 30 and 31. However, in the second embodiment, the wheels 11FL~11RR are provided, respectively, with hub sensors 71FL~71RR. On the other hand, the system of the second embodiment does not include the EPSECU 6 for EPS, the EPS motor 7 and the turning characteristic calculating section 50. In the following explanation, parts in the vehicle according to the second embodiment given the same reference numerals are the same as parts of the same reference numerals in the vehicle of the first embodiment unless otherwise stated specifically. In the second embodiment, the system is arranged to control the longitudinal forces of wheels 11FL~11RR, individually as explained later. Therefore, in this point, the processes of the constituent parts are different from the processes in the first embodiment.

Slip rate estimating section 42 calculates slip rates $\lambda fl$, $\lambda fr$, $\lambda rl$, $\lambda rr$ of the wheels 11FL~11RR in accordance with the wheel speeds of wheels 11FL~11RR sensed by wheel speed sensor 5 and the vehicle body speed calculated by vehicle body speed calculating section 41. Then, slip rate estimating section 42 outputs the calculation results to the Fx/$\lambda$ calculating section 46.

The longitudinal force estimating section 43 calculates longitudinal forces Fxfl, Fxfr, Fxrl and Fxrr of the wheels 11FL~11RR in accordance with the rotational speeds and current values of drive/brake motors 21FL~21RR. In the first embodiment, longitudinal force estimating section 43 determines the sum of driving/braking torques TTir of left and right wheels to obtain each of the front wheel longitudinal force Fxf and the rear wheel longitudinal force Fxr. In the second embodiment, by contrast, the longitudinal force estimating section 43 determines the driving/braking torques TTir of drive/brake motors 21FL~21RR of wheels 11FL~11RR, without adding the driving/braking torques TTir of the left and right wheels. Longitudinal force estimating section 43 calculates the longitudinal force Fxfl, Fxfr, Fxrl and Fxrr of wheels 11FL~11RR, by multiplying each of the driving/braking torques TTir of wheels 11FL~11RR by the dynamic radius. Longitudinal force estimating section 43 outputs the calculation results (the results of the estimation) to Fx/$\lambda$ calculating section 46.

The hub sensors 71FL~71RR shown in FIG. 46 sense lateral forces acting on wheels 11FL~11RR, respectively. Hub sensors 71FL~71RR outputs their sensing results to the vehicle travel state estimating device 8 (lateral force estimating section 45).

In vehicle travel state estimating device 8, the lateral force estimating section 45 calculates the lateral forces Fyfl, Fyfr, Fyrl and Fyrr of wheels 11FL~11RR in accordance with the sensing results of hub sensors 71FL~71RR. Lateral force estimating section 45 outputs the results of the calculation to Fy/$\beta t$ calculating section 47.

The tire slip angle estimating section 44 shown in FIG. 47 estimates the vehicle body slip angle (vehicle side slip angle) $\beta$ in the same manner as in the first embodiment, and converts the estimated vehicle body slip angle $\beta$ into a front wheel slip angle (tire slip angle) and a rear wheel slip angle (tire slip angle).

Figure 48:
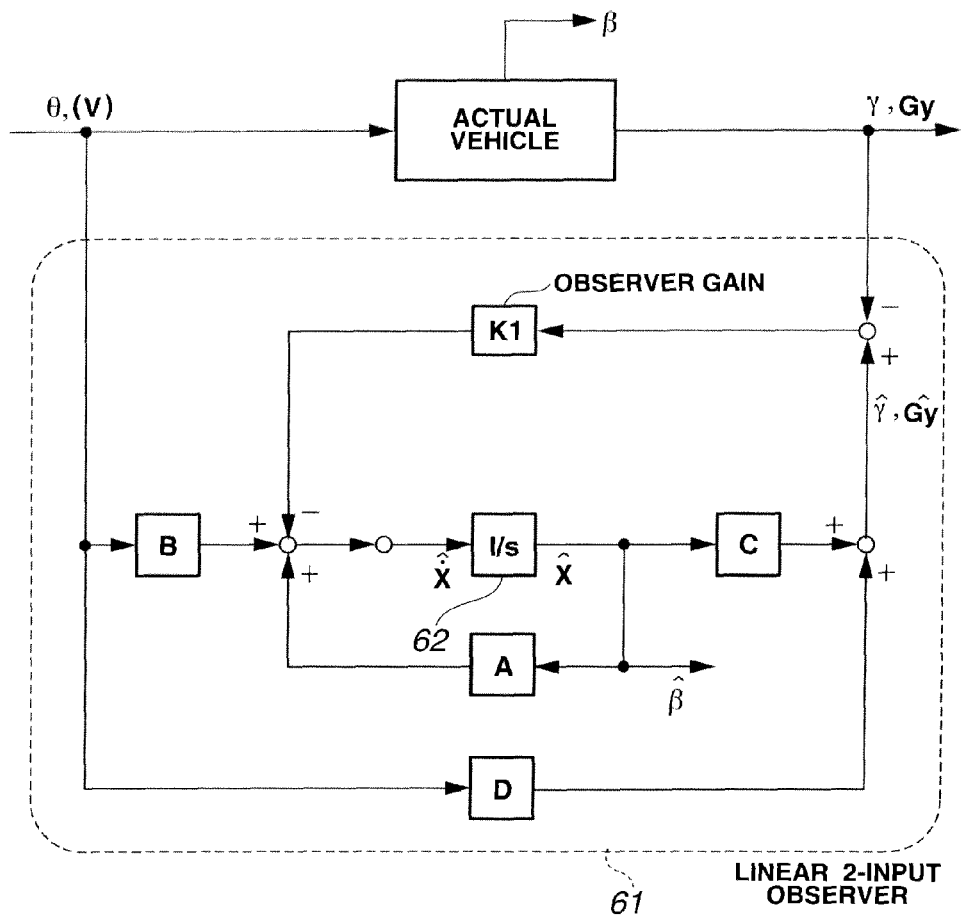
FIG. 48 is a block diagram showing a construction example of a tire slip angle estimating section according to the second embodiment.

FIG. 48 shows one example of the construction of the tire slip angle estimating section 44 for estimating the vehicle side slip angle (slip angle). The construction shown in the example of FIG. 48 is not provided with the $\beta$ estimation compensator 63 and compensation gain K2.

Moreover, the tire slip angle estimating section 44 sets the front wheel slip angle $\beta tf$ as slip angles $\beta tfl$ and $\beta tfr$ of the front left wheel and front right wheel, and sets the rear wheel slip angle $\beta tr$ as slip angles $\beta trl$ and $\beta trr$ of the rear left wheel and rear right wheel. Tire slip angle estimating section 44 outputs the thus-obtained slip angles $\beta tfl$~$\beta trr$ of wheels 11FL~11RR, to the Fy/$\beta t$ calculating section 47.

The Fx/$\lambda$ calculating section 46 calculates the ratios (Fxfl/$\lambda fl$~Fxrr/$\lambda rr$) of the longitudinal forces Fxfl~Fxrr and the slip rates $\lambda fl$~$\lambda rr$, in accordance with the slip rates $\lambda fl$~$\lambda rr$ and longitudinal forces Fxfl~Fxrr of wheels 11FL~11RR calculated by slip rate estimating section 42 and longitudinal force estimating section 43. Fx/λ calculating section 46 outputs the results of the calculation to the tire grip state calculating section 48. The Fy/βt calculating section 47 calculates the ratios (Fyfl/βtfl Fyrr/βtrr) of the lateral forces Fyfl-Fyrr and slip angles βtfl~βtrr, in accordance with the slip angles βtfl~βtrr and lateral forces Fyfl~Fyrr calculated by tire slip angle estimating section 44 and lateral force estimating section 45. Fy/βt calculating section 47 outputs the results of the calculation to the tire grip state calculating section 48.

The tire grip state calculating section (μ gradient calculating section) 48 estimates the grip state of each of the wheels 11FL~11RR in accordance with the ratios (Fxfl/λfl~FxrR/λrr) of the longitudinal forces Fxfl~Fxrr and slip rates λfl~λrr of the front and rear wheels calculated by Fx/λ calculating section 46, and the ratios (Fyfl/βtfl~Fyrr/βtrr) of the lateral forces Fyfl~Fyrr and slip angles βtfl~βtrr calculated by Fy/βt calculating section 47. That is, tire grip state calculating section 48 estimates the μ gradient of each of the wheels 11FL~11RR. To this end, tire grip state calculating section 48 has the 3D μ gradient characteristic maps as shown in FIG. 29. Tire grip state calculating section 48 has such 3D μ gradient characteristic map for each of the wheels 11FL~11RR. For example, tire grip state calculating section 48 holds the 3D μ gradient characteristic maps stored in a storage medium such as a memory.

Accordingly, tire grip state calculating section 48 calculates (outputs) the μ gradient (γ/γ0) of each of wheels 11FL~11RR by referring to the 3D μ gradient characteristic map of the corresponding one of wheels 11FL~11RR, and using, as the inputs, the ratio (Fxfl/λfl~FxrR/λrr) of the longitudinal force Fxfl~Fxrr and slip rate λfl~λrr of the corresponding one of wheel 11FL~11RR, and the ratio (Fyfl/βtfl~Fyrr/βtrr) of the lateral force Fyfl~Fyrr and slip angle βtfl~βtrr of the corresponding one of wheels 11FL~11RR (cf. FIG. 37).

Figure 49:
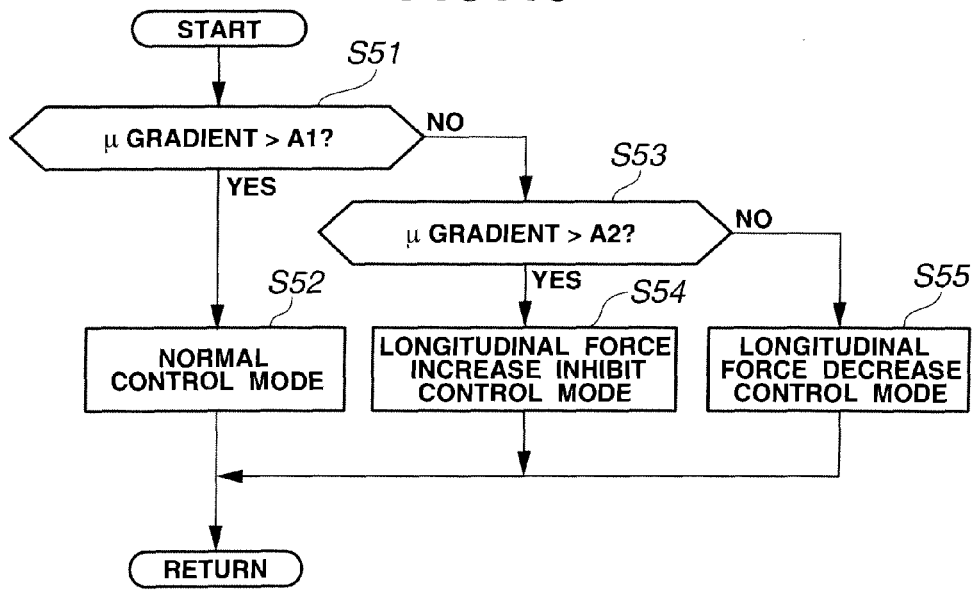
FIG. 49 is a flowchart showing a process, based on the μ gradient, of a longitudinal force correction command calculating section according to the second embodiment.

The longitudinal force correction command calculating section 49 performs a control process for preventing spin and lock of the wheels 11FL~11RR in accordance with the p gradients of wheels 11FL~11RR. FIG. 49 shows one example of the control process. As shown in FIG. 49, first at a step S51, longitudinal force correction command calculating section 49 determines whether the μ gradient is greater than a predetermined threshold A1 or not. The predetermined threshold A1 is an experimental value, an empirical value or a theoretical value. Predetermined threshold A1 is an arbitrary positive value, for example. The μ gradient is a quantity obtained by nondimensionalization in the form of γ/γ0. Accordingly, the predetermined threshold A1 is a value determined in consideration of the nondimensionalization.

When the μ gradient is greater than predetermined threshold A1 (μ gradient>A1), the longitudinal force correction command calculating section 49 proceeds to a step S52. When the μ gradient is smaller than or equal to predetermined threshold A1 (μ gradient≤A1), then longitudinal force correction command calculating section 49 proceeds to a step S53.

At step S52, longitudinal force correction command section 49 judges that the wheel is in a grip state (higher grip state), and performs a normal longitudinal force control (normal control mode). Accordingly, the control correction command of the longitudinal force is not outputted to the drive/brake motor ECU 22, by longitudinal force correction command section 49. Alternatively, longitudinal force correction command calculating section 49 outputs a control correction command enabling the drive/brake motor ECU 22 to perform the normal longitudinal force control. Then, the longitudinal force correction command calculating section 49 terminates the process shown in FIG. 49.

At step S53, longitudinal force correction command calculating section 49 determines whether the μ gradient is greater than a predetermined threshold A2 or not. Predetermined threshold A2 is an experimental value, an empirical value or a theoretical value. Predetermined threshold A2 is smaller than the predetermined threshold A1 (A2<A1). For example, predetermined threshold A2 is a value close to zero. The μ gradient is a quantity obtained by nondimensionalization in the form of γ/γ0. Accordingly, the predetermined threshold A2 is a value determined in consideration of the nondimensionalization.

When the μ gradient is greater than predetermined threshold A2 (μ gradient>A2), the longitudinal force correction command calculating section 49 proceeds to a step S54. When the μ gradient is smaller than or equal to predetermined threshold A2 (μ gradient≤A2), then longitudinal force correction command calculating section 49 proceeds to a step S55.

At step S54, longitudinal force correction command section 49 judges that the grip force has not yet reached the saturation point, and performs a longitudinal force control (longitudinal force increase inhibit control mode) for restraining the longitudinal force from further increasing from the current level. Accordingly, as the control for preventing spin and lock, the longitudinal force correction command calculating section 49 outputs a control correction command to restrain an increase of the longitudinal force based on an accelerator operation or a brake operation, to drive/brake motor ECU 22. For, example, longitudinal force correction command calculating section 49 outputs the control correction command which is set equal to a value for subtracting an increase quantity of the longitudinal force due to the accelerator operation or brake operation. Then, the longitudinal force correction command calculating section 49 terminates the process shown in FIG. 49.

At step S55, longitudinal force correction command calculating section 49 judges that the condition is in the region in which the grip force is saturated, and performs the longitudinal force control (longitudinal force decrease control mode) to recover the grip force by draining the longitudinal force. Accordingly, as the control for preventing spin and lock, the longitudinal force correction command calculating section 49 outputs, to drive/brake motor ECU 22, the control correction command to decrease the longitudinal force. For example, even in the case of an accelerator operation or a brake operation, the longitudinal force correction command calculating section 49 outputs the control correction command to decrease the longitudinal force while cancelling an increase of the longitudinal force due to that operation. Then, longitudinal force correction command calculating section 49 terminates the process of FIG. 49.

In this way, the longitudinal force correction command calculating section 49 performs the process based on the μ gradient. The longitudinal force correction command calculating section 49 performs this process in accordance with the μ gradient of each of wheels 11FL~11RR.

Figure 50:
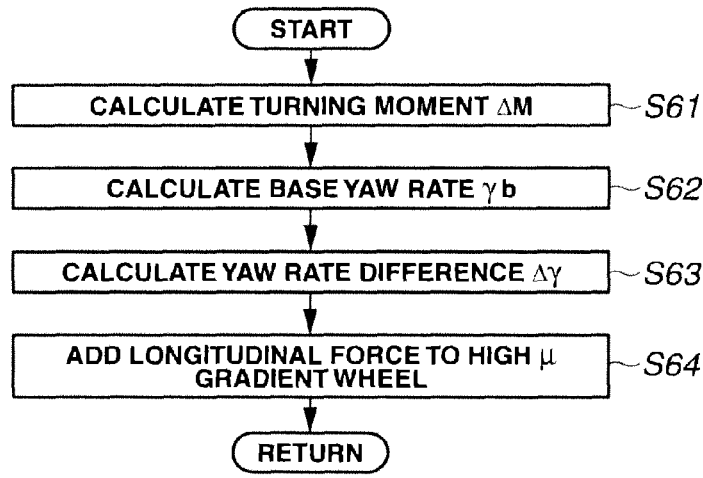
FIG. 50 is a flowchart showing a turning control process of the longitudinal force correction command calculating section and turning assist command calculating section according to the second embodiment.

In the case of the above-mentioned wheel spin and lock preventing control of controlling wheels 11FL~11RR individually (cf. FIG. 49), the longitudinal force of each of wheels 11FL~11RR is adjusted independently from the others. Therefore, there arises a difference in the driving/braking torque among wheels 11FL~11RR (between left and right wheels, for example). Because of this driving/braking torque difference caused by the wheel spin and lock preventing control, the vehicle might be turned. Moreover, independently from the wheel spin and lock preventing control, the vehicle might become unable to turn properly in accordance with a steering operation because of occurrence of tire side slip. Accordingly, the longitudinal force correction command calculating section 49 and turning assist command calculating section 51 perform a process meeting such vehicle behavior. FIG. 50 shows one example of the process. First, at a step S61, longitudinal force correction command calculating section 49 calculates a turning moment (yaw moment) ΔM produced by a left and right wheel driving/braking torque difference due to the wheel spin and lock preventing control.

Then, at a step S62, turning assist command calculating section 51 calculates a base yaw rate predicted to occur in case of a linear vehicle characteristic. Specifically, turning assist command calculating section 51 calculates the base yaw rate γb by inputting the vehicle speed and steering angle into a linear two wheel vehicle model (used in the calculation of the slip angle βt).

At a next step S63, turning assist command calculating section 51 calculates a difference Δγ(=γ−γb) between the actual yaw rate (sensed yaw rate) γ generated actually in the vehicle and the base yaw rate γb calculated at step S62.

Subsequently, at a step S64, the longitudinal force correction command calculating section 49 calculates a turning assist torque MMTR according to a following mathematical expression (9) by using the turning moment ΔM calculated at S61 and the yaw rate difference Δγ calculated at S63.

$$MMTR = \Delta M + G \times \Delta \gamma \quad (9)$$

In this equation, G is a turning assist gain which is a constant determined preliminarily by tuning.

Then, longitudinal force correction command calculating section 49 outputs the command for the turning control, to drive/brake motor ECU 22. Thus, longitudinal force correction command calculating section 49 delivers, to drive/brake motor ECU 22, the command for producing a left and right longitudinal force difference to achieve the turning assist torque MMTR calculated according to the mathematical expression (9).

The command for producing the left and right longitudinal force difference (the command to achieve MMTR) is a command to produce a longitudinal force for a wheel or wheels having a higher μ gradient. In the case of restraining a turning motion, this command for producing the left and right driving force difference is a command for increasing the braking force of the wheel on the outside of the turn, or a command for increasing the driving force of the wheel on the inside of the turn. In the case of promoting a turning motion, this command for producing the left and right driving force difference is a command for increasing the driving force of the wheel on the outside of the turn, or a command for increasing the braking force of the wheel on the inside of the turn. On the occurrence of unstable vehicle behavior, the turning control is performed only by increasing the braking force without increasing the driving force because the deceleration acts in the direction stabilizing the vehicle behavior. Moreover, if, even in such a case, the driver performs a hard accelerating operation, then priority is given to the driver's operation and the turning control is performed by increasing the driving force.

(Actions and Operations)

Figure 51:
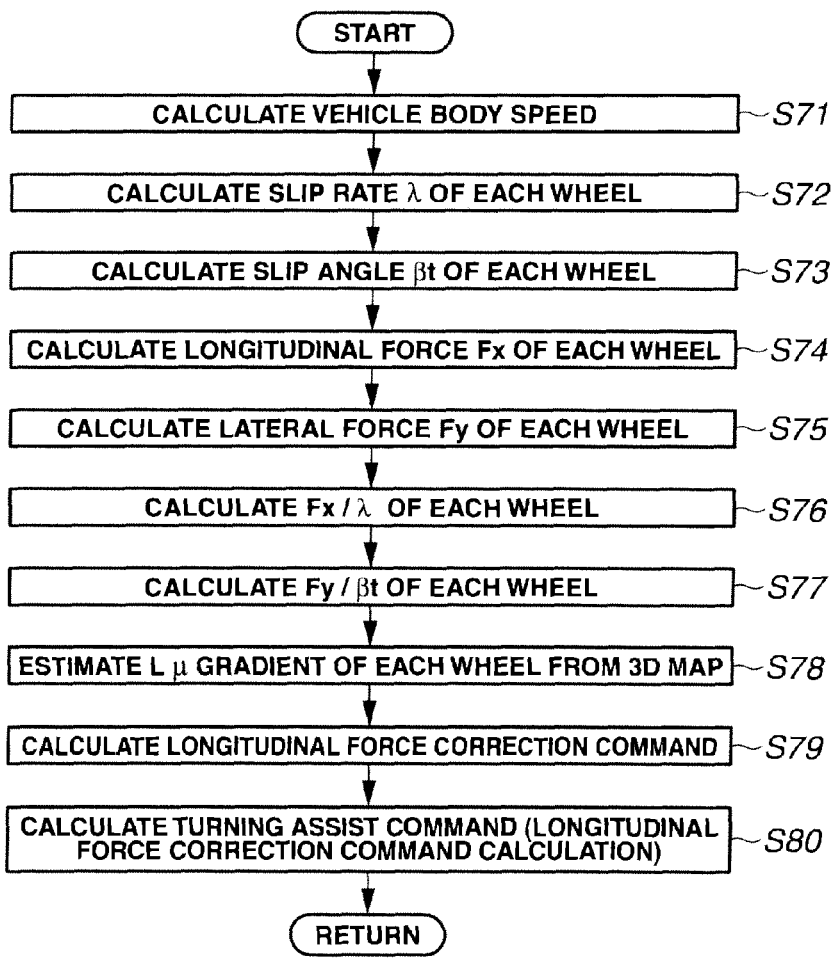
FIG. 51 is a flowchart showing a calculation process of the vehicle travel state estimating device according to the second embodiment.

FIG. 51 shows one example of the process in the vehicle travel state estimating device 8. Vehicle travel state estimating device 8 performs this process during travel or movement of the vehicle.

First, in vehicle travel state estimating device 8, the vehicle body speed calculating section 41 calculates the vehicle body speed (step S71). In vehicle travel state estimating device 8, the slip rate estimating section 42 calculates the slip rates λfl~λrr of wheels 11FL~11RR in accordance with the vehicle body speed (step S72). Furthermore, the tire slip angle estimating section 44 in the vehicle travel state estimating device 8 calculates the slip angles βtfl~βtrr of wheels 11FL~11RR (step S73). In vehicle travel state estimating device 8, the longitudinal force estimating section 43 calculates the longitudinal forces Fxfl~Fxrr of wheels 11FL~11RR (step S74). Furthermore, the lateral force estimating section 45 in vehicle travel state estimating device 8 calculates the lateral forces Fyfl~Fyrr of wheels 11FL~11RR (step S75). In vehicle travel state estimating device 8, the Fx/λ calculating section 46 calculates the ratios (Fxfl/λfl~Fxrr/λrr) of the longitudinal force Fxfl~Fxrr to the slip rate λfl~λrr of wheels 11FL~11RR (step S76). Furthermore, the Fy/βt calculating section 47 in vehicle body travel state estimating device 8 calculates the ratios (Fyfl/βtfl~Fyrr/βtrr) of the lateral force Fyfl~Fyrr to the slip angle βtfl~βtrr (step S77).

Subsequently, the tire grip state calculating section 48 in vehicle travel state estimating device 8 estimates the μ gradient (the grip characteristic parameter) on the basis of the 3D μ gradient characteristic map (step S78). That is, tire grip state calculating section 48 calculates the μ gradient (γ/γ0) for each of the wheels during traveling, corresponding to the ratio (Fxfl/λfl~Fxrr/λrr) of the longitudinal force Fxfl~Fxrr to the slip rate λfl~λrr and the ratio (Fyfl/βtfl~Fyrr/βtrr) of the lateral force Fyfl~Fyrr to the slip angle βtfl~βtrr by using the 3D μ gradient characteristic map for that one of the wheels. Then, the longitudinal force correction command calculating section 49 of vehicle travel state estimating device 8 performs the longitudinal force control for preventing spin and lock of each of wheels 11FL~11RR (step S78). Furthermore, the longitudinal force correction command calculating section 49 and turning assist command calculating section 51 of vehicle travel state estimating device 8 perform the turning control by controlling the longitudinal forces (step S79).

Thus, vehicle travel state estimating device 8 performs the spin and lock preventing control and the turning control by controlling the longitudinal forces in the following manner in accordance with the μ gradient (grip characteristic parameter).

That is, when the μ gradient is greater than predetermined threshold A1 (μ gradient>A1), the vehicle travel state estimating device 8 judges that the wheel satisfying that condition is in the grip state, and performs the normal longitudinal force control (normal control mode) (S51→S52).

Moreover, when the μ gradient is smaller than or equal to predetermined threshold A1 and greater than predetermined threshold A2 (A1≥μ gradient>A2), then the vehicle travel state estimating device 8 performs the longitudinal force control to inhibit an increase of the longitudinal force for the wheel satisfying that condition (the spin and lock preventing control, the longitudinal force increase inhibiting control mode) (S51→S53→S54). Accordingly, the system can prevent the grip force from becoming saturated by an increase of the longitudinal force caused by a driver's accelerator operation or brake operation.

Moreover, when the μ gradient is smaller than or equal to predetermined threshold A2≥μ gradient), the vehicle travel state estimating device 8 performs the longitudinal force control to decrease the longitudinal force (the spin and lock preventing control, the longitudinal force decrease control mode) for the wheel satisfying that condition (S51→S53→S55). With this control, even if the grip force is saturated, the system can regain the grip force.

In the above-mentioned process, the system judges the grip state of the wheel only by comparing the μ gradient with predetermined thresholds A1 and A2. By so doing, the system estimates the margin to the friction limit adequately and performs the longitudinal force control suitable to the estimated margin even when the grip force of the wheel is in the limit state.

The vehicle travel state estimating device 8 calculates the turning moment ΔM produced by the longitudinal force difference between the left and right wheels due to the spin and lock preventing control (S61). Moreover, vehicle travel state estimating device 8 calculates the base yaw rate γb, and calculates the difference Δγ by using the calculated base yaw rate γb (step S62 and step S63). Then, vehicle travel state estimating device 8 calculates the turning assist torque MMTR from the calculated turning moment ΔM and the yaw rate difference Δγ. In accordance with the calculated turning assist torque MMTR, the vehicle travel state estimating device 8 performs the vehicle turning control by producing the longitudinal force to the wheel having a higher μ gradient (step S64). With this control, the system prevents the vehicle from being turned by the spin and lock preventing control. Moreover, the system achieves turning performance matching a steering operation even in case of a tire side slip.

In the second embodiment, the longitudinal force correction command calculating section 49 and turning assist command calculating section 51 realize the vehicle behavior estimating section for estimating the vehicle behavior in accordance with the grip characteristic parameter.

Effects of the Second Embodiment (1) The vehicle behavior estimating section estimates the vehicle behavior, and the vehicle behavior control section controls the vehicle behavior by controlling a vehicle behavior controlling actuator (brake/drive motor 21) in accordance with the vehicle behavior estimated by the vehicle behavior estimating section.

Therefore, the system can perform the control for stabilizing the vehicle behavior (including the vehicle turning behavior) in accordance with the grip characteristic parameter.

(2) The vehicle behavior controlling actuator (brake/drive motor 21) is in the form of a longitudinal force controlling actuator for controlling the longitudinal forces of left and right wheels of the vehicle. Therefore, the system can perform the control for stabilizing the vehicle behavior (including the vehicle turning behavior) by controlling the longitudinal forces of the left and right wheels.

(3) The system performs the vehicle turning control based on the turning moment ΔM produced by the driving/braking torque difference between the left and right wheels due to the longitudinal force control (the spin and lock preventing control). Therefore, the system can prevent the vehicle from being turned by the longitudinal force control (the spin and lock preventing control).

According to one of possible interpretations of the illustrated embodiments, it is possible to prepare following claims.

X1) A system (apparatus or method) for estimating a gripping characteristic of a vehicle wheel of a vehicle on a ground contact surface, comprising: a first input element (first input section or first input step) to set a first input which is a ratio of a first direction wheel force acting on the vehicle wheel in the ground contact surface in a first direction, and a first direction wheel slip degree of the vehicle wheel; a second input element (second input section or second input step) to set a second input which is a ratio of a second direction wheel force acting on the vehicle wheel in the ground contact surface in a second direction different from the first direction, and a second direction wheel slip degree of the vehicle wheel; and an output element (output section or output step) to determine, from the first input set by the first input element and the second input set by the second input element, an output which is a grip characteristic parameter indicative of the gripping characteristic of the vehicle wheel.

X2) The system (apparatus or method) as recited in the claim X1, wherein the first direction is a longitudinal direction of the wheel, the second direction is a lateral direction of the wheel, the first input element is configured to determine, as the first input, a ratio of a longitudinal wheel force and a longitudinal wheel slip degree of the wheel, and the second input element is configured to determine, as the second input, a ratio of a lateral wheel force and a lateral wheel slip degree of the wheel.

X3) The system (apparatus or method) as recited in the claim X1 or X2, wherein the output element is configured to have a predetermined 2-input-1 output characteristic relationship (such as a relationship shown in FIG. 37), and to determine the grip characteristic parameter from the ratio of the first direction wheel force and the first direction wheel slip degree and the ratio of the second direction wheel force and the second direction wheel slip degree, according to this characteristic relationship.

X4) The system (apparatus or method) as recited in one of the claims X1-X3, wherein the grip characteristic parameter is a quantity representing a gradient of a characteristic curve between a resultant direction wheel force and a result direction wheel slip degree in a resultant direction or combined direction intermediate between the first direction and the second direction.

X5) The system (apparatus or method) as recited in the claim X3 or X4, wherein the grip characteristic parameter determined by the above-mentioned characteristic relationship increases from a minimum parameter value to a positive maximum parameter value when at least one of the first and second inputs increases.

X6) The system (apparatus or method) as recited in the claim X5, wherein the system further comprises a wheel load sensing element (section or step) to determine a wheel load of the wheel and a modifying element (modifying section or modifying step), and the modifying element is configured to modify the characteristic relationship in such a manner as to increase the maximum parameter value as the wheel load increases.

X7) The system (apparatus or method) as recited in one of the claims X1~X6, wherein the first input element sets the first input for front two wheels of the vehicle and the first input for rear two wheels of the vehicle, the second input element sets the second input for the front two wheels of the vehicle and the second input for the rear two wheels of the vehicle, and the output element determines the grip characteristic parameter for the front two wheels from the first and second inputs for the front two wheels according to a grip characteristic relationship for the front two wheels and determines the grip characteristic parameter for the rear two wheels from the first and second inputs for the rear two wheels according to a grip characteristic relationship for the rear two wheels.

X8) The system (apparatus or method) as recited in one of the claims X1~X6, wherein the vehicle is a vehicle having a plurality of wheels (4, 3 or 2 wheels, for example), the first input element sets the first input for each of the wheels, the second input element sets the second input for each of the wheels, and the output element determines the grip characteristic parameter for each of the wheels from the first and second inputs for each wheel according to a grip characteristic relationship for each wheel.

X9) The system (apparatus or method) as recited in one of the claims X1~X6, wherein the before-mentioned vehicle wheel is a non-steerable wheel (a rear wheel, for example).

X10) The system (apparatus or method) as recited in one of the claims X1~X9, wherein the second input element includes a second wheel force calculating element (section or step) (such as 45 shown in FIG. 31) to calculate the second direction wheel force from at least one of a yaw rate (for example, a vehicle yaw rate sensed by the yaw rate sensor 2) and a lateral acceleration (for example, a vehicle lateral acceleration sensed by the lateral acceleration sensor 2).

X11) The system (apparatus or method) as recited in one of the claims X1~X9, wherein the system further comprises a second direction wheel force sensor (for example, the hub sensors 71) to sense the second direction wheel force, and the second input element includes a second wheel force estimating element (section or step) (for example, 45 shown in FIG. 44) to determine the second direction wheel force from an output signal of the second direction wheel force sensor.

X12) The system (apparatus or method) as recited in one of the claims X1~X11, wherein the first input element includes a first wheel force calculating element (43) to calculate the first direction wheel force from an operating condition (for example, a rotation speed or a current value) of a wheel longitudinal force controlling actuator (for example, brake/drive motor 21).

X13) The system (apparatus or method) as recited in one of the claims X1~X12, wherein the first and second input elements are both configured to calculate the wheel force and the ratio of the wheel force and the wheel slip degree on the assumption that a pneumatic trail is equal to zero. The wheel force (lateral direction wheel force, longitudinal direction wheel force, resultant direction wheel force) is a force acting on the wheel in the ground contact surface, and the magnitude of the wheel force does not become equal to zero even when the pneumatic trail is equal to zero.

X14) The system (apparatus or method) as recited in one of the claims X1~X13, wherein the output element is configured to determine the grip characteristic parameter from the ratio of the first direction wheel force and the first direction wheel slip degree and the ratio of the second direction wheel force and the second direction wheel slip degree according to a predetermined 2-input-1-output characteristic relationship among a first input variable represented by the first input, a second input variable represented by the second input and an output variable represented by the output, the characteristic relationship represents a grip characteristic curve in a longitudinal direction of the wheel when the second input variable is equal to zero, the characteristic relationship represents a grip characteristic curve in a lateral direction of the wheel when the first input variable is equal to zero, and the characteristic relationship represents a grip characteristic curve in an oblique direction of the wheel when the first input variable is not equal to zero (positive or negative) and the second input variable is not equal to zero (positive or negative).

The present application is based on a basic Japanese patent application 2008-278033 filed on Oct. 29, 2008. The contents of this patent application is incorporated herein by reference. Moreover, the present invention is related to an international patent application PCT/JP2008/057452 filed on Apr. 16, 2008. The contents of this international patent application is incorporated herein by reference.

The invention claimed is:

1. A vehicle ground contact surface friction state estimating apparatus for estimating a gripping characteristic of a vehicle wheel of a vehicle on a ground contact surface, comprising:

a first input section to set a first input which is a ratio of a first wheel force acting on the vehicle wheel in the ground contact surface in a first direction, and a first wheel slip degree of the vehicle wheel;

a second input section to set a second input which is a ratio of a second wheel force acting on the vehicle wheel in the ground contact surface in a second direction different from the first direction, and a second wheel slip degree of the vehicle wheel; and an output section to determine, from the inputs set by the first and second input sections, an output which is a grip characteristic parameter indicative of the gripping characteristic of the vehicle wheel.

2. The vehicle ground contact surface friction state estimating apparatus as claimed in claim 1, wherein the grip characteristic parameter is a rate of change of the wheel force with respect to a change of the wheel slip degree.

3. The vehicle ground contact surface friction state estimating apparatus as claimed in claim 1, wherein the output section is configured to determine the grip characteristic parameter only from the ratio of the first wheel force and the first wheel slip degree and the ratio of the second wheel force and the second wheel slip degree, without using a friction coefficient of a ground surface.

4. The vehicle ground contact surface friction state estimating apparatus as claimed in claim 1, wherein the output section is configured to determine the grip characteristic parameter from the ratio of the first wheel force and the first wheel slip degree in a nonlinear region in which the first wheel force varies nonlinearly with the first wheel slip degree, and the ratio of the second wheel force and the second wheel slip degree in a nonlinear region in which the second wheel force varies nonlinearly with the second wheel slip degree.

5. The vehicle ground contact surface friction state estimating apparatus as claimed in claim 1, wherein the output section is configured to determine the grip characteristic parameter from the ratio of the first wheel force and the first wheel slip degree and the ratio of the second wheel force and the second wheel slip degree according to a predetermined nonlinear relationship between two input variables represented by the two inputs and an output variable represented by the output, and the grip characteristic parameter is a quantity representing a margin to a tire friction limit.

6. The vehicle ground contact surface friction state estimating apparatus as claimed in claim 5, wherein the predetermined nonlinear relationship between the two input variables and the output variable is in the form of one of a characteristic curved surface and a mathematical formula.

7. The vehicle ground contact surface friction state estimating apparatus as claimed in claim 1, wherein the first wheel slip degree is a degree of slip of the vehicle wheel relative to the ground surface in a direction of the first wheel force, the second wheel slip degree is a degree of slip of the vehicle wheel relative to the ground surface in a direction of the second wheel force, the grip characteristic parameter is a variable representing a gripping ability of the vehicle wheel, and the output section is configured to determine the grip characteristic parameter only from the ratio of the first wheel force and the first wheel slip degree and the ratio of the second wheel force and the second wheel slip degree, without using a friction coefficient of the ground surface.

8. The vehicle ground contact surface friction state estimating apparatus as claimed in claim 1, wherein the first wheel slip degree is a quantity representing a relative velocity vector of the vehicle wheel relative to the ground surface in the direction of the first wheel force, the second wheel slip degree is a quantity representing a relative velocity vector of the vehicle wheel relative to the ground surface in the direction of the second wheel force, and the output section is configured to determine the grip characteristic parameter only from the ratio of the first wheel force and the first wheel slip degree and the ratio of the second wheel force and the second wheel slip degree without using the friction coefficient of the ground surface.

9. The vehicle ground contact surface friction state estimating apparatus as claimed in claim 1, wherein
the first wheel force is a tire force in the first direction acting on a tire,
the ratio of the first wheel force to the first wheel slip degree is a ratio of the tire force in the first direction to the first wheel slip degree,
the second wheel force is a tire force in the second direction acting on the tire,
the ratio of the second wheel force to the second wheel slip degree is a ratio of the tire force in the second direction to the second wheel slip degree,
the grip characteristic parameter represents a gradient of a tire characteristic curve of a resultant tire force with respect to a resultant wheel slip degree, the resultant wheel slip degree being a wheel slip degree produced in a direction of a combination of the first wheel force and the second wheel force, the resultant tire force being a combined tire force resulting from the first wheel force and the second wheel force, and the output section is configured to determine the gradient of the tire characteristic curve only from the ratio of the first wheel force and the first wheel slip degree and the ratio of the second wheel force and the second wheel slip degree, without using the friction coefficient of the ground surface.

10. The vehicle ground contact surface friction state estimating apparatus as claimed in claim 9, wherein the tire characteristic curve includes a linear segment in which the resultant tire force increases linearly from zero as an absolute value of the resultant wheel slip degree increases from zero in a smaller slip region where the resultant wheel slip degree is smaller, and a nonlinear segment in which the resultant tire force varies nonlinearly as the absolute value of the resultant wheel slip degree increases in a greater slip region where the absolute value of the resultant wheel slip degree increases beyond the smaller slip region,
the grip characteristic parameter increases from zero to a greatest parameter value as at least one of the ratio of the first wheel force and the first wheel slip degree and the ratio of the second wheel force and the second wheel slip degree increases,
the greatest parameter value represents the gradient of the linear segment of the tire characteristic curve, and
the output section is configured to determine the gradient of the nonlinear segment of the tire characteristic curve from the ratio of the first wheel force and the first wheel slip degree and the ratio of the second wheel force and the second wheel slip degree.

11. The vehicle ground contact surface friction state estimating apparatus as claimed in claim 9, wherein the tire characteristic curve includes a higher friction tire characteristic curve for a higher friction road surface having a higher friction coefficient, and a lower friction tire characteristic curve for a lower friction road surface having a lower friction coefficient lower than the higher friction coefficient,
the grip characteristic parameter represents gradients of the higher friction tire characteristic and the lower friction tire characteristic,
the input sections are configured to determine a current value of the ratio of the wheel force and the wheel slip degree from a current value of the tire force and a current value of the wheel slip degree, and
the output section is configured to determine a current value of the grip characteristic parameter from the current values of the ratios of the wheel force and the wheel slip degree, and to set a value of the gradient of the higher friction tire characteristic curve corresponding to the current value of the tire force and the current value of the wheel slip degree, and a value of the gradient of the lower friction tire characteristic curve corresponding to the current value of the tire force and the current value of the wheel slip degree, equal to each other, and equal to the current value of the grip characteristic parameter.

12. The vehicle ground contact surface friction state estimating apparatus as claimed in claim 9, wherein the tire characteristic curve is a characteristic curve representing a tire characteristic dependent on a road surface friction coefficient, and the output section is configured to determine the gradient of the tire characteristic curve only from the ratio of the first wheel force and the first wheel slip degree and the ratio of the second wheel force and the second wheel slip degree without using the road surface friction coefficient.

13. The vehicle ground contact surface friction state estimating apparatus as claimed in claim 1, wherein the grip characteristic parameter is a function increasing when at least one of the ratio of the first wheel force and the first wheel slip degree and the ratio of the second wheel force and the second wheel slip degree increases from a predetermined critical ratio value.

14. The vehicle ground contact surface friction state estimating apparatus as claimed in claim 13, wherein, in a greater ratio region greater than the predetermined critical ratio value, when at least one of the ratio of the first wheel force and the first wheel slip degree and the ratio of the second wheel force and the second wheel slip degree increases, the grip characteristic parameter increases nonlinearly so that a rate of increase of the grip characteristic parameter with respect to an increase of that ratio of the wheel force and the wheel slip degree increases.

15. The vehicle ground contact surface friction state estimating apparatus as claimed in claim 13, wherein the grip characteristic parameter is equal to a predetermined critical parameter value when each of the ratio of the first wheel force and the first slip degree and the ratio of the second wheel force and the second wheel slip degree is equal to the predetermined critical ratio value,
the grip characteristic parameter decreases below the critical parameter value as at least one of the ratio of the first wheel force and the first wheel slip degree and the ratio of the second wheel force and the second wheel slip degree decreases below the critical ratio value, and
the grip characteristic parameter increases above the critical parameter value as the ratio of the first wheel force and the first wheel slip degree and the ratio of the second wheel force and the second wheel slip degree both increase above the critical ratio value.

16. The vehicle ground contact surface friction state estimating apparatus as claimed in claim 1, wherein one of the first wheel force and the second wheel force is a longitudinal force or driving/braking force acting on the vehicle wheel.

17. The vehicle ground contact surface friction state estimating apparatus as claimed in claim 16, wherein, when one of the first wheel force and the second wheel force is the longitudinal force or driving/braking force, one of the first wheel slip degree and the second wheel slip degree corresponding to the longitudinal or driving/braking force is a longitudinal slip degree, and one of the first input and the second input is a quantity obtained by dividing the longitudinal force or driving/braking force by the longitudinal slip degree.

18. The vehicle ground contact surface friction state estimating apparatus as claimed in claim 17, wherein the longitudinal slip degree is a slip rate of the vehicle wheel.

19. The vehicle ground contact surface friction state estimating apparatus as claimed in claim 1, wherein one of the first wheel force and the second wheel force is a tire lateral force or a tire cornering force acting on the vehicle wheel.

20. The vehicle ground contact surface friction state estimating apparatus as claimed in claim 19, wherein, when one of the first wheel force and the second wheel force is the tire lateral force or cornering force, one of the first wheel slip degree and the second wheel slip degree corresponding to the tire lateral force or cornering force is a lateral slip degree, and one of the first input and the second input is a quantity obtained by dividing the lateral force or cornering force by the lateral slip degree.

21. The vehicle ground contact surface friction state estimating apparatus as claimed in claim 20, wherein the lateral slip degree is a slip angle of the vehicle wheel.

22. The vehicle ground contact surface friction state estimating apparatus as claimed in claim 1, wherein the wheel force is a resultant force of wheel forces of left and right wheels.

23. The vehicle ground contact surface friction state estimating apparatus as claimed in claim 1, wherein each of the first and second inputs is a nondimensional quantity, and
each of the input sections is configured to set a nondimensional input by dividing the ratio of the wheel force and wheel slip degree by a reference ratio.

24. The vehicle ground contact surface friction state estimating apparatus as claimed in claim 1, wherein the grip characteristic parameter is a nondimensional quantity, and
the output section is configured to determine the nondimensional quantity by dividing the grip characteristic parameter by a reference parameter.

25. The vehicle ground contact surface friction state estimating apparatus as claimed in claim 1, wherein the output section is configured to determine the output from the two inputs according to a predetermined relationship between the two inputs and the output, and the relationship between the two inputs and the output is expressed by a three dimensional curved surface in a three dimensional coordinate system having a first axis representing the first input which is the ratio of the first wheel force and the first slip degree, a second axis representing the second input which is the ratio of the second wheel force and the second wheel slip degree and a third axis representing the grip characteristic parameter.

26. The vehicle ground contact surface friction state estimating apparatus as claimed in claim 25, wherein the first axis represents one of the ratio of the lateral force or cornering force and the lateral slip degree and the ratio of the longitudinal or driving/braking force and the longitudinal slip degree, and
the second axis represents the other of the ratio of the lateral force or cornering force and the lateral slip degree and the ratio of the longitudinal or driving/braking force and the longitudinal slip degree.

27. The vehicle ground contact surface friction state estimating apparatus as claimed in claim 25, wherein the first, second and third axes represent nondimensional quantities,
the first and second axes are so arranged that the nondimensional quantity is determined by dividing the ratio of the wheel force in the direction of each axis and the wheel slip degree, by a reference ratio, and
the third axis is so arranged that the nondimensional quantity is determined by dividing the grip characteristic parameter by the reference parameter.

28. The vehicle ground contact surface friction state estimating apparatus as claimed in claim 1, wherein the input sections comprise a first wheel force sensing section to sense the first wheel force, a first wheel slip degree sensing section to sense the first wheel slip degree, a first dividing section to determine the ratio of the first wheel force and the first wheel slip degree by dividing the first wheel force determined by the first wheel force sensing section, by the first wheel slip degree determined by the first wheel slip degree sensing section, a second wheel force sensing section to sense the second wheel force, a second wheel slip degree sensing section to sense the second wheel slip degree, and a second dividing section to determine the ratio of the second wheel force and the second wheel slip degree by dividing the second wheel force determined by the second wheel force sensing section, by the second wheel slip degree determined by the second wheel slip degree sensing section.

29. The vehicle ground contact surface friction state estimating apparatus as claimed in claim 1, wherein the apparatus further comprises a wheel load sensing section to determine a wheel load of the vehicle wheel, and a modifying section to modify a relationship between the inputs and the output in accordance with the wheel load determined by the wheel load sensing section.

30. The vehicle ground contact surface friction state estimating apparatus as claimed in claim 29, wherein the apparatus comprises the modifying section for correcting a wheel load variation which calculates a modification coefficient in accordance with the wheel load, and
the modifying section is configured to modify each of the first and second inputs by dividing each input by the modification coefficient, and to modify the output determined from the first and second inputs modified in this way, by multiplying the output by the modification coefficient.

31. The vehicle ground contact surface friction state estimating apparatus as claimed in claim 30, wherein the modification coefficient is increased as the wheel load increases.

32. The vehicle ground contact surface friction state estimating apparatus as claimed in claim 31, wherein a rate of increase of the modification coefficient is decreased as the wheel load increases.

33. The vehicle ground contact surface friction state estimating apparatus as claimed in claim 1, wherein the apparatus further comprises a controlling section to perform a grip recovery control to increase the grip characteristic parameter above a predetermined critical parameter value in a critical region in which the grip characteristic parameter is smaller than or equal to the critical parameter value, and a grip decrease preventing control to prevent a decrease of the grip characteristic parameter toward the critical parameter value when the grip characteristic parameter is in a marginal region in which the grip characteristic parameter is greater than the critical parameter value but smaller than a predetermined threshold parameter value which is greater than the critical parameter value.

34. The vehicle ground contact surface friction state estimating apparatus as claimed in claim 33, wherein the controlling section is configured to perform a grip state control when the grip characteristic parameter is greater than the threshold parameter value.

35. The vehicle ground contact surface friction state estimating apparatus as claimed in claim 33, wherein the apparatus further comprises a stability estimating section to determine a vehicle stability parameter representing a vehicle stability, from the grip characteristic parameter.

36. The vehicle ground contact surface friction state estimating apparatus as claimed in claim 35, wherein the input sections is configured to determine the ratio of the first wheel force and the first wheel slip degree of a first wheel of the vehicle and the ratio of the second wheel force and the second wheel slip degree of the first wheel of the vehicle, and the ratio of the first wheel force and the first slip degree of a second wheel of the vehicle and the ratio of the second wheel force and the second wheel slip degree of the second wheel of the vehicle,
  the output section is configured to determine the grip characteristic parameter of the first wheel from the ratio of the first wheel force and the first wheel slip degree of the first wheel and the ratio of the second wheel force and the second wheel slip degree of the first wheel, and the grip characteristic parameter of the second wheel from the ratio of the first wheel force and the first wheel slip degree of the second wheel and the ratio of the second wheel force and the second wheel slip degree of the second wheel, and
  the stability estimating section is configured to estimate the vehicle stability parameter from the grip characteristic parameter of the first wheel and the grip characteristic parameter of the second wheel.

37. The vehicle ground contact surface friction state estimating apparatus as claimed in claim 36, wherein the first wheel and the second wheel of the vehicle are front and rear wheels, or left and right wheels of the vehicle.

38. The vehicle ground contact surface friction state estimating apparatus as claimed in claim 35, wherein the apparatus further comprises a stability control section to control the vehicle in accordance with the vehicle stability parameter.

39. The vehicle ground contact surface friction state estimating apparatus as claimed in claim 1, wherein the apparatus further comprises a vehicle behavior estimating section to estimate a vehicle behavior in accordance with the grip characteristic parameter.

40. The vehicle ground contact surface friction state estimating apparatus as claimed in claim 39, wherein the vehicle behavior estimating section includes a decomposing section to decompose the grip characteristic parameter into a lateral component in the lateral direction and a longitudinal component in the longitudinal direction, and the vehicle behavior estimating section includes at least one of a longitudinal behavior estimating section to estimate a longitudinal behavior of the vehicle in the longitudinal direction in accordance with the longitudinal component of the grip characteristic parameter decomposed by the decomposing section and a lateral behavior estimating section to estimate a lateral behavior of the vehicle in the lateral direction in accordance with the lateral component of the grip characteristic parameter decomposed by the decomposing section.

41. The vehicle ground contact surface friction state estimating apparatus as claimed in claim 40, wherein the lateral behavior estimating section estimates the lateral behavior of the vehicle in the lateral direction in accordance with the lateral component of the grip characteristic parameter of a first wheel of the vehicle and the lateral component of the grip characteristic parameter of a second wheel of the vehicle.

42. The vehicle ground contact surface friction state estimating apparatus as claimed in claim 39, wherein the apparatus further comprises a vehicle behavior control section to control the vehicle behavior of the vehicle in accordance with the vehicle behavior estimated by the vehicle behavior estimating section.

43. The vehicle ground contact surface friction state estimating apparatus as claimed in claim 42, wherein the apparatus further comprises a vehicle behavior controlling actuator, and the vehicle behavior control section is configured to control the vehicle behavior of the vehicle by controlling the vehicle behavior controlling actuator in accordance with the vehicle behavior estimated by the vehicle behavior estimating section.

44. The vehicle ground contact surface friction state estimating apparatus as claimed in claim 43, wherein the vehicle behavior controlling actuator includes at least one of a steering force assist actuator to assist a steering force of a vehicle driver, a longitudinal force controlling actuator to control longitudinal forces of left and right wheels of the vehicle, and a wheel steer angle controlling actuator to control a wheel steer angle of the vehicle.

45. The vehicle ground contact surface friction state estimating apparatus as claimed in claim 43, wherein the vehicle behavior control section is configured to control the vehicle behavior controlling actuator in a manner to increase the grip characteristic parameter when the grip characteristic parameter decreases.

46. The vehicle ground contact surface friction state estimating apparatus as claimed in claim 43, wherein the vehicle behavior control section is configured to control the vehicle behavior controlling actuator in a manner to decrease the slip angle of the vehicle wheel when the grip characteristic parameter decreases.

47. The vehicle ground contact surface friction state estimating apparatus as claimed in claim 42, wherein the vehicle behavior estimating section is configured to estimate a vehicle turning characteristic from the grip characteristic parameter, and the vehicle behavior control section is configured to control a turning behavior of the vehicle in accordance with the vehicle turning characteristic estimated by the vehicle behavior estimating section.

48. The vehicle ground contact surface friction state estimating apparatus as claimed in claim 47, wherein the vehicle behavior estimating section is configured to estimate at least one of a vehicle drift out tendency and a vehicle spin out tendency from the grip characteristic parameter, and the vehicle behavior controlling section is configured to control the turning behavior of the vehicle in a manner to decrease the tendency which is at least one of the vehicle drift out tendency and the vehicle spin out tendency estimated by the vehicle behavior estimating section.

49. The vehicle ground contact surface friction state estimating apparatus as claimed in claim 35, wherein the apparatus further comprises a wheel torque control section to control at least one of a braking torque and a driving torque of the wheel, in accordance with the grip characteristic parameter.

50. The vehicle ground contact surface friction state estimating apparatus as claimed in claim 49, wherein the wheel torque control section is configured to control at least one of the braking torque and the driving torque of the wheel, in accordance with a longitudinal component of the grip characteristic parameter.

51. The vehicle ground contact surface friction state estimating apparatus as claimed in claim 49, wherein the apparatus further comprises a wheel torque controlling actuator to control the wheel torque, and the wheel torque control section is configured to control the wheel torque controlling actuator.

52. The vehicle ground contact surface friction state estimating apparatus as claimed in claim 49, wherein the wheel torque control section is configured to control at least one of the braking torque and the driving torque of the wheel in a manner to decrease the wheel torque until the grip characteristic parameter becomes greater than a predetermined critical parameter value when the grip characteristic parameter becomes lower than the predetermined critical parameter value.

53. The vehicle ground contact surface friction state estimating apparatus as claimed in claim 52, wherein the predetermined critical parameter value is equal to zero.

54. The vehicle ground contact surface friction state estimating apparatus as claimed in claim 49, wherein the wheel torque control section is configured to control at least one of the braking torque and driving torque of the wheel in a manner to restrain an increase of the wheel torque when the grip characteristic parameter is in a region greater than the predetermined critical parameter value and smaller than a predetermined threshold value.

55. The apparatus as claimed in claim 49, wherein the wheel torque control section is configured to control at least one of the braking torque and driving torque of the wheel in a manner to increase the wheel torque until the grip characteristic parameter becomes smaller than a predetermined threshold value upon receipt of a request of a vehicle driver to increase the longitudinal force when the grip characteristic parameter is greater than the predetermined critical parameter value.

56. A vehicle ground contact surface friction state estimating method for estimating a gripping characteristic of a vehicle wheel of a vehicle on a ground contact surface, comprising:
 a first input step to set a first input which is a ratio of a first wheel force acting on the vehicle wheel in the ground contact surface in a first direction, and a first wheel slip degree of the vehicle wheel;
 a second input step to set a second input which is a ratio of a second wheel force acting on the vehicle wheel in the ground contact surface in a second direction different from the first direction, and a second wheel slip degree of the vehicle wheel; and
 an output step to determine, from the inputs set by the first and second input steps, an output which is a grip characteristic parameter indicative of the gripping characteristic of the vehicle wheel.

\* \* \* \* \*